Figure 1:
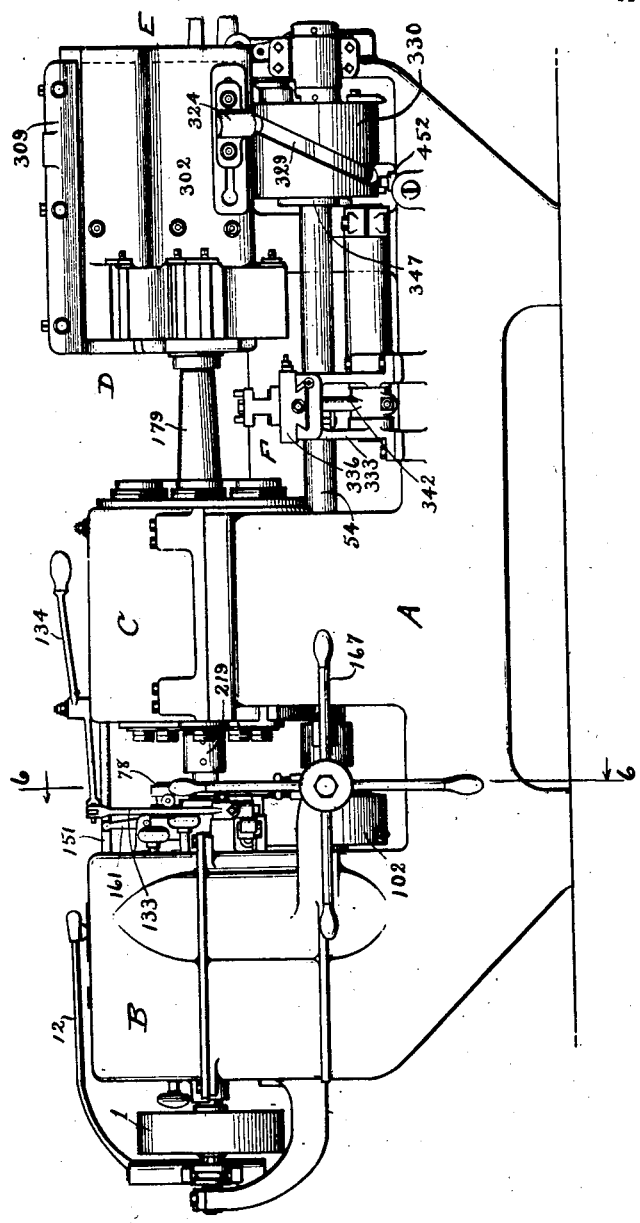

O. KYLIN.
AUTOMATIC LATHE.
APPLICATION FILED JUNE 27, 1918.

1,355,480.

Patented Oct. 12, 1920.
32 SHEETS—SHEET 1.

INVENTOR.
Oskar Kylin
By Louis C. Vanderlip
atty.

O. KYLIN.
AUTOMATIC LATHE.
APPLICATION FILED JUNE 27, 1918.

1,355,480.

Patented Oct. 12, 1920.
32 SHEETS—SHEET 2.

INVENTOR.
Oskar Kylin
By Louis C. Vanderlip.
atty.

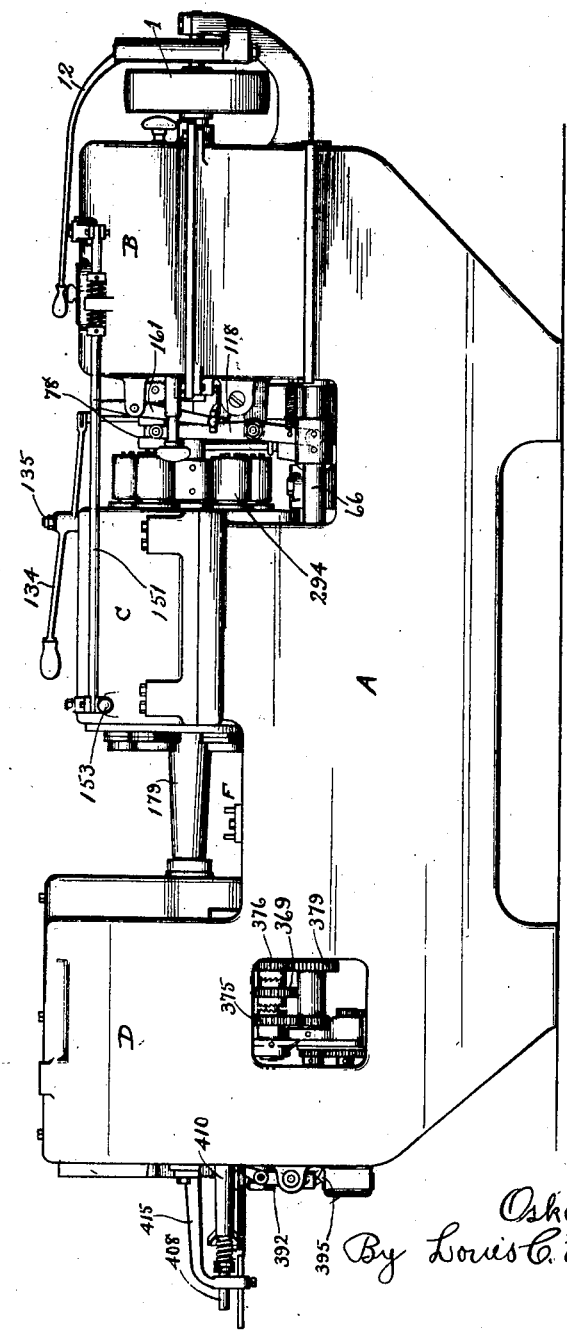

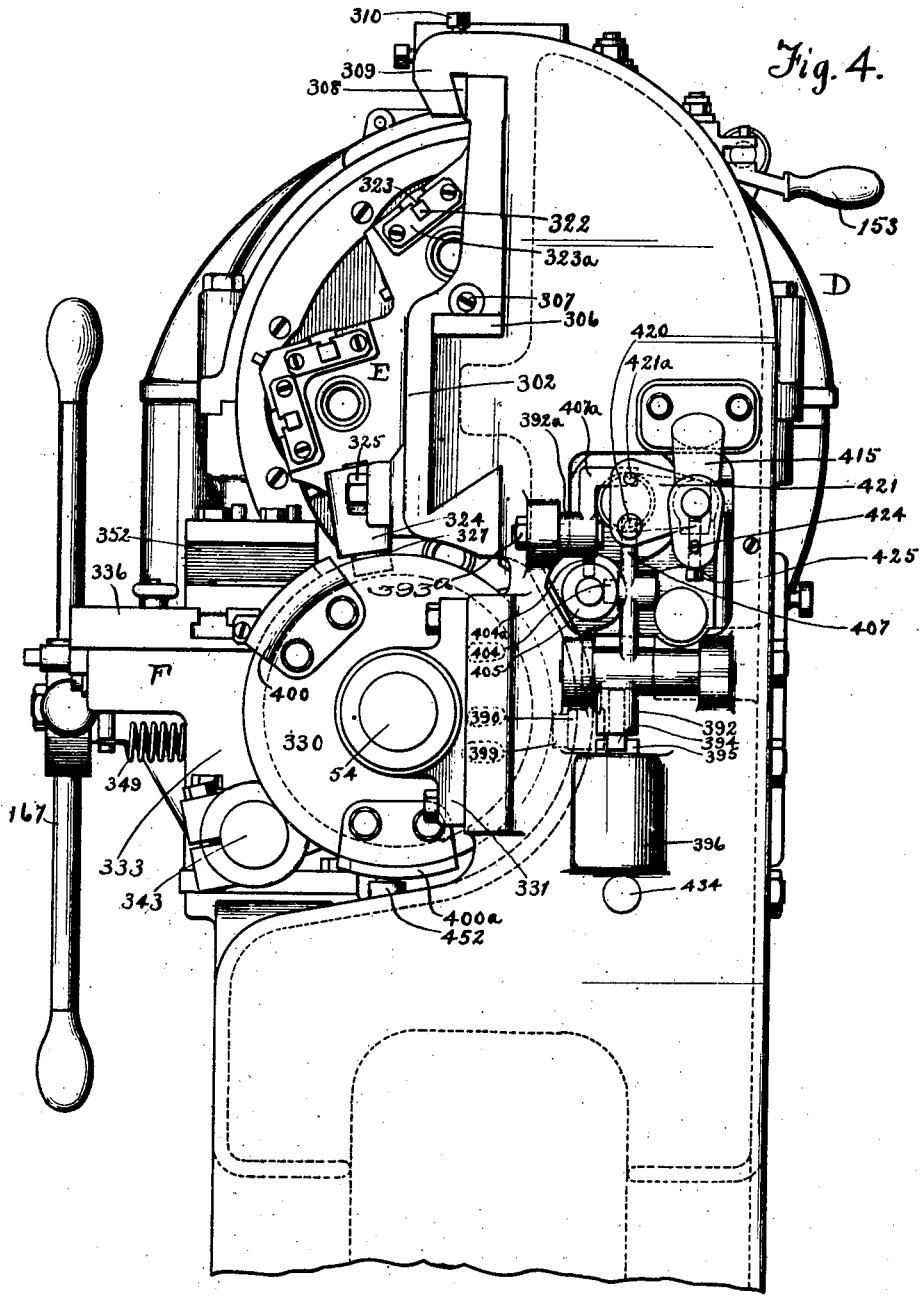

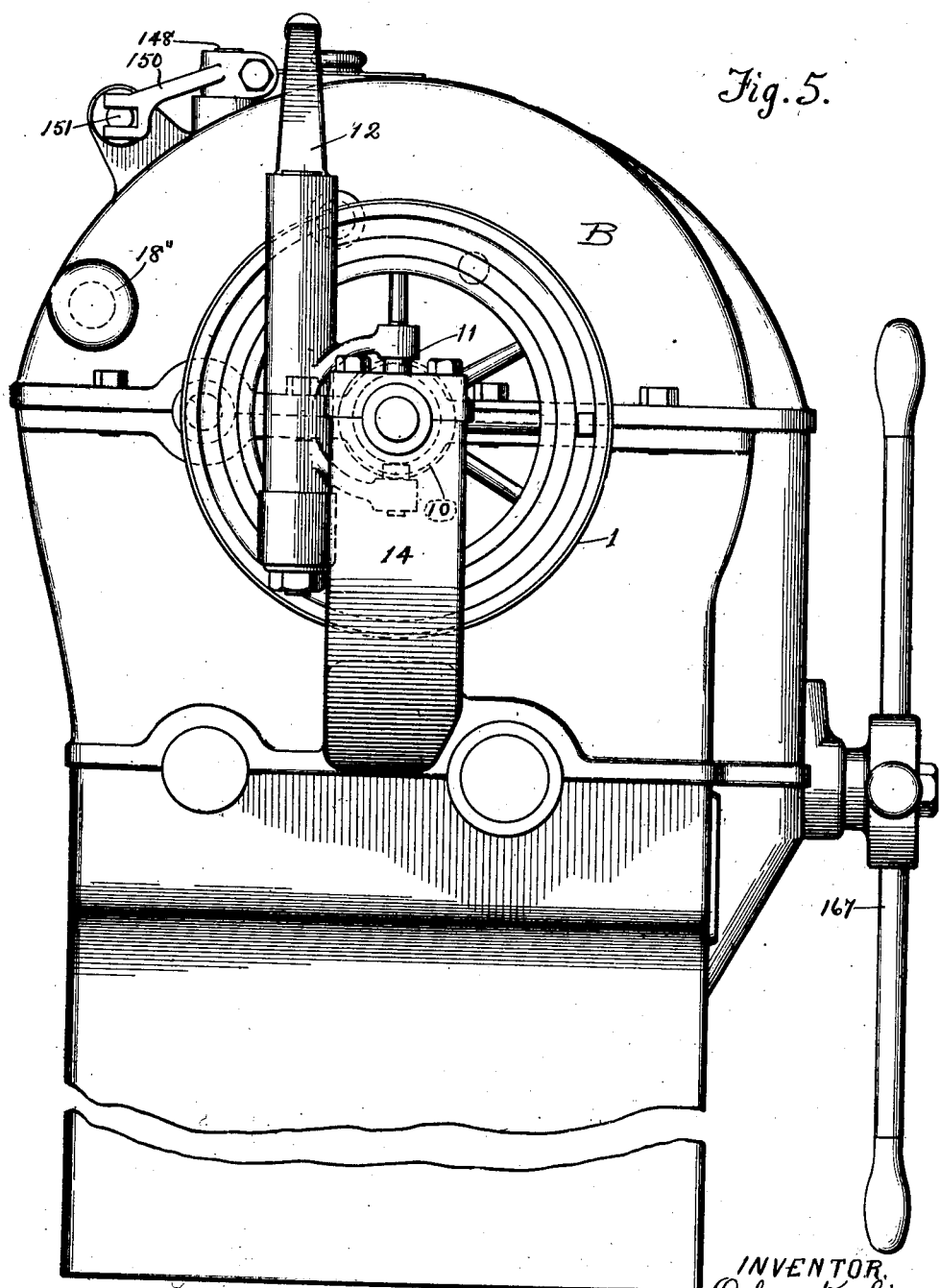

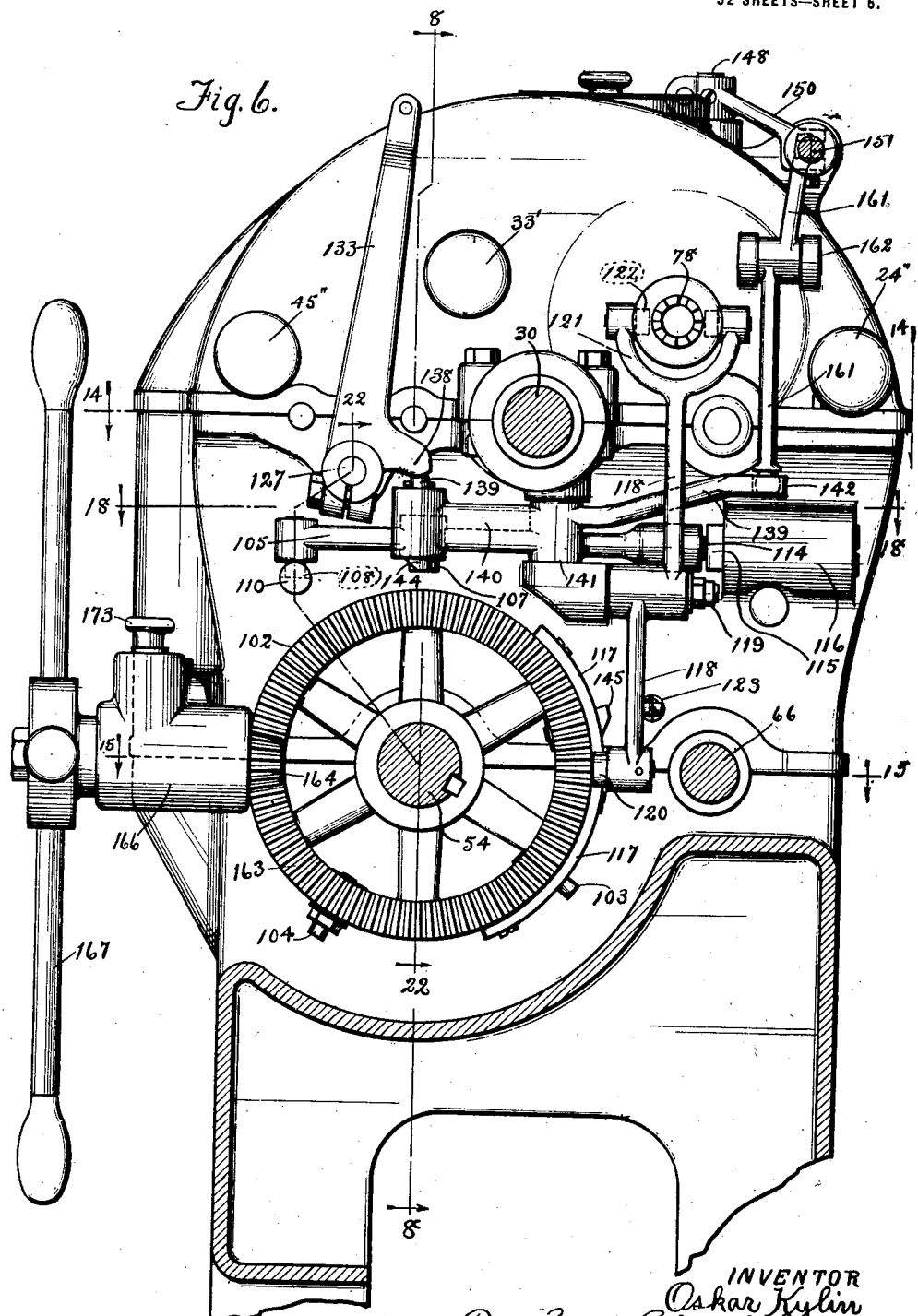

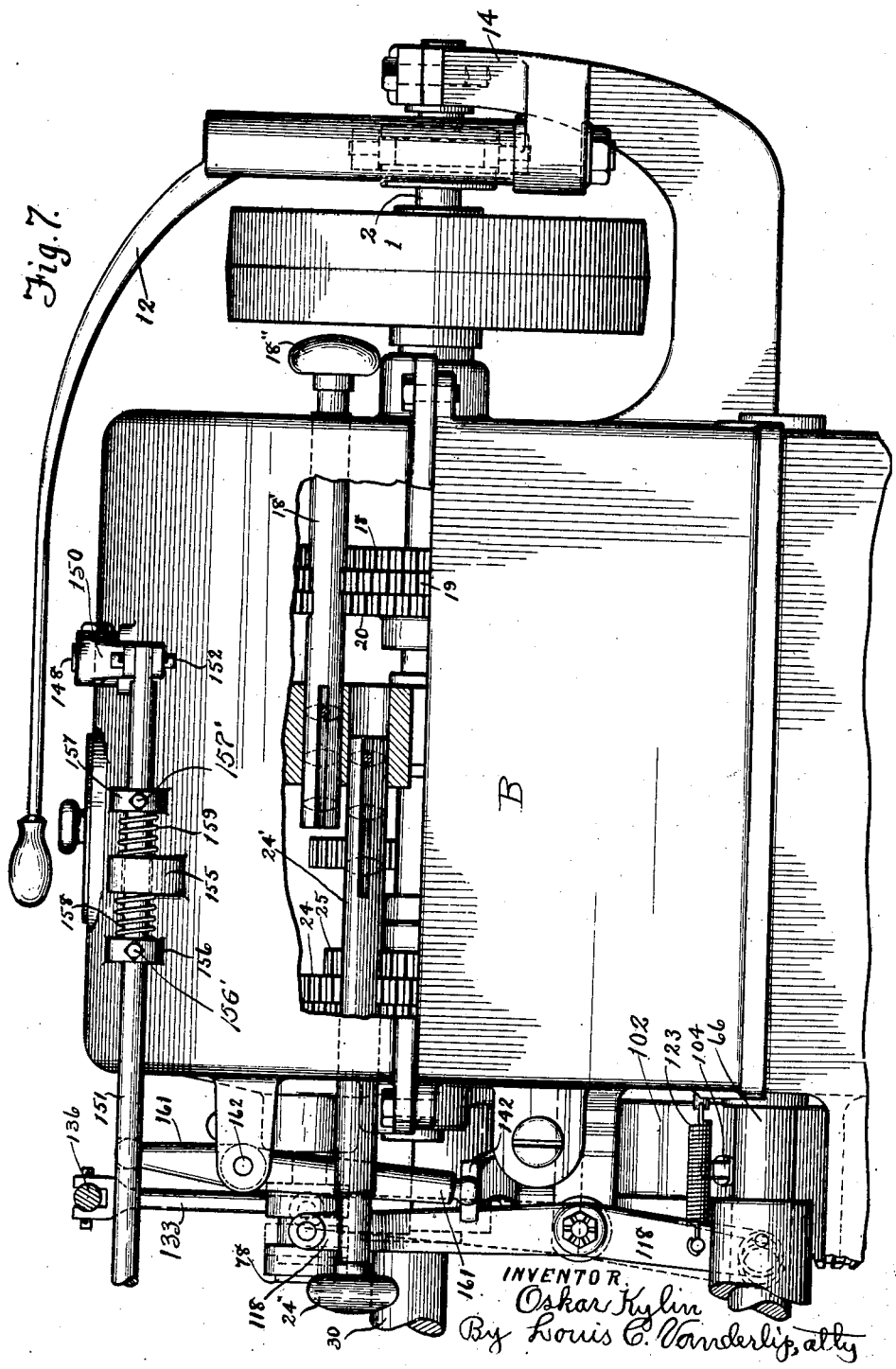

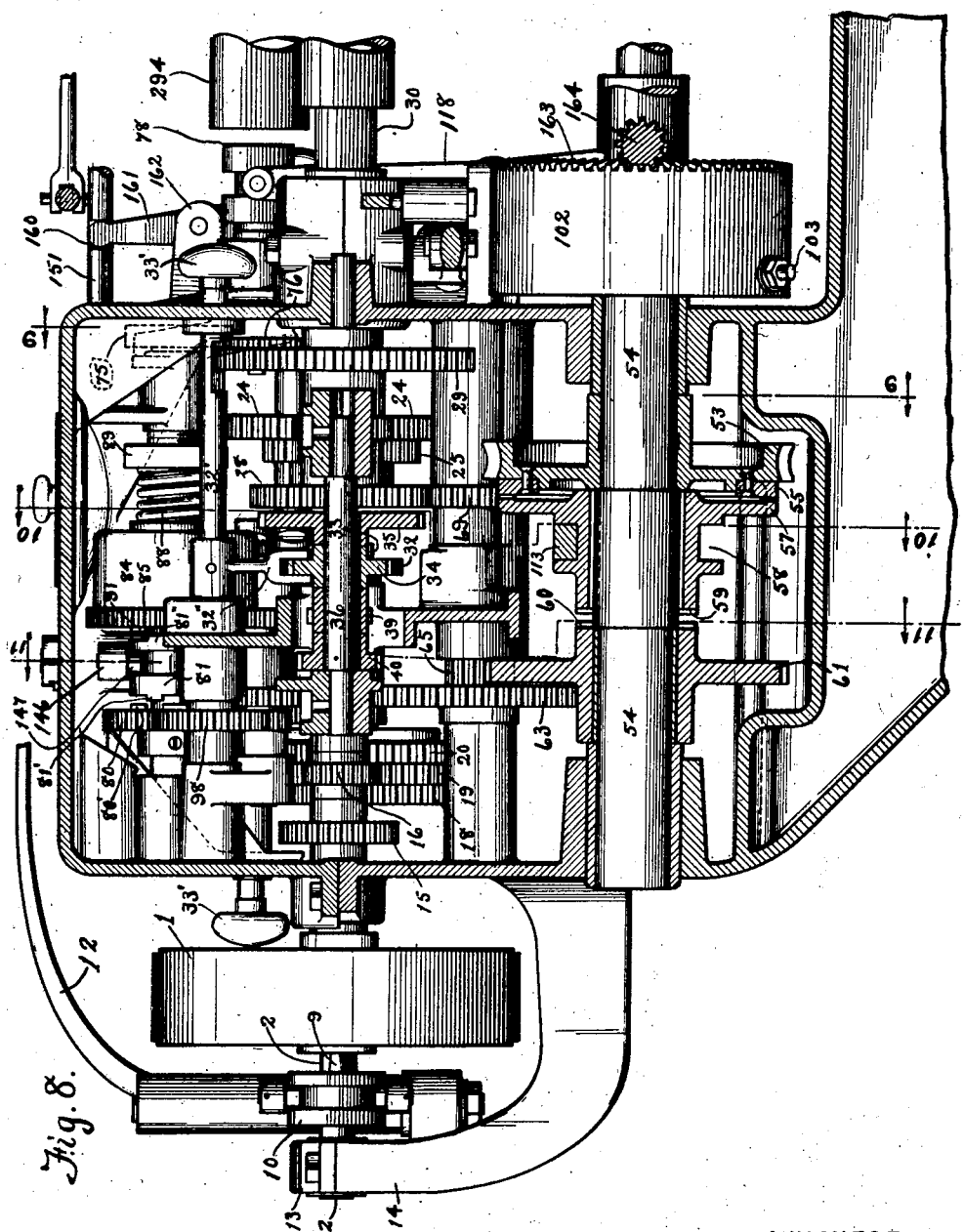

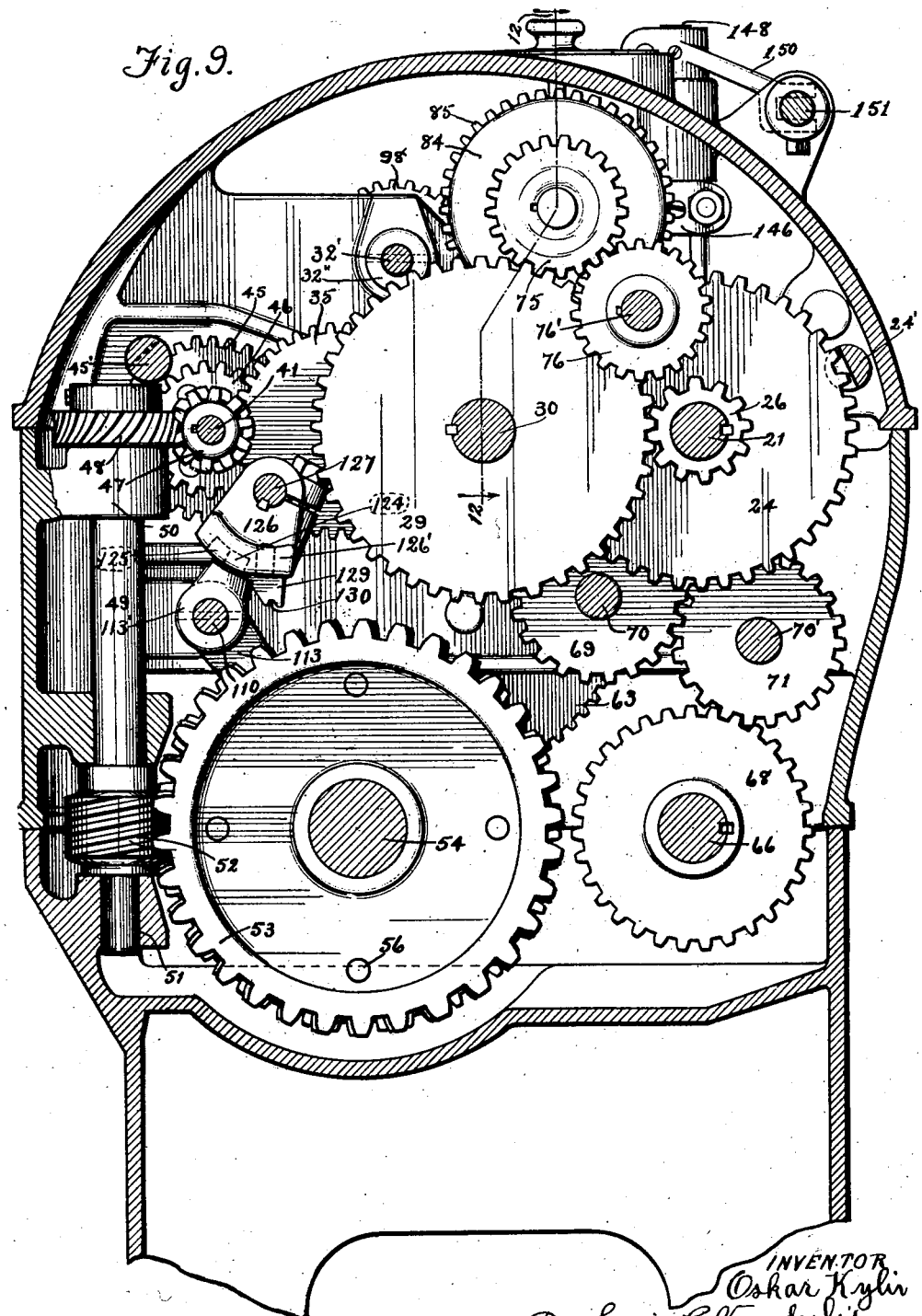

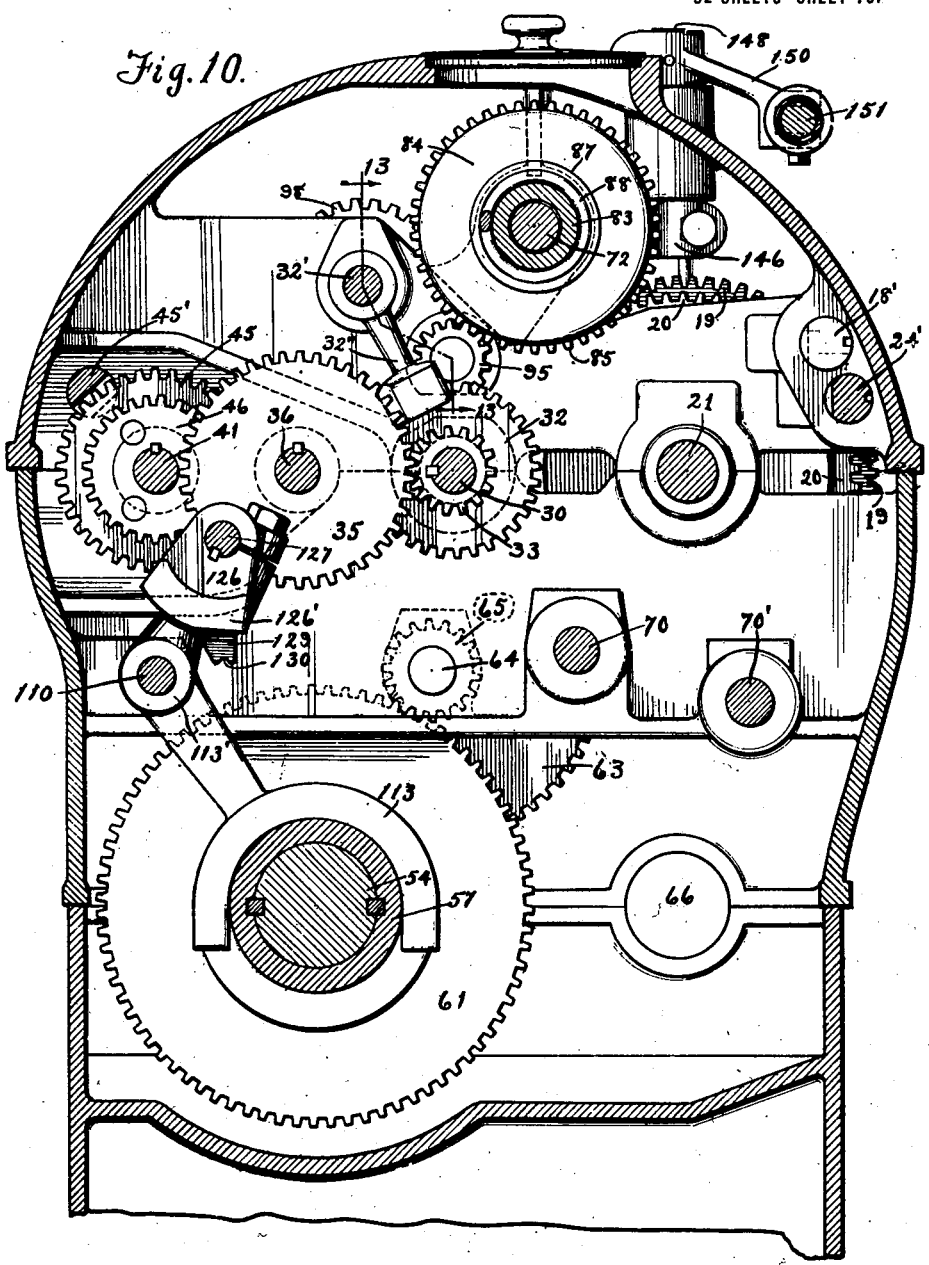

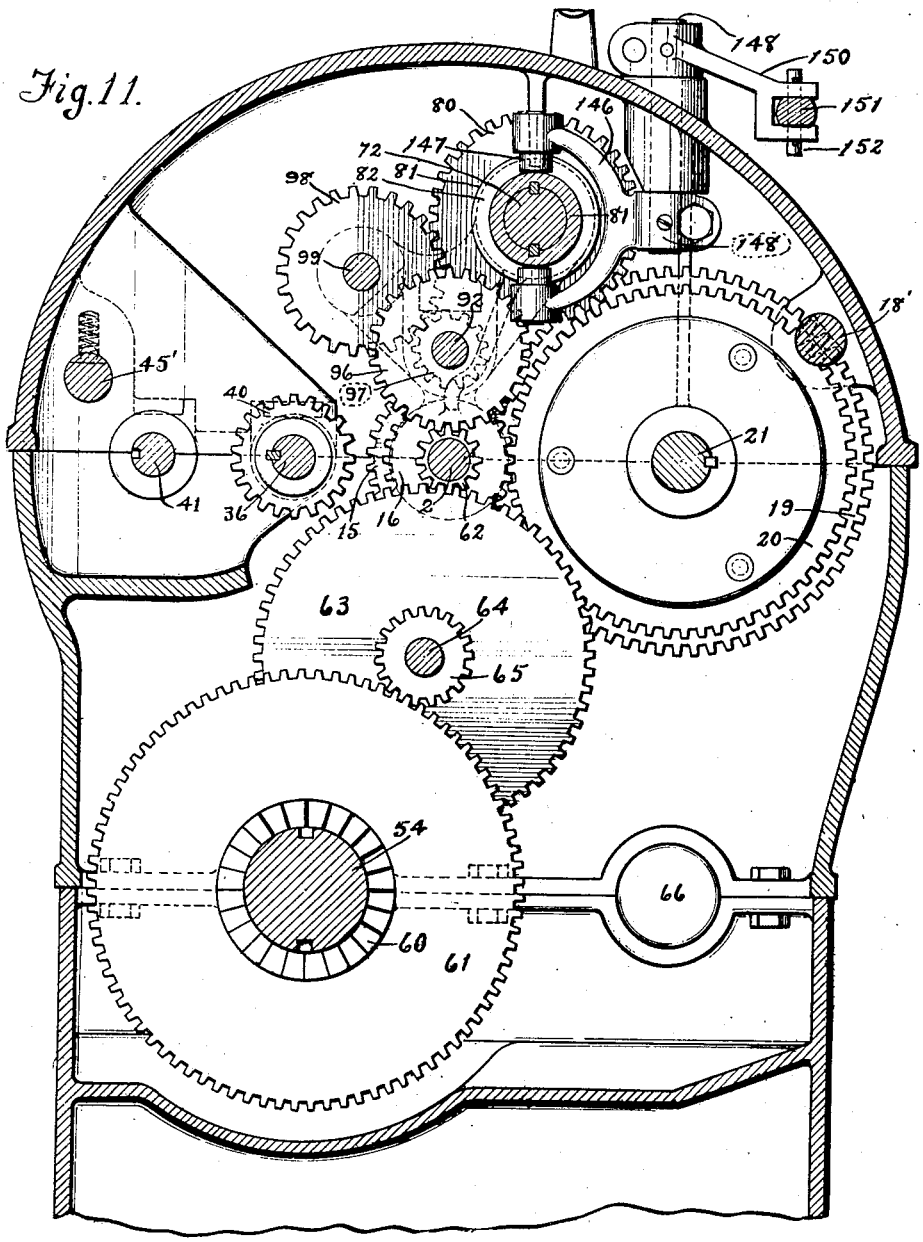

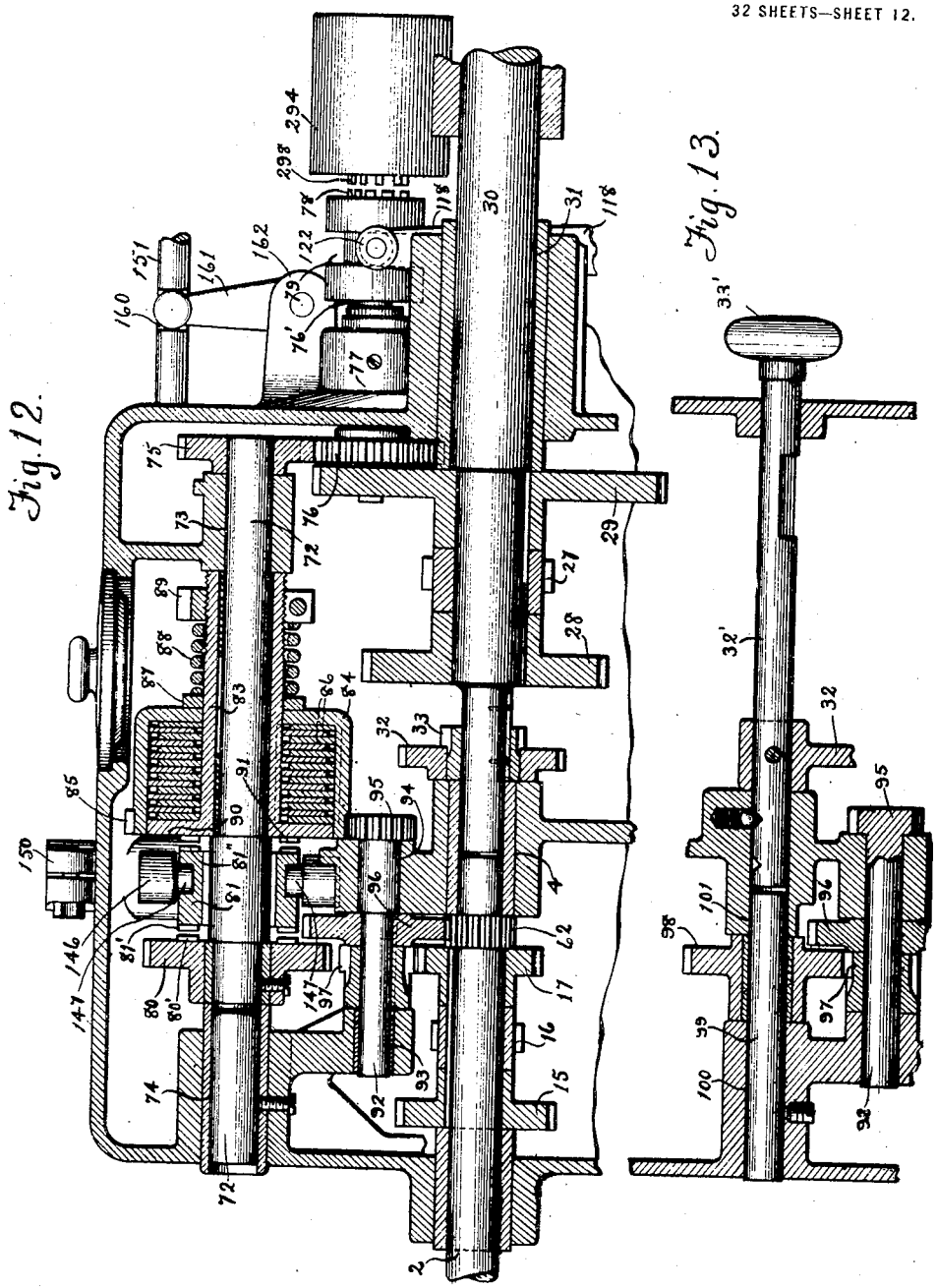

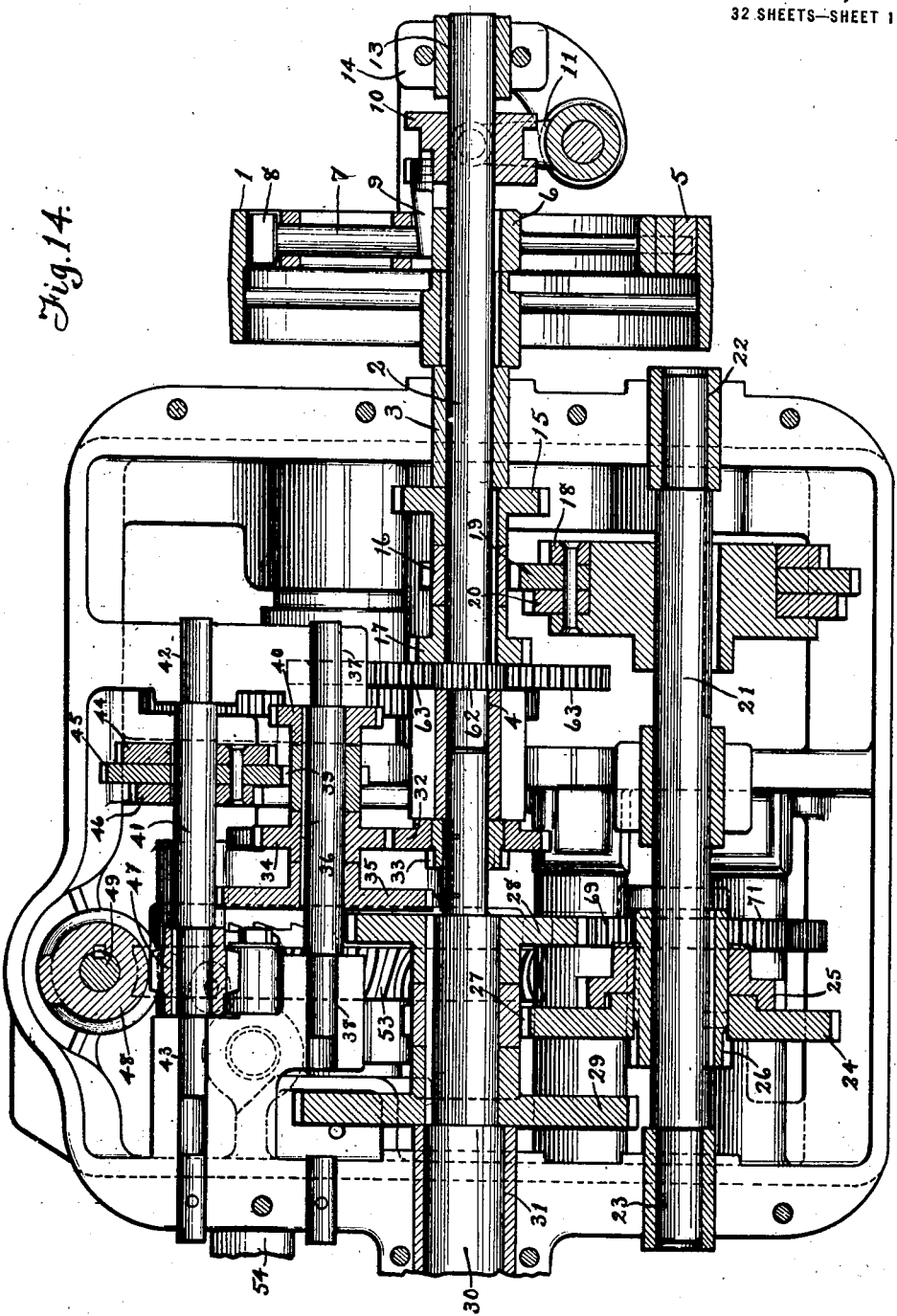

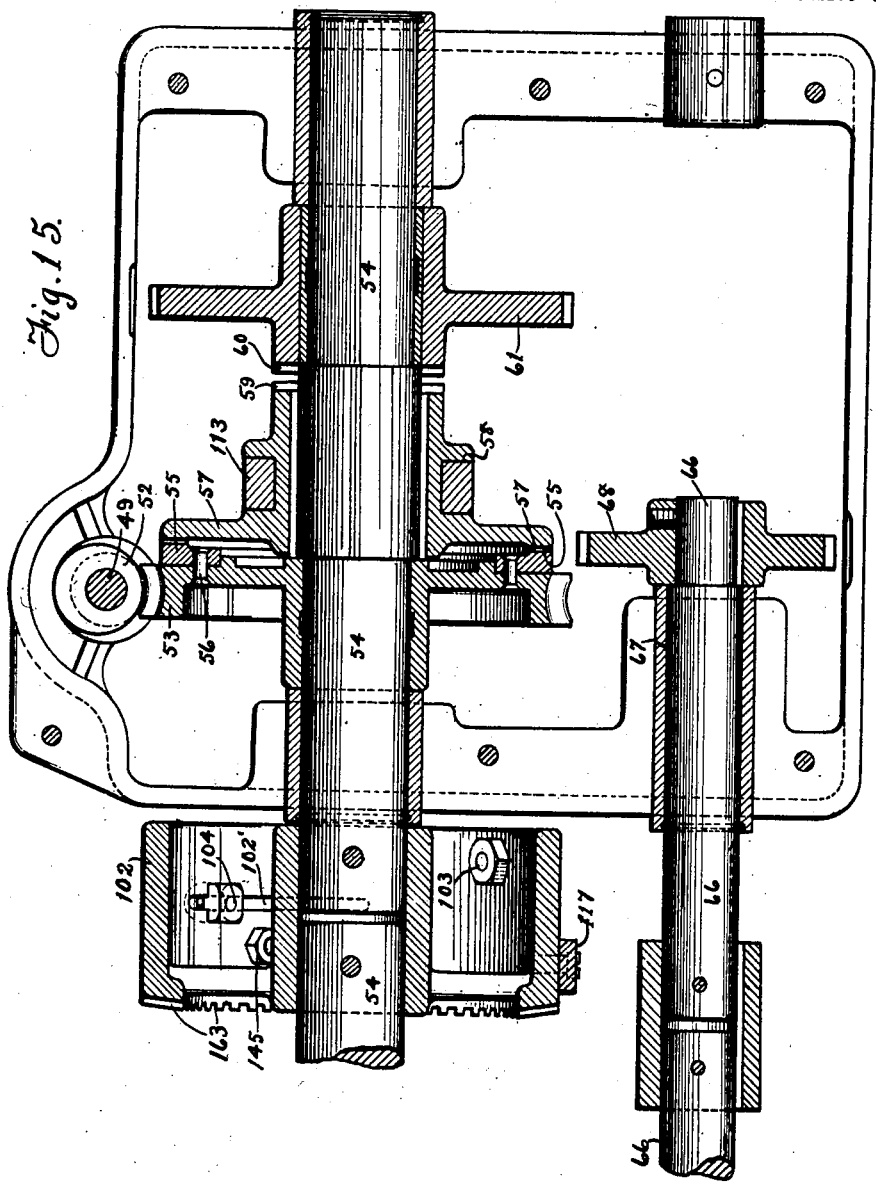

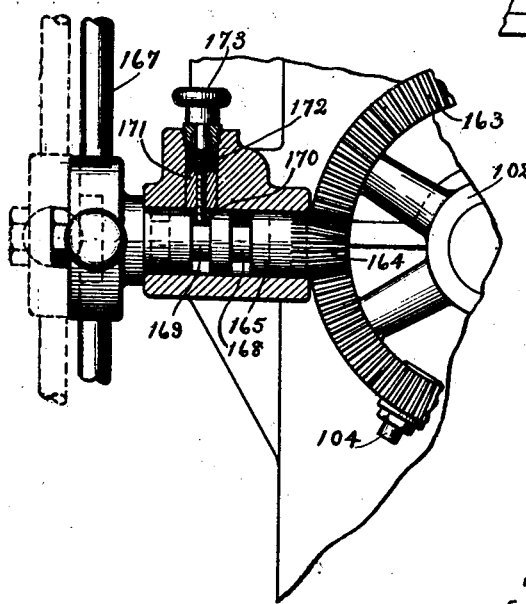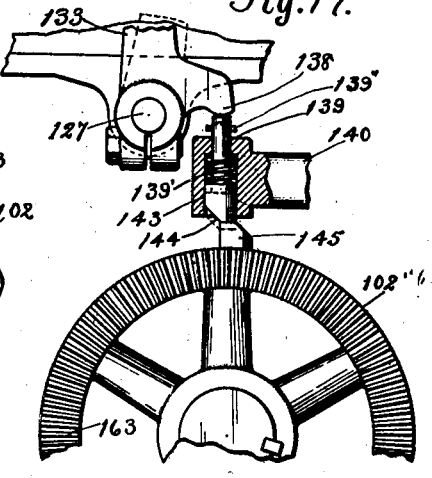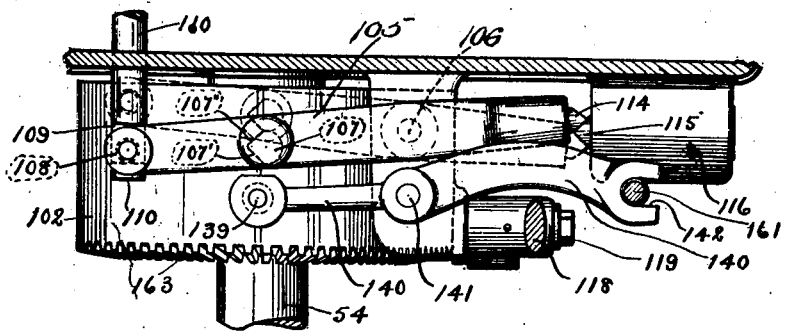

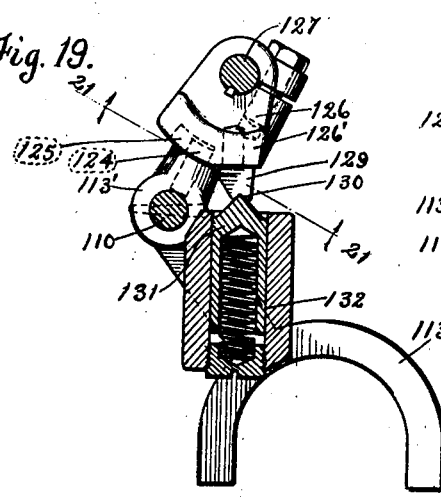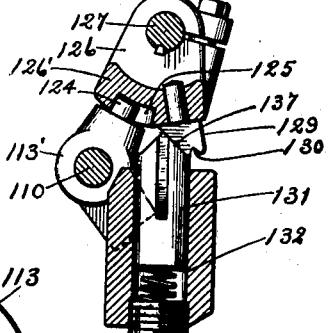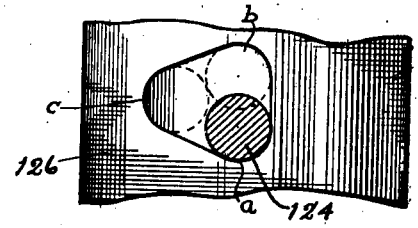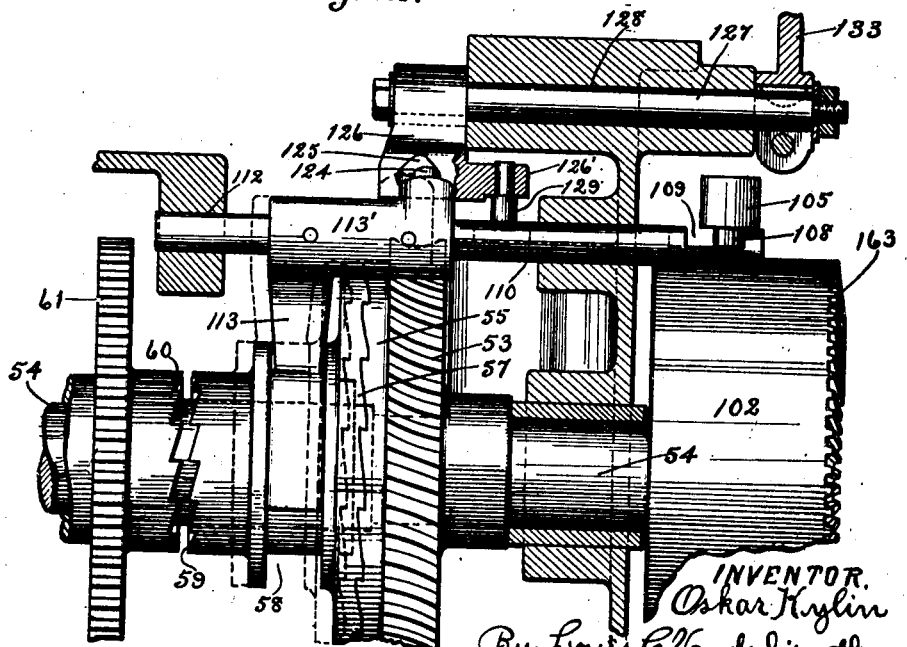

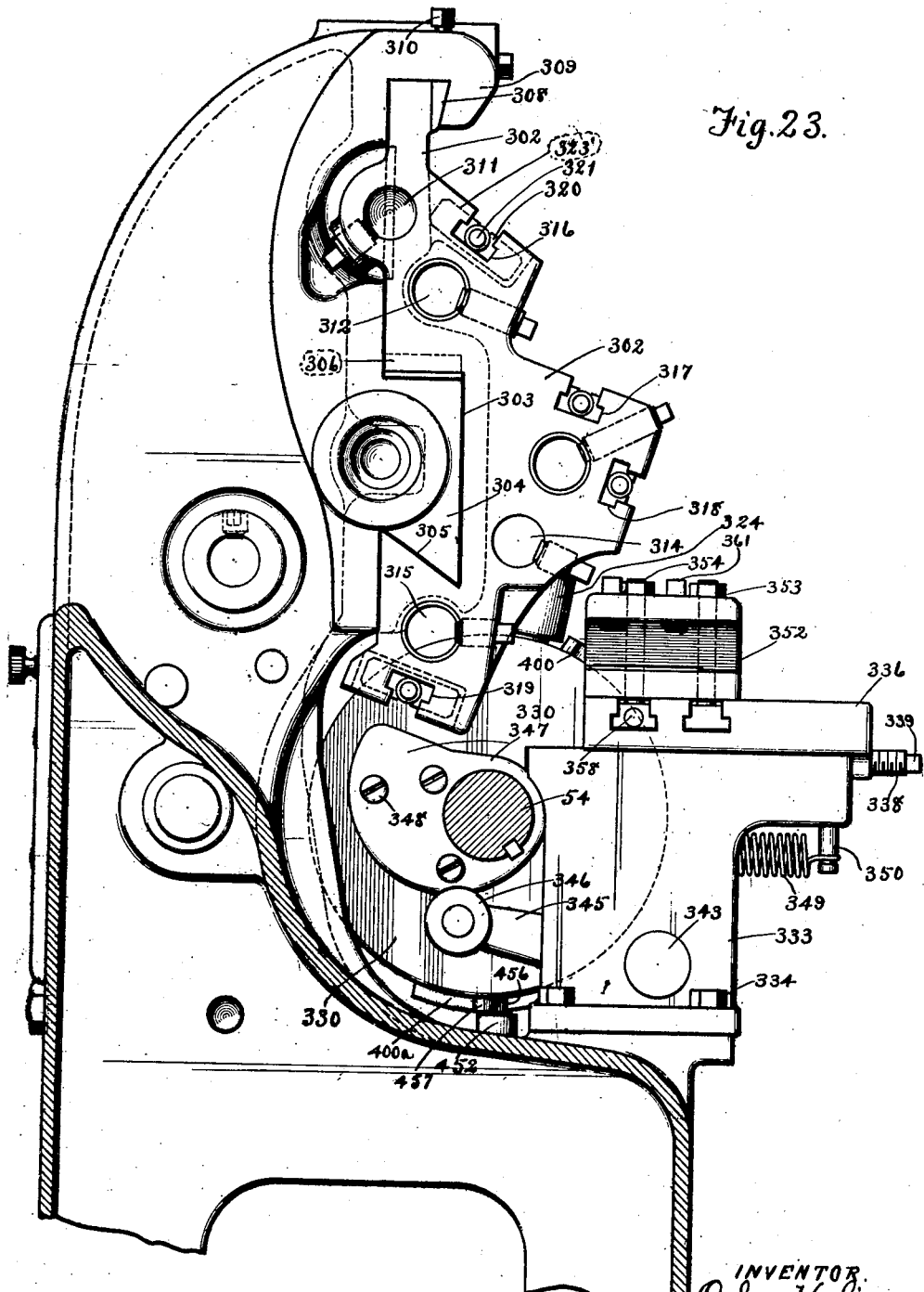

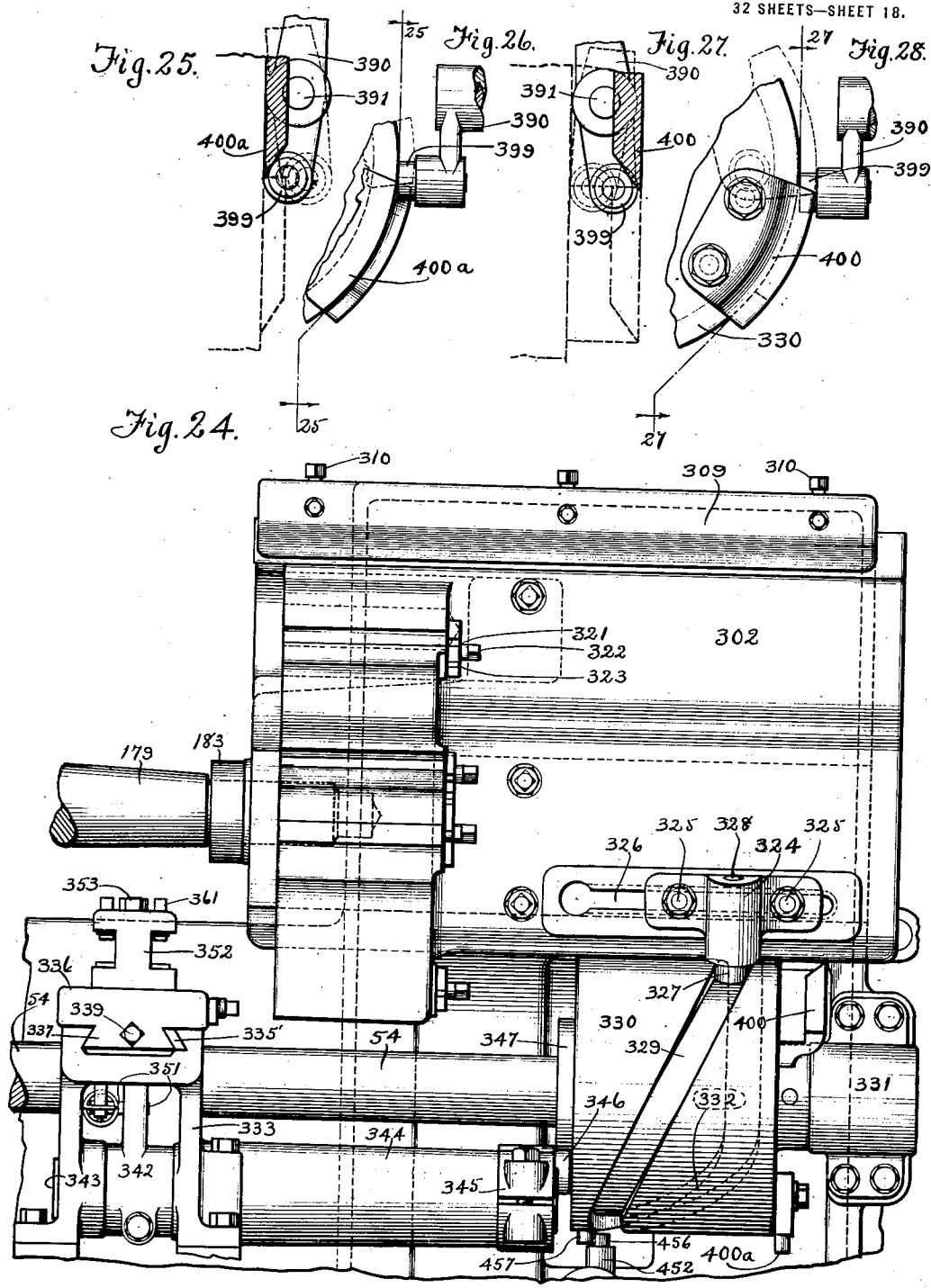

O. KYLIN.
AUTOMATIC LATHE.
APPLICATION FILED JUNE 27, 1918.

1,355,480.

Patented Oct. 12, 1920.
32 SHEETS—SHEET 19.

INVENTOR
Oskar Kylin
By Louis C. Vanderlip
atty.

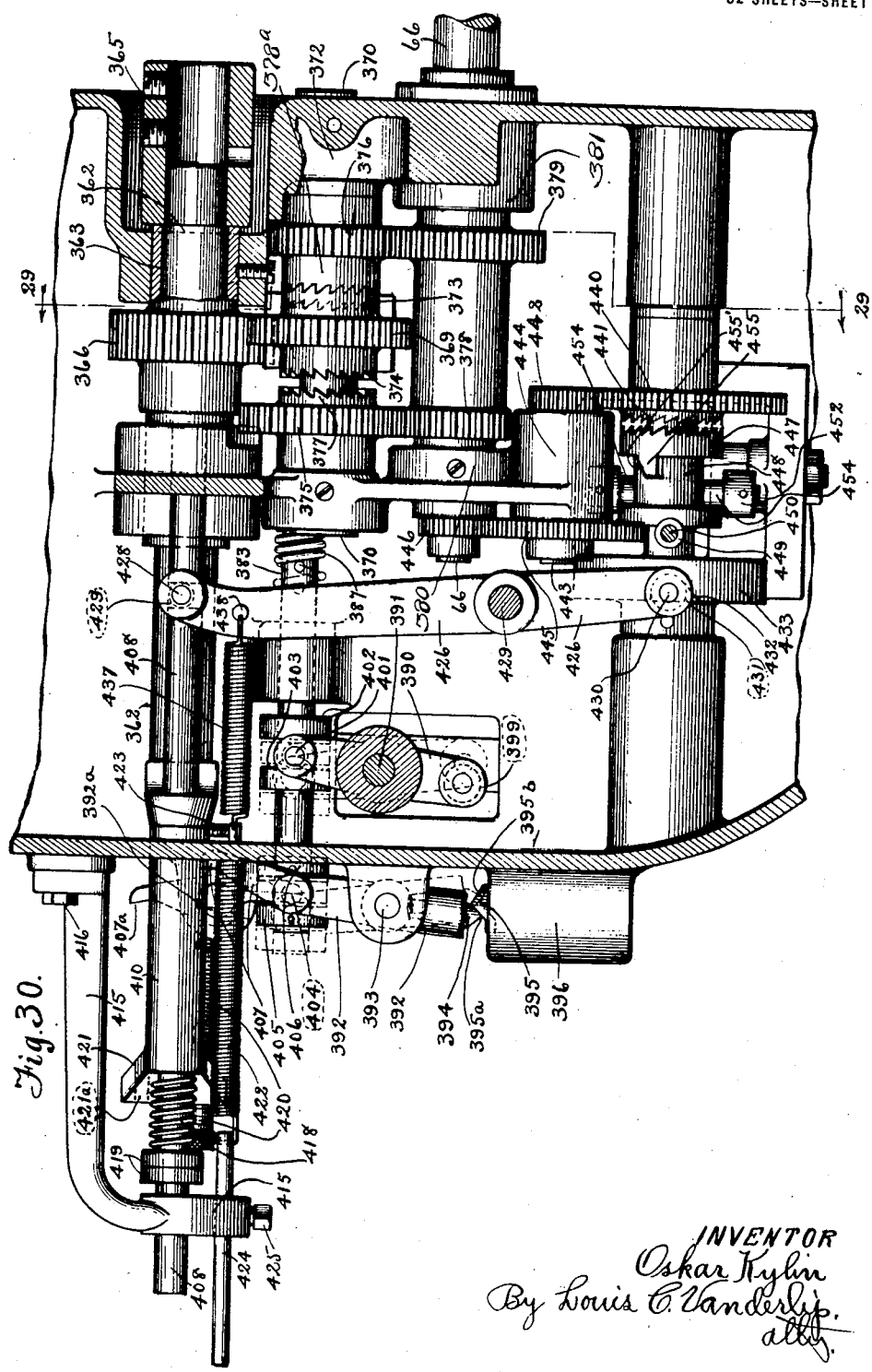

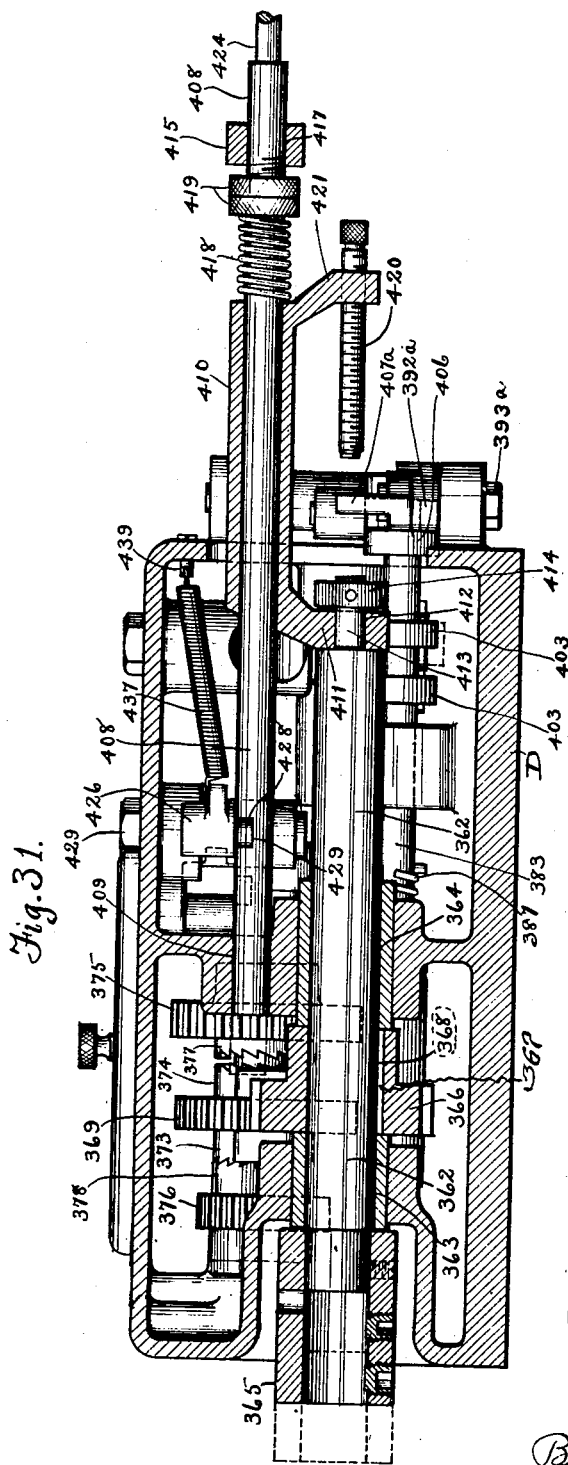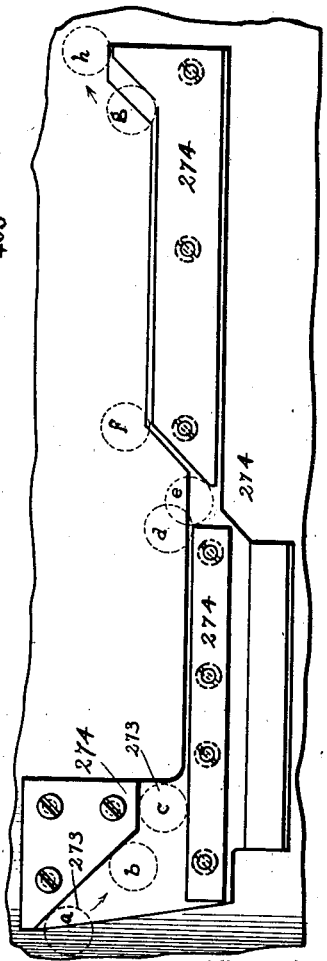

O. KYLIN.
AUTOMATIC LATHE.
APPLICATION FILED JUNE 27, 1918.
1,355,480.
Patented Oct. 12, 1920.
32 SHEETS—SHEET 22.
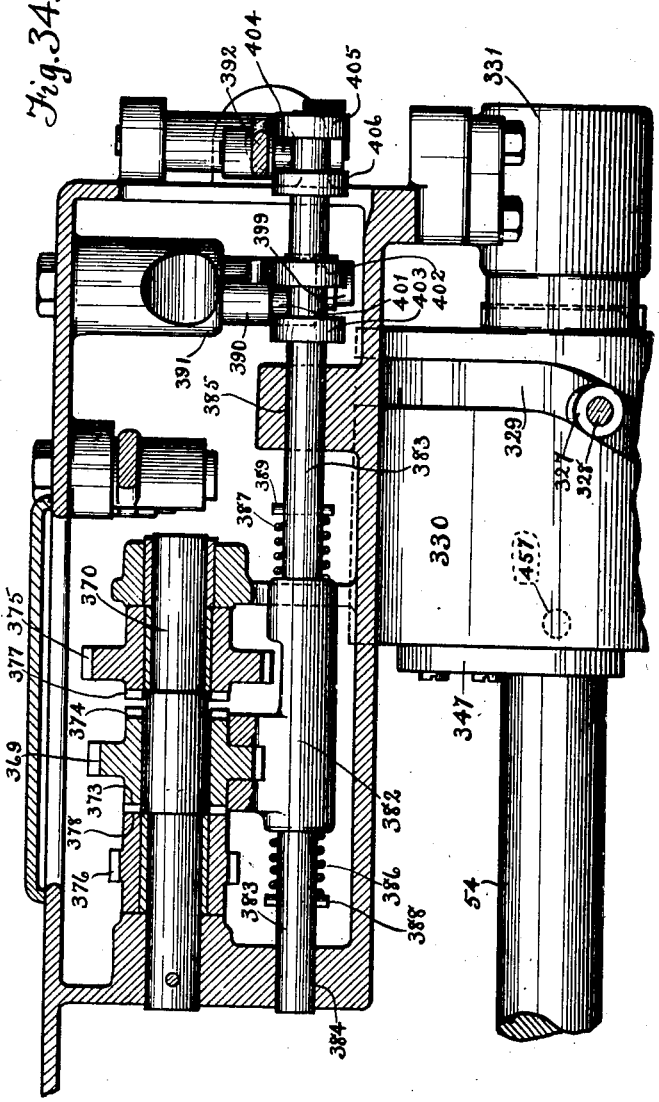
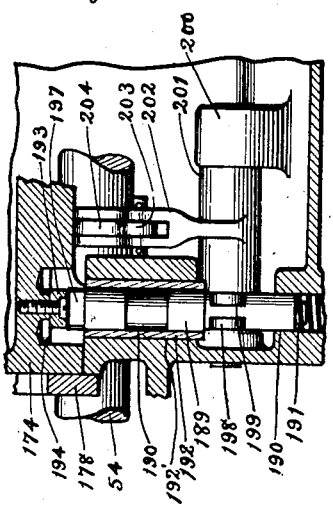
INVENTOR
Oskar Kylin
By Louis C. Vanderlip
Atty.

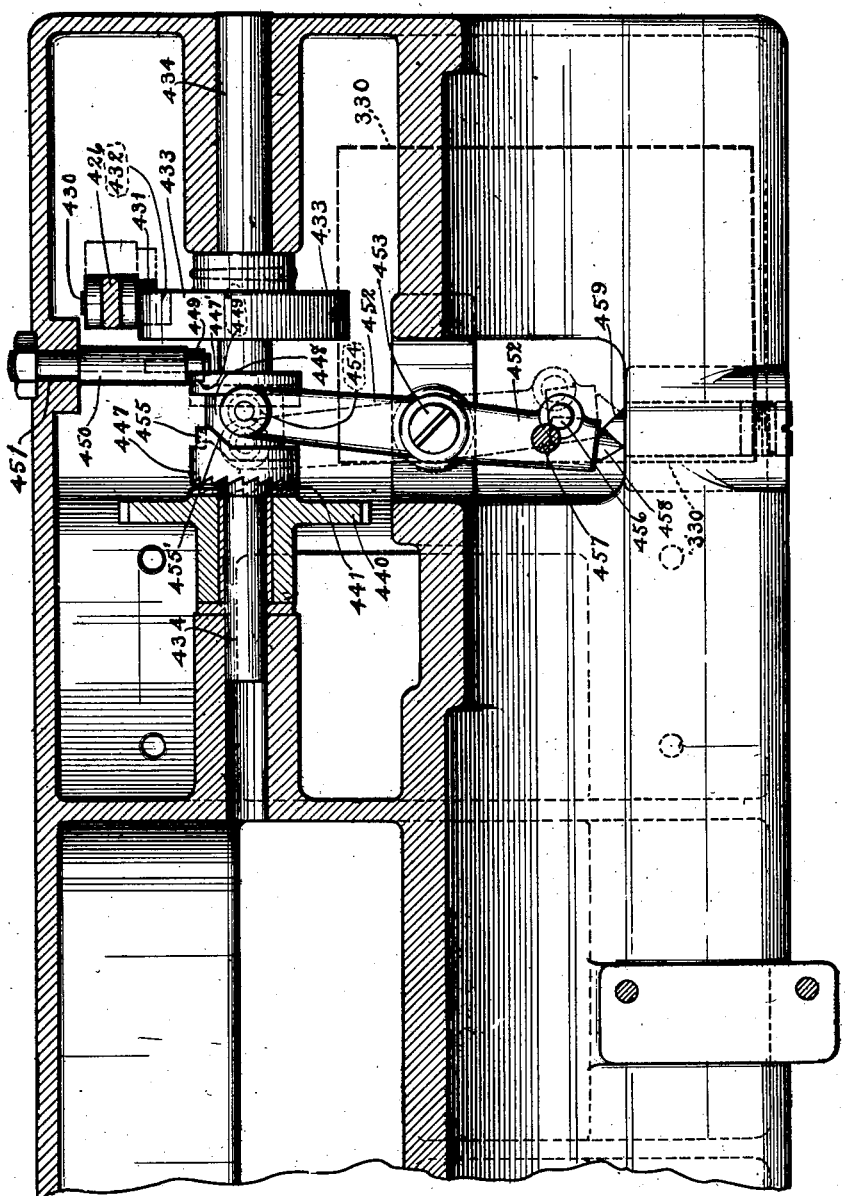

O. KYLIN.
AUTOMATIC LATHE.
APPLICATION FILED JUNE 27, 1918.

1,355,480.

Patented Oct. 12, 1920.
32 SHEETS—SHEET 24.

O. KYLIN.
AUTOMATIC LATHE.
APPLICATION FILED JUNE 27, 1918.

1,355,480.

Patented Oct. 12, 1920.
32 SHEETS—SHEET 25.

Fig. 38.

INVENTOR
Oskar Kylin
By Louis C. Vanderlip
atty.

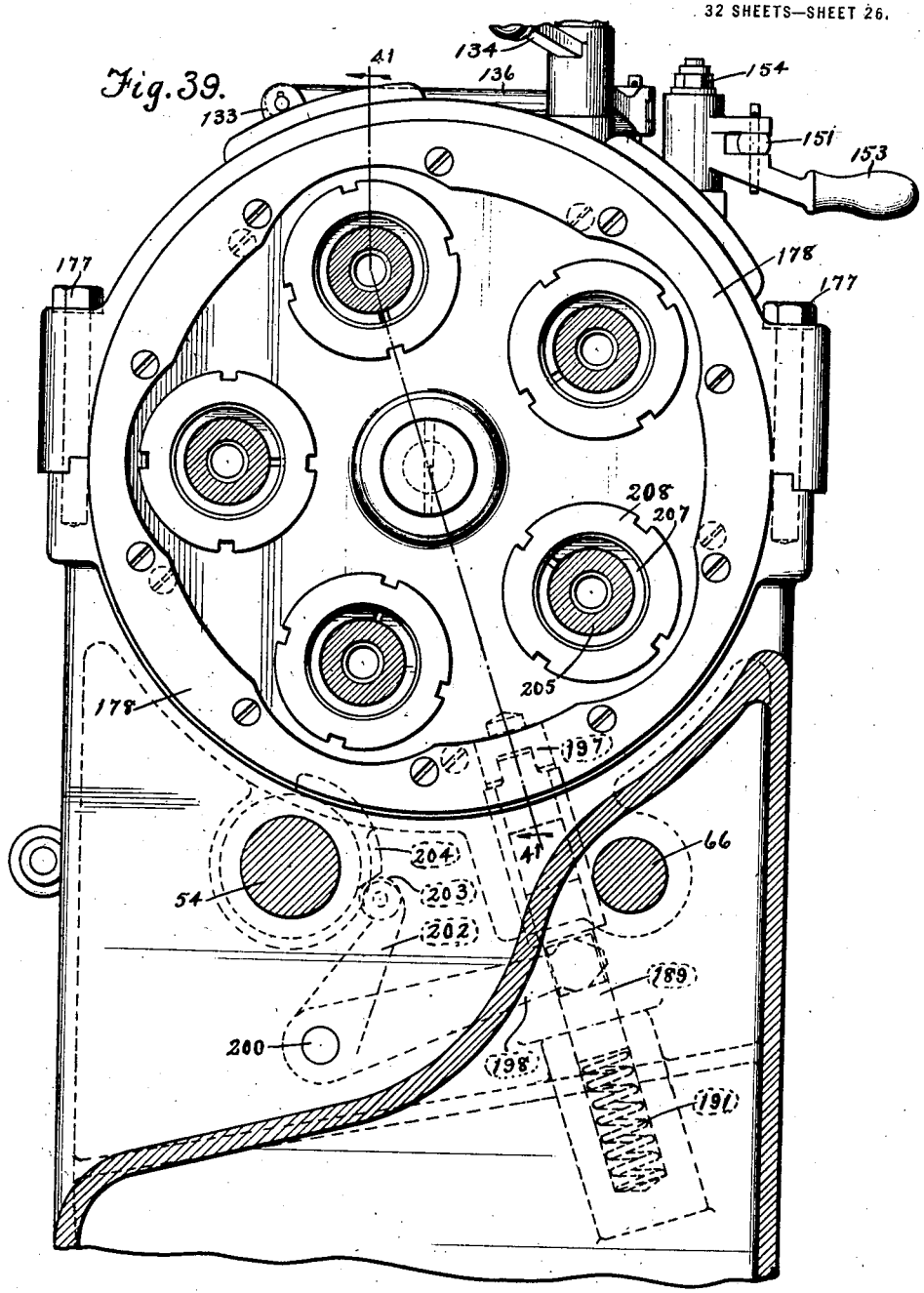

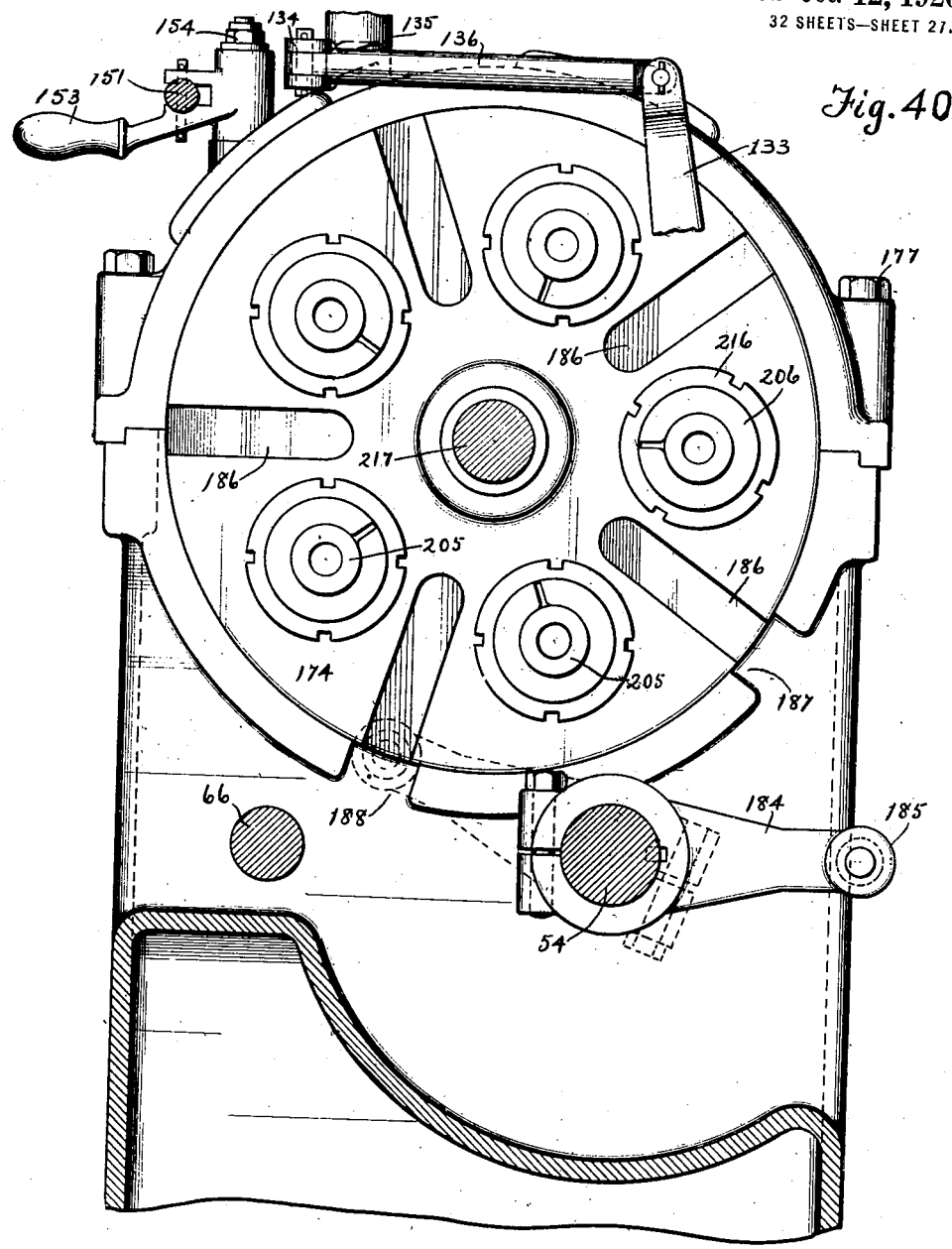

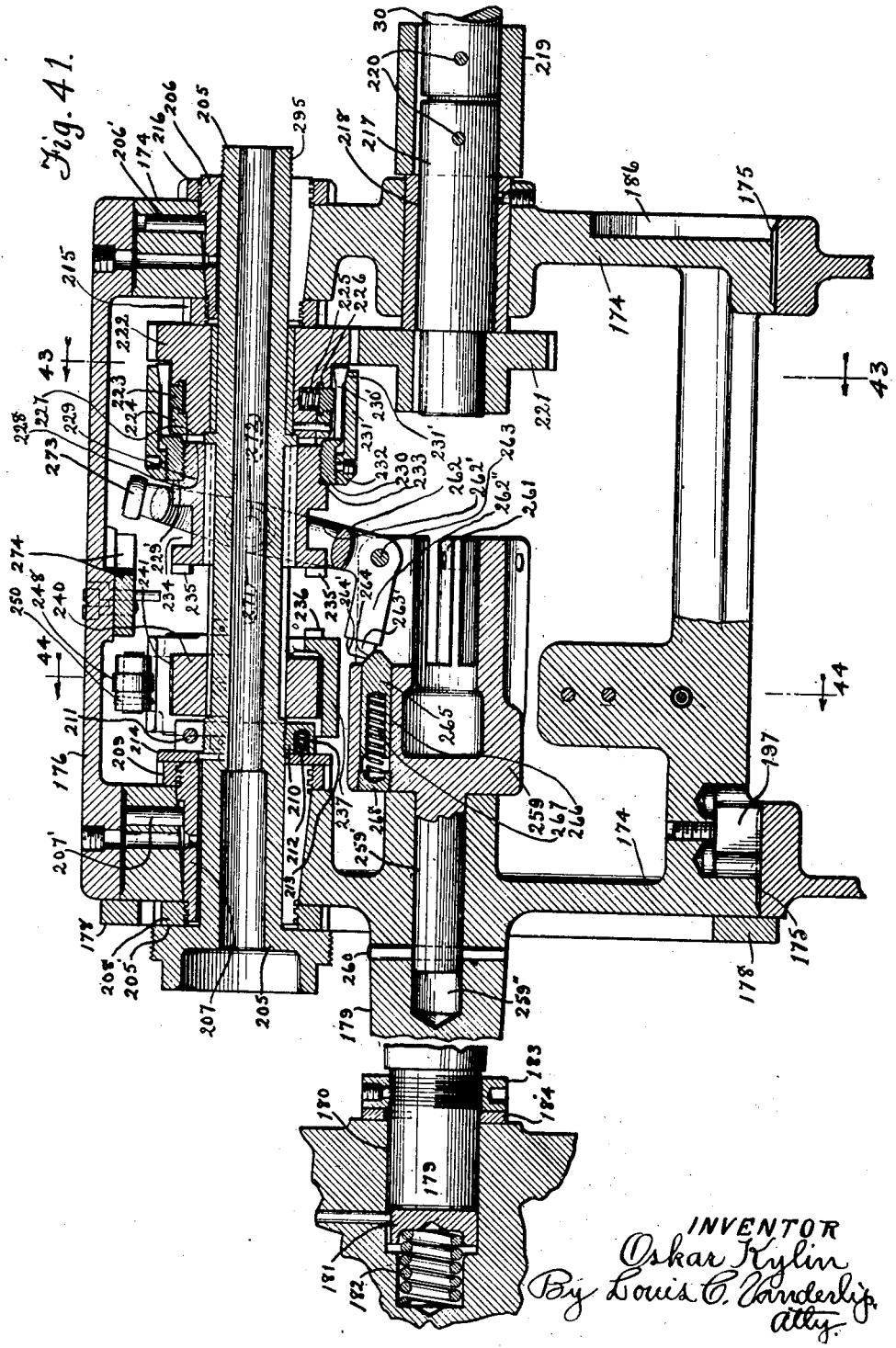

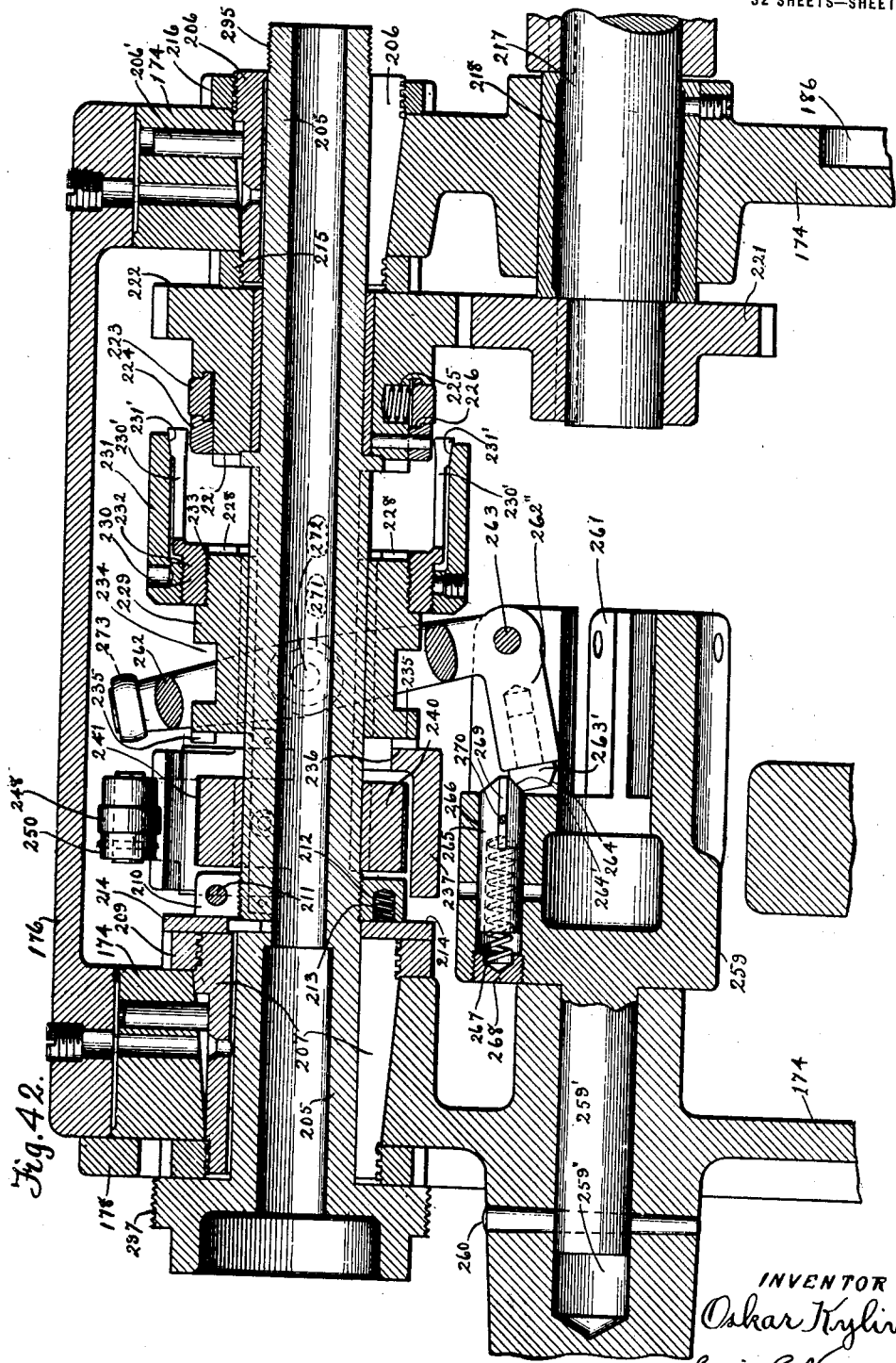

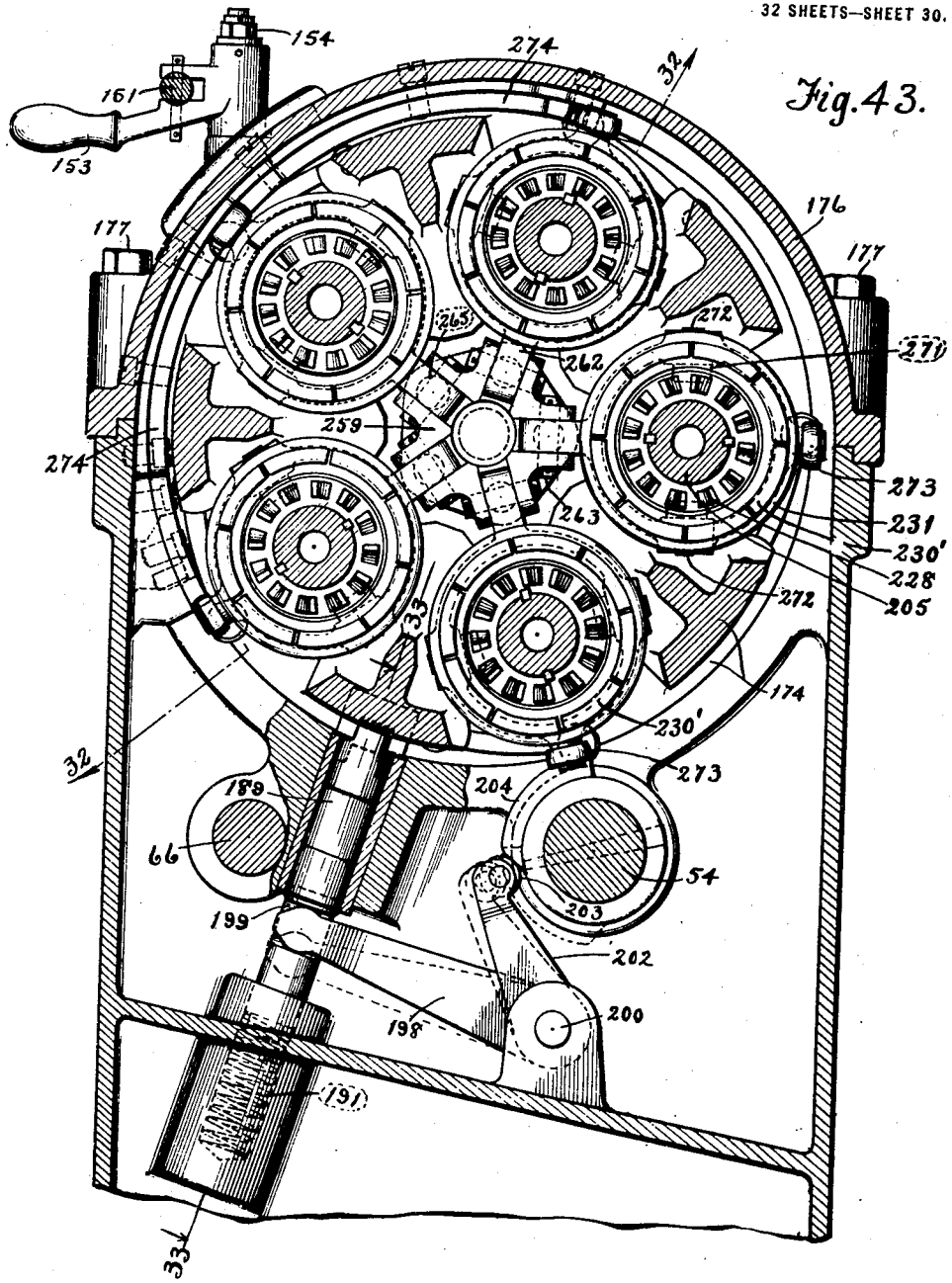

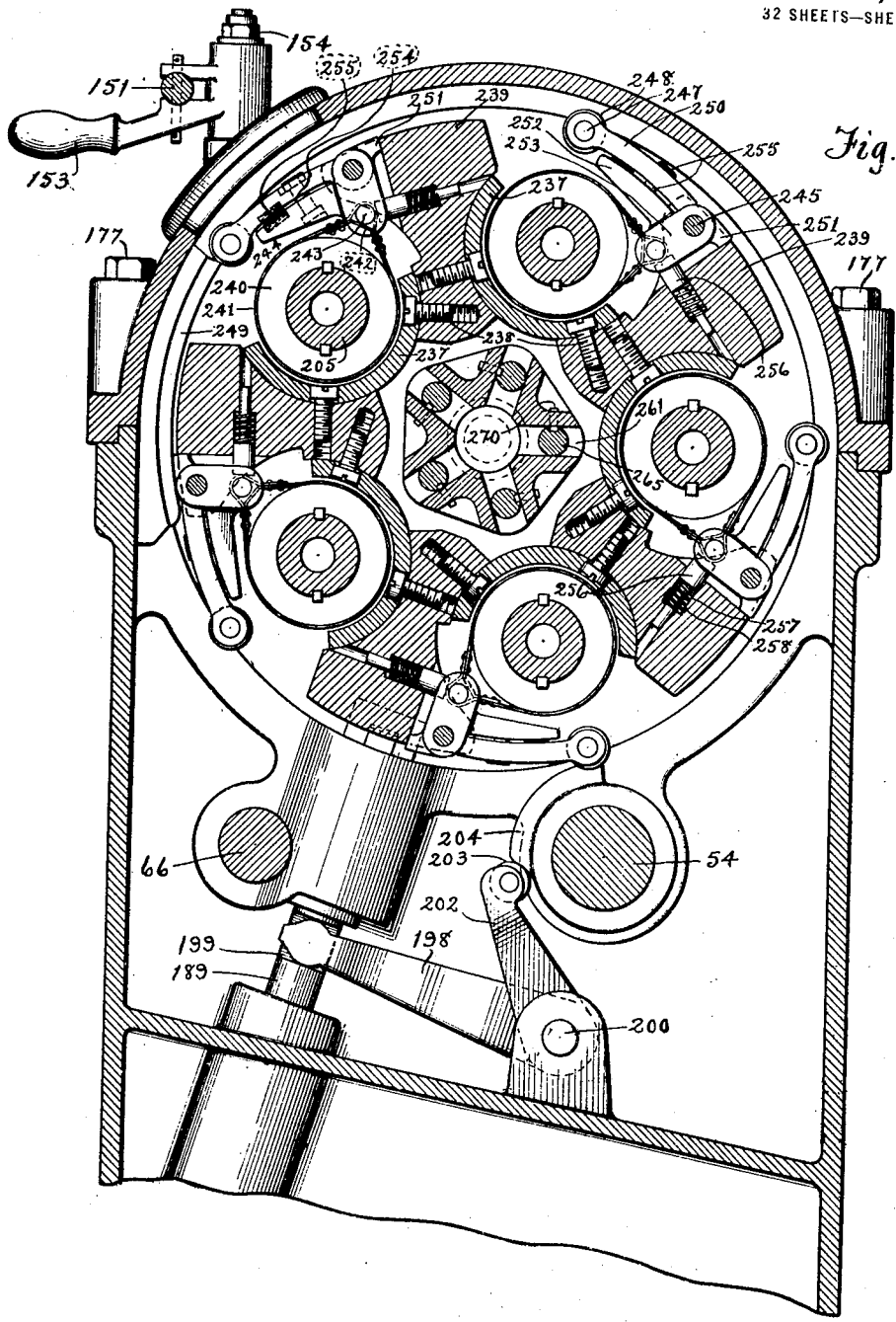

O. KYLIN.
AUTOMATIC LATHE.
APPLICATION FILED JUNE 27, 1918.
1,355,480.
Patented Oct. 12, 1920.
32 SHEETS—SHEET 32.
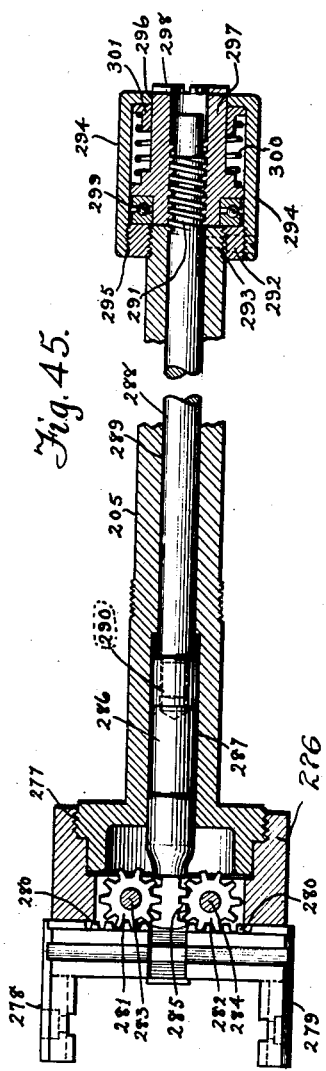
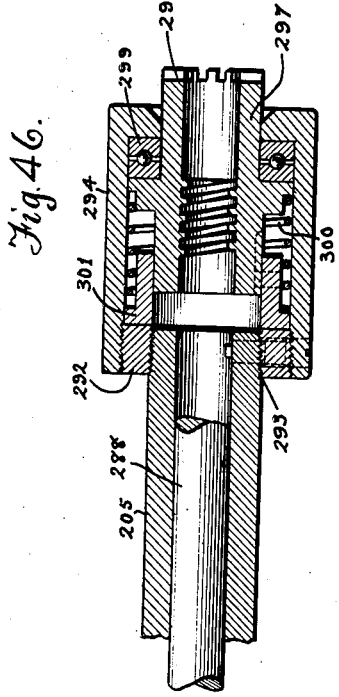
INVENTOR.
Oskar Kylin
By Louis C. Vanderlip.
Atty.

UNITED STATES PATENT OFFICE.

OSKAR KYLIN, OF ELKHART, INDIANA, ASSIGNOR TO FOSTER MACHINE COMPANY, OF ELKHART, INDIANA, A CORPORATION OF INDIANA.

AUTOMATIC LATHE.

1,355,480.      Specification of Letters Patent.      Patented Oct. 12, 1920.

Application filed June 27, 1918. Serial No. 242,267.

*To all whom it may concern:*

Be it known that I, OSKAR KYLIN, a citizen of the United States, and resident of the city of Elkhart, county of Elkhart, and State of Indiana, have invented certain new and useful Improvements in Automatic Lathes, of which the following is a full, clear, and exact specification.

This invention relates to automatic lathes and more especially to the type of automatic lathe in which a plurality of work carrying spindles is incorporated.

My invention comprehends many improvements in existing forms of multiple spindle lathes, these improvements being made with the view of increasing the capacity and improving on the quality of the product thereof. In general, the complete machine includes five units, viz: the gear box; the spindle carrier; the threading mechanism; the longitudinally movable tool carrier; and the transversely movable tool carrier, each of said units having incorporated therein, or in connection therewith, numerous improvements in the types of multispindle lathes now in use.

The gear box unit incorporates the following objects of invention, viz: means for driving the work carrying spindles in the spindle carrier unit; means for varying the speed of the spindles to correspond with work of various dimensions and characters; means for driving the tool carrier units and varying the speeds thereof; means for driving the cam shaft alternately at, first, a high constant speed, and then, second, at a low variable speed, the object of the former speed being to rapidly index the spindle carrier, for rapidly actuating the tool carriers on the return, or idle, movements thereof. And the object of the low variable speed of said cam shaft is the production of the proper and desired working speed in accordance with the dimensions and the character of the work subject to tool action by the tool carrier units. The gear box unit includes also the following objects of invention, viz: automatic means for changing from slow to high cam shaft speed, and vice versa; adjustable automatic means for timing the operation of the cam shaft speed changes according to the requirements consistent with the character of the work; flexible means for closing the jaws of the work carrying chucks when indexed to the loading position, the tension of the flexibility thereof being adjustable; means for manually operating and controlling the chuck jaw movements, and positive means for opening the chuck jaws. Other objects of invention embodied in and connected with the gear box unit will be mentioned and described hereinafter from time to time.

The spindle carrier unit incorporates the following objects of invention, viz: clutch controlled and actuated means for rigidly gripping the stock or work during the machining thereof; means for intermittently indexing the spindle carrier and accurately registering it at the different stations; flexible, or yieldable, means for starting and accelerating the speed of each spindle while being indexed from the loading to the first cutting position; means for positively driving each spindle after attainment of the full working speed; flexible or yieldable means for retarding the speed of each spindle as it is being indexed from the last cutting position to the loading position; means for positively locking each spindle in the loading position to prevent rotation thereof while the chuck jaws are being opened and closed; and means for synchronizing the movement of the spindle operating clutches with the indexing of the spindle carrier. Objects of invention incorporated in said spindle carrier unit, other than the foregoing, will be mentioned and described hereinafter from time to time.

The threading mechanism unit incorporates the following objects of invention, viz: means for executing internal and external thread cutting, both right and left hand effects; means for forwardly moving the threading spindle to enable the threading tool to engage the stock or work, and to time this forward movement of the threading spindle correctly in relation to the movements of the tool carrier units; means for yieldingly holding the threading tool against the stock or work until the thread is started and has cut deep enough to enable it to feed itself to complete the thread; means for changing the speed of the threading spindle at the beginning and the end of a thread cutting operation, the speed change at the completion of the thread being effected to back the threading tool out of the work and again bring the spindle into the proper position and speed for performing the thread cutting operation on the next piece of work. Other objects of invention embodied in and connected with the threading mechanism unit will be mentioned and described hereinafter from time to time.

The tool carrier units incorporate the following objects of invention, viz: mechanism for driving same; means for rigidly holding and supporting cutting tools; means to enable the carriage of the largest possible number of tools for simultaneous use; means for suspending and supporting the tool carriers, especially the longitudinally movable carrier, in a manner to facilitate production to the highest degree, by rigidity of the mount and the flexibility of control; and means for effecting rapid return movement of the tool carriers on the idle movement thereof. Other objects of invention embodied in and connected with the tool carriers will be mentioned and described hereinafter from time to time.

While the annexed drawings and the descriptive matter set forth in detail contain the preferred embodiment of my invention, such disclosed mechanism constitutes but one of various mechanical means in which the principle of my invention may be embodied and in which substantially similar results may be obtained.

Figure 2:
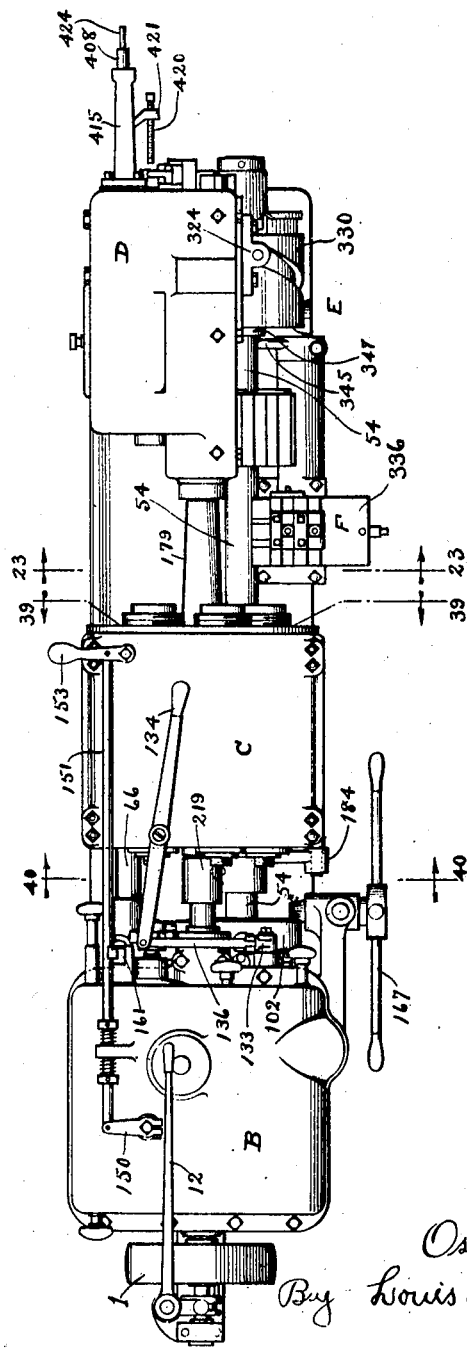
Figure 29:
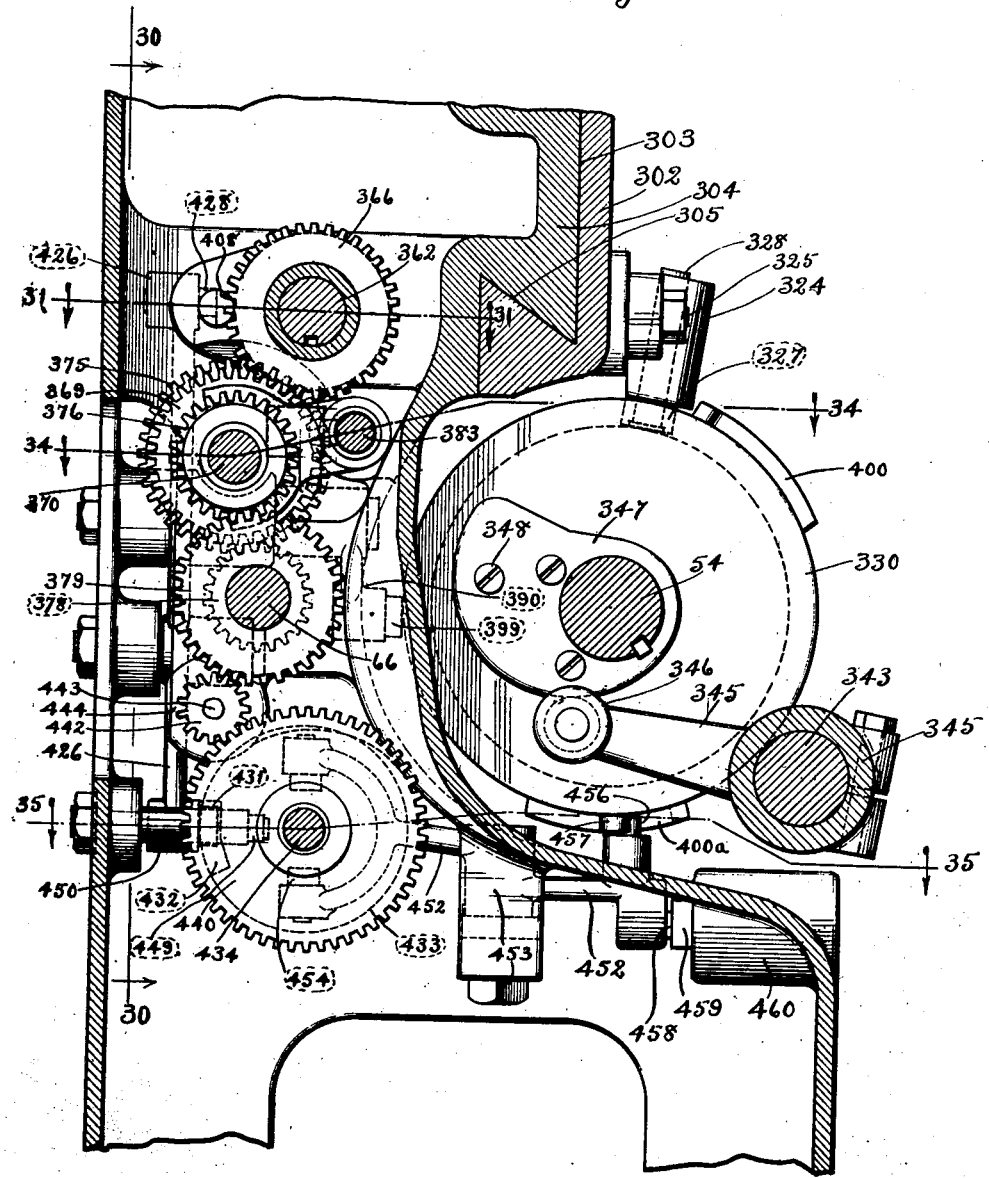
Figure 36:
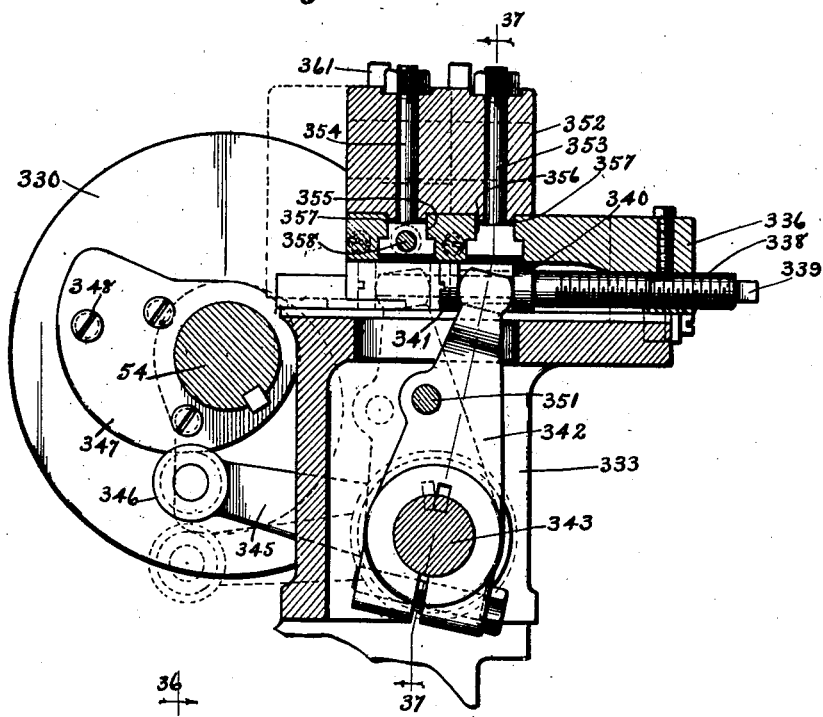
Figure 37:
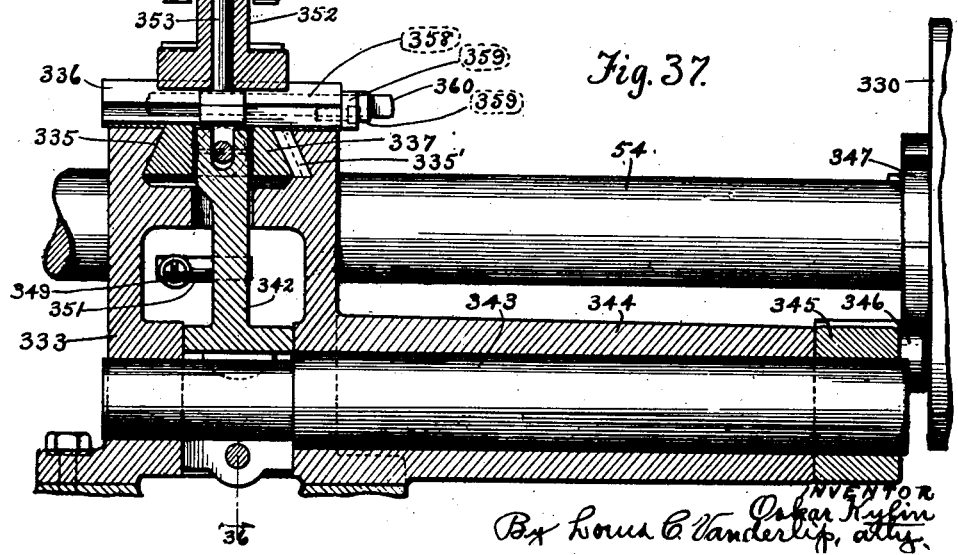

In the annexed drawings: Figure 1 indicates a side elevation of a multiple spindle lathe embodying my several improvements, the view being one obtained in looking at the front of the machine, the front of the machine being that side on which the operator stands; Fig. 2 represents a plan view of the lathe; Fig. 3 represents a side elevation of the lathe on the side opposite to that on which the machine operator stands; Fig. 4 represents an end view in elevation looking at the tool carrier and threading mechanism units; Fig. 5 represents an end view of the machine in elevation looking at the gear box unit and the main driving pulley; Fig. 6 represents a section on the line 6—6 of Fig. 1 taken between the gear box and spindle carrier units, disclosing the timing drum, shifting levers, &c.; Fig. 7 represents a side elevation of the gear box unit only, the casing of which is cut away to disclose the gear shifting rods, certain other members, levers and connections being also disclosed therein; Fig. 8 is a section taken on the line 8—8 of Fig. 6 through the gear box unit; Fig. 9 is a section taken on the line 9—9 of Fig. 8 showing the sides of various driving gears, the worm gears, &c.; Fig. 10 is a section taken on the line 10—10 of Fig. 8 disclosing the safety mechanism and various shifting devices; Fig. 11 is a section taken on the line 11—11 of Fig. 8 showing the clutch controlling the chuck jaw operation, and various gears; Fig. 12 is a section taken on the line 12—12 of Fig. 9 showing the mechanism controlling the opening and closing of the chuck jaws; Fig. 13 is a fragment in section taken on the line 13—13 of Fig. 10 showing a gear shifting rod details; Fig. 14 is a section taken on the line 14—14 of Fig. 6 in a horizontal plane, disclosing gearing, shafts, &c.; Fig. 15 is a section taken on the line 15—15 of Fig. 6 in a horizontal plane, disclosing the worm gear, the main cam shaft, the main feed clutch, timing drum, and gears; Fig. 16 is a fragment showing details of the hand operating mechanism; Fig. 17 is a fragment showing certain details of the safety mechanism such as the dog on the timing drum, the end of the oscillatory lever which carries the safety plunger, and the bottom of the lever actuated by said plunger; Fig. 18 is a detail plan view in section on the line 18—18 of Fig. 6 showing the arrangement of the safety mechanism lever, the main feed clutch shifting lever, the timing drum, and the dogs on the timing drum for operating the clutch shifting lever; Fig. 19 is a detail of the safety stop mechanism; Fig. 20 is a change position of the members shown in Fig. 19; Fig. 21 is a fragmentary view in section on the line 21—21 of Fig. 19 showing the pin and slot of the safety stop mechanism; Fig. 22 is a fragmentary view in section taken on the line 22—22 of Fig. 6 showing details of the safety stop mechanism; Fig. 23 is a section taken on the line 23—23 between the spindle carrier and the tool carrier looking toward the latter, same being taken from Fig. 2; Fig. 24 is a side elevation of both tool carriers showing the end of the cam shaft, the cam drum and its connection with the longitudinal tool carrier; Fig. 25 is a detail showing the cam carried by the main cam drum for operating certain levers embodied in the threading mechanism unit, same being a section on the line 25—25 of Fig. 26; Fig. 26 is a view in elevation showing the cam carried by the main cam drum disclosed in Fig. 25; Fig. 27 is another cam carried by the main cam drum for operating certain members in the threading mechanism unit and represents a section taken on the line 27—27 of Fig. 28; Fig. 28 is a view in elevation showing the cam and the end of a threading mechanism lever operated thereby described under the brief description of Fig. 27; Fig. 29 is an end section taken on the line 29—29 through the threading mechanism unit of Fig. 30; Fig. 30 is a back elevation in section taken on the line 30—30 of Fig. 29 showing the threading mechanism details and the position and shape of the members used for right hand threading; Fig. 31 is a horizontal section through Fig. 29 taken on the line 31—31 showing threading mechanism details; Fig. 32 is a section through Fig. 43 of the spindle carrier and taken on the line 32—32 thereof showing the face cam development for the operation of the main clutch in the spindle carrier from the cutting to the threading position; Fig. 33 is a fragmentary detail taken on the line 33—33 of Fig. 43 showing locking mechanism of the spindle carrier; Fig. 34 is a horizontal section taken on the line 34—34 of Fig. 29 showing mechanism for shifting the geared driving clutch in the threading mechanism; Fig. 35 is a horizontal section taken on line 35—35 of the Fig. 29 showing the mechanism for timing the forward movement of the threading spindle including the dog carried on the main cam drum for oscillating the clutch shifter lever; Fig. 36 is a fragment showing details of the transverse tool carrier taken on the line 36—36 of Fig. 37 and disclosing the end of the main cam drum and the cam carried thereby for operating the tool carrier; Fig. 37 is a section taken on the line 37—37 of Fig. 36 showing details of the transverse tool carrier; Fig. 38 is a section through the threading mechanism unit in which the necessary members are introduced and properly arranged for left hand threading operation; Fig. 39 is a section through Fig. 2 taken on the line 39—39 showing the chuck end of the spindle carrier unit; Fig. 40 is a section taken on the line 40—40 of Fig. 2 showing the Geneva motion mechanism for indexing the spindle carrier; Fig. 41 is a section taken on the line 41—41 of Fig. 39 showing the spindle carrier, the work carrying spindle, the spindle driving mechanism, the clutch control, the cam for operating the clutch, and other details, and disclosing also the engagement of the positive clutches for driving the spindle for cutting tool engagement with the work carried thereby; Fig. 42 is a change position of the work carrying spindle driving mechanism in which the positive clutches are engaged for preventing spindle rotation while the spindle is positioned in the loading position; Fig. 43 is a section taken on the line 43—43 of Fig. 41 showing the clutches, the clutch shifting levers, the cam for operating the clutch levers, the spindle carrier locking device, and other parts; Fig. 44 is a section taken on the line 44—44 of Fig. 41 showing the band brake mechanism and cam for operating same for retarding the speed of the work carrying spindle as it is being indexed to the loading position; Fig. 45 is a section through a spindle carrying the chuck jaws, the jaw operating parts, for a device which holds the work by contraction gripping of the chuck jaws; and Fig. 46 is a section of a fragment of a work carrying spindle showing the mechanism used for expanding the chuck jaws when the jaw expansion method is used for gripping the work carried by said chuck.

On the drawings, the letter "A" indicates the lathe bed or main frame; the letter "B" indicates the gear box unit; the letter "C" the spindle carrier unit; the letter "D," the threading mechanism unit; the letter "E," the longitudinally movable tool carrier unit; and the letter "F," the transversely movable tool carrier unit.

Gear box.

The numeral 1 indicates the main driving pulley revolubly mounted on the main driving shaft 2 which is journaled in the gear box at 3, 4, respectively, and is adapted to be engaged by an expanding ring friction clutch 5 carried by the hub member 6 rigidly fastened to the driving shaft 2. The split friction ring 5 is expanded by means of a pin 7 having a wedge shaped end 8, said pin 7 being actuated radially by a wedge member 9 rigidly carried upon a spool or collar 10 which is slidably mounted upon the shaft 2 and adapted to be actuated back and forth thereon by the shifter collar 11 and the hand lever 12. The outer end of the shaft 2 is journaled in a bearing 13 carried by the bracket 14.

The main drive shaft 2 carries three change speed driving gears 15, 16 and 17, respectively, rigidly mounted thereon and adapted to mesh respectively, with the three gear sliding cluster 18, 19 and 20, slidably mounted upon the front shaft 21 which is journaled in the gear box at 22 and 23, respectively. At the opposite end of the front shaft 21 a second three gear sliding cluster composed of gears 24, 25 and 26 respectively, is slidably mounted thereon and adapted to mesh, respectively, with the three gears 27, 28 and 29 rigidly mounted upon the gear box end of the spindle driving shaft 30 journaled at 4 and 31 in said gear box and adapted to be driven by said change speed gears at three different speeds. As will be hereinafter described the shaft 30, with its extension, projects into the spindle carrier, the adjoining unit of the machine, in which it is journaled and carries a spur gear 221 which simultaneously meshes with the five gears mounted upon the five work carrying spindles.

A shifter rod 18' slidably mounted in the gear box, provided with a knob 18" and suitably transversely slotted to engage the gear 19 is provided for manually shifting the three gear sliding cluster 18, 19 and 20. And a second shifter rod 24' slidably mounted in the gear box, provided with a knob 24" and suitably transversely slotted to engage gear 24, is provided for manually shifting the three gear sliding cluster 24, 25 and 26.

The spindle driving shaft 30 carries also a two gear sliding cluster composed of gears 32 and 33 slidably mounted on said shaft 30, being splined thereto, and adapted to be actuated back and forth thereon for meshing with and driving the two gears 34 and 35 rigidly mounted upon the intermediate feed shaft 36 which is journaled in the gear box at 37 and 38, respectively. The gears 32 and 33 are adapted to drive the cam drum shaft through a train of gears, as hereinafter described, for effecting variable speeds of said cam drum shaft for the purposes hereinafter described. A gear shifter rod 32' slidably mounted in the gear box, provided with the forked arm 32" engaging the gear 32, and provided also with a knob 33', is provided for manually shifting the sliding gear cluster 32 and 33.

The intermediate feed shaft 36 carries also two rigidly mounted gears 39 and 40, respectively. Adjacent the shaft 36 a worm shaft 41 is journaled in the bearings 42 and 43 and upon which a driving three gear cluster, composed of gears 44, 45 and 46, is slidably mounted and adapted to be shifted back and forth thereon for meshing with the three gears 40, 39 and 34 carried on said shaft 36. A shifter rod 45' slidably mounted in the gear box, provided with a knob 45" and suitably transversely slotted to engage the gear 45, is provided for manually shifting the three gear cluster 44, 45 and 46 on shaft 41.

The shaft 41 carries also a gear 47 rigidly mounted thereon and meshing with and driving the gear 48 rigidly mounted upon an upright shaft 49 journaled at its extremities in bearings 50 and 51 within the gear box. A second worm gear 52 is rigidly mounted upon and adjacent the lower end of the upright shaft 49 and meshes with the worm wheel 53 revolubly mounted upon the cam drum shaft 54, the latter projecting from the gear box and extending therefrom to the opposite end of the lathe, for the purposes hereinafter described.

The worm wheel 53 carries a tooth clutch ring member 55 rigidly secured to one side thereof by members 56 and is adapted to be engaged by a tooth clutch member 57 splined to the cam shaft 54 and provided with the groove 58 adapted to be engaged by a shifter fork, as hereinafter described. The hub of the clutch member 57 is provided also with the tooth clutch 59 adapted to engage a tooth clutch 60 carried by the hub of a spur gear 61 revolubly mounted upon the cam shaft 54 and driven at a constant speed from the main driving shaft 2 through a train of intermediate gears, said gear train comprising the gear 62 rigidly mounted upon the drive shaft 2 and meshing with the large gear 63 rigidly mounted upon the intermediate shaft 64, and the pinion gear 65 rigidly mounted upon said shaft 64, the latter meshing with said clutch gear 61.

When clutches 59 and 60 are engaged the cam shaft 54 is rotated and driven by said gear train at a high constant speed alternating with a lower variable speed thereof when clutches 55 and 57 are engaged, said lower variable speed thereof being effected through the worm shaft 41 and the train of change speed gears hereinbefore described by which said shaft 41 is driven. It is therefore evident that the cam shaft 54 may be driven at a high constant speed, for the purposes hereinafter described, alternating with any one of three lower speeds the latter being used when stock carried by the chucks is being operated upon, the cam shaft speed being varied according to the dimensions and character of the work. It is also evident that the spindle driving shaft 30 may be driven at any one of three different speeds to meet the difference in dimensions and the character of the work to be operated upon. See Figs. 7, 8, 9, 10, 11, 12, 14, and 15 for the details of the foregoing described mechanism.

The gear box unit contains also a shaft 66, journaled at 67, which projects into the lower part of the gear box and upon which is rigidly mounted a gear 68 driven by a pair of idler gears 69 and 71, mounted upon shafts 70 and 70', respectively, said idler gear 69 meshing with the gear 28 rigidly mounted upon the spindle driving shaft 30, as heretofore described. The shaft 66 extends forward from the gear box through the machine bed beneath the spindle carrier unit C into unit D, the threading mechanism, for driving the latter, and it is adapted to be driven at three different speeds to meet the varying requirements of work dimensions and the character thereof. See Figs. 14 and 15 and 30.

*Gear box continued.—Chuck jaw actuation mechanism.*

Arranged above and somewhat between the shafts 2 and 21 is the shaft 72 journaled in the gear box at 73 and 74 and projecting somewhat beyond the former journal, which shaft projection carries the spur gear 75 rigidly mounted thereon, said gear 75 meshing with a gear 76 which is rigidly mounted on the stub shaft 76' journaled in the gear box at 77. The stub shaft 76' projects to the exterior of the gear box, upon the outer end of which is mounted the tooth clutch member 78 splined thereto, the latter being provided with a clutch shifter groove 79 adapted to be engaged by a shifter lever roller carried by the lever 118 for shifting said clutch backward and forward, as hereinafter described, into and out of engagement with a tooth clutch member 297. See Figs. 12, 6 and 45.

The shaft 72 is adapted to be rotated either way, in one direction for opening the chuck jaws, and the reverse direction for closing the chuck jaws, by the mechanism and gears hereinafter described. The numeral 80 indicates a spur gear revolubly mounted on the shaft 72 and provided with the tooth clutch 80'. The numeral 81 indicates a clutch member splined to the shaft 72 and provided with the tooth clutches 81' and 81'', and provided also with a shifter groove 82 adapted to be engaged by the shifter lever rollers 147 carried by the lever 146, for shifting said clutch, as hereinafter described. See Figs. 11 and 12.

The numeral 83 indicates a clutch sleeve revolubly mounted upon the shaft 72 and upon which is mounted a multiple disk clutch composed of the casing 84 provided with the external spur gear 85; the disks 86, 86; the thrust collar 87; the thrust spring 88; and the collar 89 against which said spring is seated. The sleeve 83 is screw threaded to carry the collar 89, whereby the tension of the clutch spring 88 may be regulated, and is provided also with an annular enlargement, or flange, 90 which functions as the seat for the disks 86, 86. The numeral 91 indicates a tooth clutch carried on the flange 90 of the sleeve 83 and adapted to be periodically engaged by the tooth clutch 81''.

The numeral 92 indicates a shaft journaled in the gear box at 93 and 94 intermediate shafts 2 and 72 and carrying the rigidly mounted spur pinion 95 meshing with the spur gear 85 carried on casing 84. See Fig. 13. The shaft 92 carries also a spur gear 96 rigidly mounted thereon and meshing with the spur pinion 62 rigidly carried upon the main driving shaft 2. Adjacent gear 96 another spur pinion 97 is rigidly carried on shaft 92 and meshing with the spur gear 17 carried on shaft 2 and by which it is driven. When clutches 85'' and 91 are engaged the shaft 72 is rotated through the gear train described for closing the chuck jaws, the effect thereof being yieldable by virtue of the interposition of the disk clutch described, the disks of which slip before the engagement becomes positive.

A second gear train composed of the idler spur gear 98 carried on the shaft 99 and meshing with both gears 97, on shaft 92, and gear 80, on shaft 72, reversely rotates the shaft 72 when tooth clutches 80' and 81' are engaged, for positively opening the chuck jaws. The shaft 99 is journaled in the gear box at 100 and 101. See Fig. 13.

*Hand control for chuck jaw clutch 81.*
See Figs. 11, 12, 6, 7, 10, and 43.

The numeral 146 indicates a shifter fork provided with the rollers 147, 147 mounted upon pins (not shown) and oppositely arranged within the groove 82 of the compound clutch 81. The fork 146 is provided with a hub member which is rigidly mounted upon the lower end of the short upright shaft 148 journaled in the bearing 149 carried by the gear box cover, said shaft being adapted, when partially rotated, to oscillate the fork 146 and thereby shift the clutch 81. A forked lever 150 is rigidly mounted upon the upper end of the shaft 148 exteriorly of the gear box, to the forked end of which a rod 151 is connected by the pin 152, said rod being connected with and longitudinally operative by, a hand lever 153, the latter being pivotally anchored at 154 exteriorly of the casing of the spindle carrier unit. The rod 151 is supported in a suitable bearing aperture formed in the boss 155 carried on the gear box cover, and is provided with adjustable collars 156 and 157 which are arranged on opposite sides of said boss and adapted to serve as seats for the coil springs 158 and 159 carried on said rod and adapted to bear against each side of said boss 155 with substantially even tension, said collars carrying the set screws 156' and 157', respectively, whereby the clutch 81 is normally positioned intermediate clutches 81' and clutch 91 (otherwise, a neutral position). The movement of lever 153 is necessary to engage clutch member 81 with either of said driven clutches for opening or closing the chuck jaws, it is evident. Intermediate its extremities the rod 151 is transversely slotted in a vertical plane at 160 within which slot the upper end of the oscillatory lever 161 is arranged with some play therein, said lever 161 being connected with the safety lever 140 as hereinafter described, for automatically operating the safety mechanism, as hereinafter described. See Fig. 12.

*Mechanism for shifting main feed clutch 57.*

The numeral 102 indicates a cam and timing drum rigidly mounted upon the cam shaft 54 exteriorly of the gear box unit B, but adjacent thereto, the outer periphery of which carried two radially projecting dogs 103 and 104, respectively, the former being a fixed dog, and the latter being adjustably mounted in a slot 102' extending circumferentially of the drum periphery, said dogs being arranged in different radial planes. The numeral 105 indicates a lever pivoted on the gear box at 106 (see Fig. 18) intermediate its extremities, and provided, on its under side, intermediate its pivot point and one end thereof with a buffer pin 107 having the beveled faces 107' and 107'', respectively, adapted to be successively engaged by the dogs 103 and 104, respectively for oscillating said lever 105 back and forth in a horizontal plane. See also Fig. 6.

The numeral 108 indicates a laterally projecting pin rigidly carried by the lever 105 at one end thereof and arranged within a transverse slot 109 formed in a clutch shifter rod 110 slidably mounted in the gear box bearings 111 and 112, the end walls of said slot 109 being adapted to be engaged by said pin 108 when the latter is yieldingly impelled, as will be hereinafter described, for the longitudinal projection of the rod 110. See Figs. 18 and 22. The numeral 113 indicates a shifter fork rigidly mounted on one end of the rod 110 and having its fork engaging the clutch groove 58 of the main feed clutch 57. At the oposite end of the lever 105 a wedge pointed pin 114 is rigidly carried thereby, said pin being in constant engagement with a spring pressed wedge pointed plunger 115 which is movably mounted in a socket formed in the boss 116 carried on the gear box exterior. See Figs. 18 and 6. The lever pin 108 normally does not engage the end walls of the rod slot 109 but is projected into very close relation therewith when the lever 105 is oscillated either way by one of the dogs 103 and 104, and further lateral movement of said lever causes the pin 108 to engage the wall of said slot. Simultaneous with the oscillation of the lever 105 by either of said dogs, but at the latter end of the oscillatory movement thereof, the pin 114 having forced the plunger 115 backward, the point of pin 114 crosses and clears the point of said plunger by a slight degree. Whereupon a second oscillation of said lever 105 is effected by the outward pressure of the plunger 115 against the bevel face of pin 114, whereby said second oscillation of said lever is effected, thereby causing the pin 108 to engage the wall of the rod slot 109 and longitudinally move the shifter rod 110. On account of the various sizes and characters of the work to be operated upon it is necessary to vary the operative relation, or timing, between the dogs 103 and 104, and the latter is therefore made adjustable within the slot 102', whereby a variable actuation of the lever 105 by said dog 104 is effected, thereby affecting the timing of the engagement of the clutches 55 and 57. It is apparent, when dog 103 and plunger 115 have completed the oscillation of the lever 105, that the clutches 59 and 60 are in engagement and that the cam shaft 54 is then revolving at a high constant speed. And it is also apparent that the effect of the oscillation of the lever 105 by dog 104 and plunger 115 is the engagement of clutches 57 and 55, whereby the cam shaft 54 is rotated at a lower variable speed used for the tool operation.

*Mechanical shift of chuck jaw clutch 78.*

The cam drum 102 carries also a curved cam 117 (see Fig. 6) rigidly fastened to the outer periphery thereof and extending circumferentially thereof which cam is adapted to oscillate a lever 118 for actuating the tooth clutch 78, splined to shaft 76 as heretofore described, out of engagement with the clutch nut 297 carried by the spindle upon which the chuck jaws are mounted, as will be hereinafter described. The lever 118 is pivoted intermediate its extremities at 119 on the gear box exterior and is provided at one end with a roller 120, adapted to be engaged by the curved cam 117, and provided at its opposite end with a shifter fork 121. The numerals 122, 122 indicate rollers suitably rotatively mounted on the fork 121 and oppositely arranged within the clutch shifter groove 79 of the clutch 78. The numeral 123 indicates a coil spring anchored at one end to the gear box exterior and having its other end fastened to the lever 118 exerting draft thereon and adapted to retract said lever when freed from the actuation of the cam 117. When the roller 120 of lever 118 becomes disengaged with the cam 117 on the drum 102 the spring 123 retracts lever 118, thereby projecting clutch 78 into engagement with the clutch nut 297 which engagement continues until it is broken by the action of the cam 117 on the lever 118.

*Manually operative mechanism for stopping and starting the feed motions by actuation of the main feed clutch 57.*

When the lathe is in operation the movements of the main feed clutch 57 are automatic and regular, as heretofore described, except as they may be interrupted by the operator of the machine who may resort to the use and application of the following described mechanism which is designed to give the machine operator perfect hand control over said clutch, and thereby the machine, whereby the main feed motions are stopped and started by hand control. If the indexing of the spindle carried in unit C which is accomplished through the Geneva motion mechanism operated by the cam shaft 54, as hereinafter described, is due and about to occur before the operator has closed the chuck jaws on a fresh piece of stock at the loading position, it becomes necessary to delay the indexing of the spindle carrier in order that the operator may have more time to load the chuck with the fresh stock. This mechanism is apart from what is hereinafter described as the automatic safety mechanism, but the latter utilizes a part of the former to effect the movement of the clutch 57 and is designed to stop the feed motions in the event the machine operator fails to avail himself of the hand operative mechanism, about to be described, and starts to close the chuck jaws when the indexing of the spindle carrier is about to begin.

The numeral 113' indicates a laterally projecting hub member of the clutch shifter 113 which is rigidly mounted upon the shifter rod 110 said hub member carrying the laterally projecting and rigidly mounted pin 124, which pin projects somewhat from its mount. See Figs. 22, 19 and 20. The numeral 125 indicates a substantially triangular shaped cam recess, or slot, formed in the outer periphery of the shifter lever 126 and into which said pin 124 projects, said lever 126 being rigidly mounted upon one end of the rotatable shifter shaft 127 journaled within the bearing 128 in the gear box unit B. The pin 124 is susceptible of a variable arrangement within the cam recess 125, being adapted to occupy three different positions at different times, such positions being defined clearly in Fig. 21 as "$a$," "$b$," and "$c$," respectively, the position "$c$" being on one occupied when the clutch 57 is neutrally positioned. Normally, the pin 124 moves from position "$a$" to position "$b$" as the clutch 57 is shifted back. The numeral 129 indicates a dog rigidly mounted on an arm, or extension, 126' of the lever 126 and indented, or notched, at 130. Normally, the notched dog 129 is in detention by the wedge end of a spring pressed plunger 131 (see Fig. 19) carried in the socket 132 formed in the gear box body, or lathe bed, thereby enabling the free movement of the pin 124 from "$a$" to "$b$" in said slot 125, and the return thereof.

The numeral 133 indicates a lever rigidly mounted upon the outer end of the shaft 127 and adapted, when oscillated, to slightly rotate said shaft for disengaging the notched dog 129 from the detent spring pressed plunger 131, said lever being under the manual control of the operator through the hand lever 134 which is pivoted at 135 on the spindle carrier cover and the transverse link 136 operatively connecting said hand lever with the oscillatory lever 133. A partial rotation of the shaft 127 disengages dog 129 from the detent plunger 131. Thereupon the beveled face of the plunger 131 bears yieldingly outward against the beveled face 137 of the dog 129, thereby causing a slight rotation of the shaft 127 and a consequent slight oscillation of the lever 126, whereby the pin 124 is forced into position "$c$" of the cam slot 125 and locked therein, and whereby the clutch shifter 113 is moved slightly longitudinally positioning the clutches 57 and 59 intermediate the clutches 55 and 60. Whereupon the cam shaft 54 ceases rotation, and the mechanism connected with and operated by said cam shaft for indexing the spindle carrier of unit C, as hereinafter described, ceases to rotate. See Fig. 20.

Synchronizing with the positioning of pin 124 at "$c$," or neutral, within the slot 125, the lever 105 is slightly oscillated, thereby causing the engagement of the point of pin 114 with the point of the spring pressed plunger 115. A reverse movement of the hand lever 134 presses the plunger 131 backward and reëngages the notch 130 of the dog 129 with said detent plunger, thereby restoring the lever 126 to its former position. Thereupon, the spring plunger 115, being free to act, presses outward against a bevel face of the pin 114, thereby oscillating the lever 105 and moving clutch 57 either one way or the other, and thereby restoring the pin 124 to either "$a$" or "$b$" position. See Fig. 19. From the foregoing description it is evident that the feed motions of the machine are constantly under the control of the operator by the actuation of the main feed clutch 57 into neutral, as described.

*Automatic safety mechanism for the actuation of clutch 57 into neutral.*

If the machine operator fails to manually project clutch 57 into neutral, in the manner hereinbefore described and at the proper time, the following described mechanism automatically performs that function, thereby automatically halting the indexing of the spindle carrier, for the purposes hereinbefore described. See Fig. 17.

The numeral 138 indicates a lever arm projecting laterally from the lever 133 and adapted to be impelled by the spring pressed plunger 139 carried by the double lever 140, when engaged thereby and when the dog 145 engages the end of the plunger 139. The double lever 140 is pivoted at 141 on the gear box exterior and is adapted to be swung in a horizontal plane when actuated by a lever 161 connected with the forked lever end 142, as hereinafter described. See Figs. 17 and 18. The plunger 139 is yieldingly mounted within a socket 143 formed in the end of the double lever 140, being downwardly pressed by the spring 139' and limited in its downward movement by a stop pin 139'' carried by the plunger 139. The numeral 144 indicates a bevel face formed on the lower end of the plunger 139 which bevel face normally projects somewhat from the socket 143 and is adapted to be engaged by a bevel face dog 145 rigidly mounted upon the timing drum 102, thereby impelling the lever arm 138 upward, whereby the shaft 127, carrying the lever 126, is slightly rotated, and whereby the clutch 57 is cast into a neutral position.

As heretofore stated, the lever 140 is oscillated by the lever 161 which is pivotally mounted on the gear box exterior at 162 and has one end thereof operatively arranged within the forked end 142 of the lever 140. The upper end of the lever 161 is arranged within a slot 160 formed transversely of the rod 151 which rod, as heretofore described, is longitudinally and reciprocally operative by a hand lever 153 for shifting the clutch 81 for opening and closing the chuck jaws. When the rod 151 is rearwardly moved, that is, when the slot 160 is moved toward the gear box unit B, the clutch member 81 is engaged with clutch 91 to close the chuck jaws. When the movement of said rod 151 occurs, as described, the plunger 139, carried in the end of lever 140, is swung away from the vertical plane in which the lever arm 138 of lever 133 is arranged, thereby eliminating the possibility of the engagement of said plunger by the dog 145 carried on the drum 102.

When the rod 151 is actuated in the opposite direction, thereby moving the slot 160 away from the gear box, the chuck jaws are opened to receive fresh stock, and the plunger 139, carried by said lever 140, is swung beneath the end of the lever arm 138 of the lever 133 and in the same vertical plane therewith, in which position the bottom end of the plunger 139 will be engaged by the dog 145 if the lever 140 is not swung away from the engageable plane by the actuation of the mechanism which closes the chuck jaws. It is therefore evident, if the machine operator fails to close the chuck jaws, or manually throw the clutch 57 into neutral, by the time when the indexing of the spindle carrier is due, or imminent, that said clutch 57 is automatically cast into a neutral, or inoperative, position by the engagement of the dog 145 with the plunger 139. It is also evident that the spindle carrier cannot be indexed so long as the chuck jaws are open and the drum 102 is revolving under power.

*Mechanism for manually rotating cam shaft 54.*

The following described mechanism is designed to manually rotate the cam shaft 54 for the insertion and adjustment of tools, for effecting a slow rotation, or indexing, of the spindle carrier prior to the application of the power, and any other object incidental to temporary partial rotation or movement of any of the machine parts under the control of the cam shaft 54.

The numeral 163 indicates a bevel gear carried on the timing drum 102 and adapted to be normally out of mesh with the bevel pinion 164 carried on the forward end of a slidably mounted pinion shaft 165 journaled in the bearing 166 carried by the lathe bed, said pinion 164 being adapted to be meshed with gear 163 when manual rotation of the cam shaft 54 is desired, said meshing being effected by sliding the shaft 165 inward in its bearing. The shaft 165 is provided with two spaced circumferential locking grooves 168 and 169, either of which may be engaged by a spring pressed locking dog 170 carried on the end of the plunger 171 which is slidably mounted in the socket 172 and retractable by a thumb-nut 173. Normally, the bevel pinion is out of mesh with gear
168. When in mesh with said gear the pinion is locked in engagement by the engagement of the dog 170 with the groove 169.

*Unit C—Spindle carrier.*

The spindle carrier comprises a revoluble carrier in which five chuck bearing revoluble spindles are journaled at regular intervals, the carrier being indexed from the loading position to the first, second and third cutting, or operating, positions, and to the fourth, or threading, position, thence back to the loading position. The indexing of the spindle carrier is effected by Geneva motion mechanism connected with and driven by the cam shaft 54.

The numeral 174 indicates the spindle carrier revolubly mounted within unit C in the machine bed at 175, 175, its extremities, and maintained therein by the semi-circular cover, or cap, held to the machine bed by the bolts 177, 177, said cover constituting the top half of the spindle carrier journal box. The numeral 178 indicates an annular stop ring rigidly fastened to the carrier 174 at one end thereof, overlapping the end of the top and bottom carrier bearings, and adapted to resist the thrust pressure caused by the cutting tools engaging the stock carried by the chucks. The numeral 179 indicates a thrust shaft projecting centrally from one end of the spindle carrier 174 and journaled in an upward extension of the bed at 180 adjacent the unit D. The outer end of said thrust shaft is in engagement with a step button 181 carried within the shaft journal which is maintained in resilient engagement with said shaft end by the tension spring 182 seated in an extension of said shaft journal and adapted to press the stop ring 178 against the end of the spindle carrier mount. The numeral 183 indicates a stop collar screw threaded upon the shaft 179 and adjustable longitudinally thereon. The numeral 184 indicates a stop washer interposed between collar 183 and shaft bearing 180, and adapted, in coöperation with said stop collar, to enable compensation for lost motion in the spindle carrier 174. See Figs. 41 and 42, and 40.

The spindle carrier 174 is periodically indexed, or rotated, by Geneva motion mechanism which comprises the lever 184 rigidly mounted on the cam shaft 54 and provided with a roller 185 at its outer end, said roller being adapted to successively engage the five radial slots, or grooves, 186, 186, formed in one end of the spindle carrier 174, the carrier journal 175 being cut away at 187 and 188, respectively, to permit ingress to and egress from said slots 186 of the roller 185.
As the spindle carrier is indexed to each of its five positions by the Geneva motion mechanism it is locked in (a) position and remains locked until the succeeding indexing movement is due, when it is unlocked. The numeral 189 indicates a locking bolt slidably mounted within a bolt socket 190 carried in the frame bed, and outwardly pressed by the coil spring 191 seated in the lower portion of said socket. The numerals 192, 192 indicate splines carried by the bolt 189 operating in grooves 192' to prevent bolt rotation in said bolt socket. The numeral 193 indicates a lock bolt block, of which there are five, rigidly mounted within a recess 194 (see Fig. 33) formed in the spindle carrier 174, secured therein by a screw 195, and transversely slotted at 196 to receive the spring actuated bolt end 197 when the block slot 196 registers with the outer end of the lock bolt socket 190. The numeral 198 indicates a forked bolt retraction lever operatively engaging the bolt 189 at the transversely slotted portion 199 of said bolt, said lever 198 being pivotally mounted in the machine bed at 200 and provided with a laterally projecting hub portion 201 which carries the cam actuated lever 202.

The numeral 203 indicates a roller carried upon the outer end of the lever 202 which is adapted to be periodically engaged by the cam 204 rigidly mounted upon the cam shaft 54 for actuating the lever 198, whereby the locking bolt 189 is retracted from the socket in the spindle carrier. See Figs. 24, 41, and 44. The lock bolt retraction by the action of the cam 204 on levers 202 and 198, as described, synchronizes with the movement of the indexing lever 184 of the Geneva motion mechanism and the entrance of the roller 185 to one of the five radial slots 186. The impulsive action of the spring 190 on the lock bolt 189, when movable thereby, also actuates the lever 198, thereby retracting the cam lever 202 which is then disengaged from the cam 204. The indexing movement of the spindle carrier 174 by the Geneva motion synchronizes with the high speed of the cam shaft 54, being the speed obtained through the gear train hereinbefore described as driving spur gear 61 in the gear box when clutches 60 and 59 are engaged.

*Spindle carrier continued.—Spindles and driving mechanism.*

See Figs. 41, 42 and 43.

Within the revoluble spindle carrier 174 five evenly spaced work supporting spindles 205 are journaled and adapted to carry the work gripping chucks hereinafter described. Each spindle 205 is arranged parallel with the spindle carrier axis and is journaled at opposite ends thereof in longitudinally split and adjustable journal boxes 206 and 207, respectively, mounted in suitable apertures in the end members of the spindle carrier. Each box 206 and 207 is tapered exteriorly longitudinally and removably mounted within a tapered socket in the end member of the spindle carrier, and being longitudinally split, each of said boxes is somewhat contractible and is adapted to be contracted upon the spindle 205 to compensate for the wear on the box bore. The numerals 208 and 209 indicate retaining and adjusting nuts screw threaded upon opposite ends of the spindle box 207, whereby the box is slightly contracted by the rotation of said nut. Suitable stop pins 209' and 207' are provided to prevent rotation of the boxes 206 and 207 within their sockets.

The numeral 210 indicates a transversely split thrust collar screw threaded upon the spindle 205 and provided with a set screw 211, whereby it may be pinched together and locked rigidly in position to prevent rotation thereof. The thrust collar 210 is provided with a series of spring sockets 212 in which are mounted the tension springs 213 which bear against thrust washer 214 seated against the end of box 207, whereby the enlarged portion 205' of the spindle 205 is held in constant contact with the nut 208, thereby eliminating longitudinal movement of said spindle in its bearings. The numerals 215 and 216 indicate retaining and adjusting nuts screw threaded upon opposite ends of the spindle box 206 which is adapted for longitudinal adjustment thereby similar to the adjustment of box 207.

The numeral 217 indicates a stub driving shaft journaled in the bearing 218 located axially of and within the spindle carrier 174 and operatively coupled to the spindle driving shaft 30 by a sleeve 219 rigidly fastened to both shafts by pins 220, 220. The numeral 221 indicates a spur gear rigidly mounted upon the end of shaft 217 within the spindle carrier and meshing with each of the five driving gears 222, 222 revolubly mounted upon the spindle 205. The numeral 223 indicates a transversely split friction brake ring recessed into the hub of the spur gear 222 and positively retained in operative position by a locking ring 224 rigidly fastened to the gear hub by a pin 224'. The brake ring 224" is yieldingly expanded by a series of coil springs 225 carried within suitable sockets in the hub of said gear 222 and bearing against the inner periphery of said brake ring, the outward movement of which is limited by the annular brake ring shoulder 226.

The numeral 227 indicates a tooth clutch carried on the end of the hub of gear 222 and adapted for periodical engagement with a tooth clutch 228 carried on one end of the compound clutch member 229 which is splined to the spindle 205. The numeral 230 indicates a female friction clutch member screw threaded upon the hub of clutch member 229 at 233 engaging the shoulder 229' thereof. The clutch member 230 is formed into a series of prongs by the longitudinal incisions 230' to impart flexibility to the pronged portion which is adapted to engage the clutch ring 223 on the outer periphery of the latter.

The numeral 231 indicates a clutch casing, or sleeve, screw threaded upon the hub of clutch member 230 at 232 and inclosing the prongs of the female clutch member, engaging the outer periphery of the latter in beveled relation at 231', whereby the prongs of said female clutch may be contracted, or inwardly adjusted, when the casing is screwed forward, thereby enabling the maintenance of the proper friction relation between said clutch prongs and the clutch ring 223. In operation, when clutch member 229 is shifted, as is hereinafter described, the prongs of the clutch member 230 first engage the clutch ring 223 imparting a yieldable rotation to the spindle 205 for starting and accelerating the spindle speed when the spindle carrier is indexing the particular spindle from the loading position to the first cutting position. Following the friction clutch engagement of members 224 and 230, the tooth clutches 227 and 228 are engaged for positive rotation of the spindle 205 during the various cutting operations. See Fig. 41. The compound clutch member 229 is provided also with an annular groove 234 adapted to be engaged by the collar rollers 271 of a clutch shifting lever 262, as hereinafter described, for shifting clutch member 229 back and forth upon the spindle 205. Clutch 229 is provided also with the tooth clutch 235 adapted to engage a tooth clutch segment member 236 rigidly fastened to the interior of the spindle carrier 174 through a bracket portion 237, being secured in position by screws 238, 238 to the supporting members 239, 239' integral with the carrier 174.

The numeral 240 indicates a friction brake collar, or drum, rigidly mounted on the spindle 205 and adapted to be engaged by a band, or stirrup, brake 241 (see Fig. 44) hereinafter described, to retard the rotational velocity of the spindle 205 after disengagement of the clutches 227 and 228, and just prior to the engagement of the tooth clutches 235 and 236, and while the particular spindle 205 is being indexed by the carrier 174 from the last cutting position to the loading position. The numeral 241, as stated, indicates a band brake of endless stirrup formation, arranged around the collar, or drum, 240 and provided with a loop 242 carried by the pin 243 which is mounted in the forked end of a compound brake band actuation lever 244 fulcrumed on the pin 245 carried by the prongs of the furcated portion 246 of the member 239.

The compound lever 244 is forked at its extreme outer end to carry the roller pin 247 (see Fig. 44) upon which is mounted the cam roller 248 adapted to be periodically engaged by the cam 249 to inwardly and radially move said lever for applying the brake band 241 to the brake drum 240, said cam being stationary and rigidly fastened within the spindle carrier casing in any suitable manner.

The compound lever 244 comprises the main lever member 250 pivoted on the fulcrum pin 245, forked to carry the roller 248, and provided with a stop member, or toe, 251; a lever arm 252 having links 253, 253 which are carried on the fulcrum pin 245 and supporting the brake band actuation pin 243 at the opposite link end; the shouldered adjusting pin and screw member 254 loosely mounted in its socket in the arm 252, adapted to adjustably control the spaced relation between arm 252 and the lever 250; and the coil tension spring 255 suitably mounted between lever 250 and the arm 252, whereby a resilient spaced relation is maintained between said lever and arm, normally. The effect of the operation of the brake band 241 by the compound lever 244, when the latter is actuated by the cam 249, is to impart, first, a yieldable actuation of the brake band 241 against the drum 240, followed by a positive lever actuation of said band as the spring 255 is compressed and the lever 250 and the arm 252 come into direct contact. When the compound lever 244 is relieved of the stress exerted by the cam 249 it is restored to its former position by the yieldingly impulsive action of the plunger 256 movably mounted in the socket 257 and outwardly pressed by the coil spring 258, the point of said plunger engaging the band loop 242 encircling the band pin 243. When thus retracted, the outward movement of the lever 244 is limited by the stop member 251 which engages the member 239 within the furcation 246.

*Spindle carrier continued.—Clutch shifting mechanism.*

See Figs. 41, 42 and 43.

The numeral 259 indicates a carrier member adapted to serve as the mount for the five clutch shifting levers 262 which shift the clutch members 229 back and forth on spindles 205.

The carrier 259 is provided with a reduced portion 259' rigidly fastened within a socket 259" formed in the end of the spindle carrier 174, being secured therein by a pin 260. The lever carrier 259 is axially arranged within said spindle carrier and is provided with the five furcations 261, 261 within each of which furcations one clutch shifting lever 262 is pivotally mounted on a pin 263 fixed in the walls of said furcation. Each shifting lever 262 is provided with a clutch collar 262' adapted to encompass the clutch member 229, and a hub arm 262'' projecting laterally therefrom. The numeral 263' indicates a pin provided with the beveled faces 264 and 264' rigidly mounted in the hub arm 262'' and adapted to coöperate with the wedge pointed spring pressed plunger 265 slidably mounted in a socket 266 and against which the coil spring 267 bears, the latter being seated on the member 268 which closes one end of the plunger socket 266. The plunger 265 is longitudinally grooved at 269 for the reception of the pin 270 carried by the member 259, to prevent rotation of said plunger within its socket.

The numerals 271, 271 indicate two oppositely disposed rollers revolubly mounted upon the roller pins 272 carried by the clutch lever collar 262', said rollers being arranged within the shifter groove 234 of the clutch member 229. The numeral 273 indicates a hardened metal shoe carried by the shifter lever 262 at the upper, or outer, extremity thereof and adapted to be engaged by the compound cam 274 (Fig. 32) rigidly fastened to the interior of the cover 176 for shifting the clutch member 229 back and forth. It should be appreciated that the complete shift of said clutch member 229 is not effected by said cam in either direction, and that the coöperation of the spring plunger 265 is required to completely effect one complete shift in either direction, for the cam 274 merely places the clutch 229 in close relation with the tooth clutches 227 and 236, the actual engagement of said clutch member 229 with either of the clutches 227 and 236 being effected by the impulse of the spring pressed plunger 265 on one or the other of the bevel faces 264 and 264' of the pin 263, whereby a yieldable action is produced in the movement of the clutch member 229 when it enters into engagement with either one of the clutches 227 and 236.

The development of the compound cam 274 is clearly shown in Fig. 32 wherein the lever shoe 273, indicated as a dotted circle, is shown in its different positions within the longitudinal limits of said cam from the moment of initial engagement therewith (see "a") until it departs therefrom and is finally disengaged therewith (see "h"). Referring to the details of Fig. 32, positions "a" and "b" of the shoe 273 indicate that the cam 274 is disengaging clutches 227 and 228 as well as the clutch ring 223, thereby casting clutch member 229 into a neutral position, in which position it is restrained against impulsion by plunger 265 by the straight course of said cam extending from position "c" to position "d" of said shoe. The shoe position "e" indicates that the plunger 265 has acted, engaging clutches 235 and 236, thereby locking the spindle 205 against rotation, same being the condition produced for chuck loading and unloading, and at which point the shoe 273 dwells until the spindle carrier 174 is again indexed. The interval from position "e" to position "f" indicates that tooth clutches 235 and 236 are being disengaged; interval "f" to "g" indicating that the friction clutches 223 and 230 have engaged to start and accelerate the speed of the spindle 205; and interval "g" to "h" indicates that tooth clutches 227 and 228 have been placed in close relation preparatory to the final impulse of the spring plunger 265 which occurs at once when the shoe 273 reaches the position "h," thereby casting tooth clutches 227 and 228 into engagement.

It is therefore evident that the cam 274 acts on shifter lever 262 within the interval of three spindle carrier indexing stations, viz: fifth, or last operating position; first, or loading position; and second, or first cutting position. It is also evident that, as the spindle 205 is indexed from the loading position to the first cutting position, the clutch member 229 is twice positively cam actuated and once yieldingly actuated by the plunger 265. And it is also evident that all actuated movements of the clutch 229, for clutch engagement, are synchronous with the indexing of the spindle carrier 174. When the spindle 205 is indexed to the fifth, or last operating, position it is revolving at great velocity which speed is maintained during its occupancy of that position, clutches 227 and 228 then being yet engaged. The subsequent spindle carrier indexing movement carries that particular spindle 205 out of the fifth position toward the loading position where it must be positively locked against rotation to enable the chuck jaws to be opened and closed upon fresh stock. In this cycle of the spindle carrier from the fifth position to the loading position the clutches 227 and 228 are first disengaged and clutch member 229 thrown into neutral. Thereupon, the brake drum 240 is engaged by the cam actuated brake band 241, whereby the spindle speed is retarded from position "c" of the shoe 273 to position "d" thereof, when, said spindle 205 having then practically ceased to rotate, and the spring plunger 265 being free to act, clutches 235 and 236 become engaged and the spindle is locked against rotation for the unloading and loading of the chuck. Fig. 42.

*Spindle carrier continued.—Chucks and chuck jaw control.*

The numeral 276 indicates a chuck jaw carrier screw threaded upon an enlarged portion 277 of the front end of the spindle 205 and upon which is mounted a pair of radially slidable chuck jaws 278 and 279, each jaw being provided with a tooth rack 280 extending radially of the jaw rear wall. The numerals 281 and 282 indicate a pair of spur gears journaled on pins 283 and 284, respectively, rigidly mounted in the carrier 276, said gears meshing with said jaw racks and adapted, when rotated, to simultaneously move said jaws radially inwardly and outwardly. The gears 281 and 282 are separated from each other, both meshing with the double rack 285 carried on the plunger shaft 286 slidably mounted in the bore 287 of the spindle 205 and operatively connected with the secondary plunger 288 and 290, said secondary plunger being screw threaded at 291 its outer end.

The numeral 292 indicates a collar screw threaded upon the spindle 205 at 293, a casing 294 being screw threaded upon said collar at 295 and centrally apertured at 296 at its end. The numeral 297 indicates a clutch nut arranged rotatively within the casing 294 and in screw threaded engagement with plunger 288 through the threads 291, said nut being provided with the tooth clutch 298 projecting through the aperture 296, said clutch being adapted to be engaged by the tooth clutch 78 mounted upon the shaft 76 driven from gear box unit B, for opening and closing the chuck jaws 278 and 279, and heretofore described. The nut is pressed forward against the ball thrust bearing 299 by a coil spring 300 seated upon the sleeve collar 301. The plunger threads 291 are right hand threads and are adapted to actuate the chuck jaws 278 and 279 inwardly for gripping the stock on the inward movement of said jaws. It is advantageous and frequently necessary to chuck a tubular article, or piece of stock, between said chuck jaws, the outer periphery of which must not be engaged by the jaws of the chuck. In such an event it is accomplished by the expansion of the chuck jaws within and against the bore of the tubular stock.

Such a method of chucking requires a clutch nut 297 provided with left hand threads on the plunger 288 and a reversal of the location of the ball thrust bearing 299 to meet the reverse action of the plunger 288, as indicated and clearly shown in the structure of Fig. 46. Each time the spindle carrier 174 is indexed a spindle 205, with its chuck and the work carried thereby, is borne to the loading position for the removal of the finished work and the chucking of a fresh piece of work. Thereupon, the machine operator moves hand lever 153 to engage clutch 81 on shaft 72 in the gear box unit with the clutch gear 80, thereby rotating shaft 76 and the clutch 78 thereon through the gears 75 and 76. Immediately thereafter the clutch 78 is shifted into engagement with the clutch nut 297, carrying the clutch 298, through the actuation of the shifter lever 118 by the cam 117 carried on the drum 102, thereby actuating chuck jaw plungers 288 and 288 longitudinally, and thereby rotating the gears 281 and 282, whereby the chuck jaws 278 and 279 are radially outwardly moved, or "opened." Upon releasing the hand lever 153 the double tooth 81 is restored to its normally neutral position by the action of the springs 158 and 159 carried on the rod 151 bearing against the seat 155, thereby leaving the chuck jaws open. When the clutch 81 is thrown into engagement with the tooth clutch 91, carried on the disk friction sleeve 90, the rotation of the shaft 72 is reversed, thereby closing the chuck jaws. See Fig. 45.

On account of the various characters of work to be gripped by the chuck jaws 278 and 279, as well as the various weights thereof, it is important that the chuck jaws be yieldingly closed to prevent breakage of the stock and the machine parts. When the operator engages clutches 81'' and 91, of the chuck jaw actuation mechanism, the chuck jaws 278 and 279 are yieldingly closed on account of the slippage of the disks 86, 86 within the multiple disk clutch casing 84. If the operator should maintain the clutch engagement of member 81'' and 91 longer than is necessary to effectually close the chuck jaws on the stock, the sleeve 83 and the shaft 72 becomes stationary and the casing 84 continues to revolve. The adjustment of the tension spring 88 through the adjusting collar 89 determines the gripping intensity of said chuck jaws.

*Unit E—Longitudinally movable tool carrier.*

The numeral 302 indicates a tool carrier of overhung slide construction and mounted for reciprocal longitudinal movement upon one side of the casing inclosing the threading mechanism designated as unit D. The carrier 302 is longitudinally slotted at 303 to receive the carrier support and guide ledge 304 which is undercut at 305 to prevent lateral displacement of said carrier. The numeral 306 indicates a wedge shaped gib rigidly carried by the tool carrier 302 and adjustable longitudinally thereof by an adjusting screw 307 to take up wear. The numeral 308 indicates a gib rigidly carried by the upper end of the carrier 302, somewhat wedge shaped in cross section and adjustably mounted within the undercut portion 309, being adapted to be engaged by the flat surface of the upper end of the tool carrier 302. The numerals 310, 310 indicate a plurality of adjusting screws threaded into the portion 309 of the carrier guide for controlling the adjustment of the gib 308 which is downwardly actuated thereby for taking up wear.

The weight in the tool carrier 302 is so distributed that the center of gravity thereof is beyond the outer face of the ledge 304 and within the carrier itself, whereby the weight thereof and the chip pressure on the cutting tools carried thereby, are taken up by the gibs 306 and 308.

The tool carrier 302 is provided with tool shank sockets 311, 312, 313, 314 and 315 for the reception of round tool shanks and within which the tool shank may be fastened by suitable means, a set screw being commonly used for that purpose. The numerals 316, 317, 318 and 319 indicate T shaped slots to contain tool shanks, each of said slots being provided with means for longitudinally adjusting the tool shank, said adjustment means comprising a T shaped block 320 slidably arranged within the tool slot and controlled and actuated by a screw 321. The adjusting screw 321 is provided with a square head 322, for wrench application, and a circumferential groove adjacent said head, said grooved portion being arranged operatively within a U shaped recess 323 of the thrust plate 323' which is rigidly fastened to the carrier 302 to prevent longitudinal movement of said screw within the tool slot.

The numeral 324 indicates a cam roller bracket detachably fastened to the tool carrier 302 by the T head bolts 325, 325, the bolt heads being slidably arranged within a longitudinal T shaped slot 326 formed in said carrier and adapted to permit longitudinal adjustment of said carrier. The bracket 320 carries a roller 327 revolubly mounted upon a pin 328 which is rigidly fastened in said bracket, said roller being arranged within a cam slot 329 formed in the outer periphery of the cam drum 320 which is rigidly mounted upon the cam drum shaft 54 journaled in the lathe bed at 331, whereby the tool carrier 302 is reciprocally actuated. To expedite the return or idle movement of the carrier 302 the cam slot 329 is formed with an abrupt angle at 332.

See Figs. 1, 4, 23, 29, and 34.

*Unit F—Transversely movable or cross tool carrier.*

The numeral 333 indicates a cross slide bracket, or saddle, rigidly mounted upon the lathe bed and fastened thereto by the bolts 334, 334, said saddle having a dovetail groove 335 extending transversely of the longitudinal axis of the lathe. The numeral 336 indicates the tool carrier slide provided with the dovetail projection 337 slidably mounted within the groove 335 but substantially narrower in width than said groove to permit of the arrangement of the wedge shaped wear taking gib 335' therein.

The numeral 338 indicates a slide actuation rod, or screw, screw threaded into the slide 336 longitudinally thereof, provided with a square head 339, for wrench application, and provided also with actuation collars 340 and 341, and adapted to be adjusted longitudinally of the tool slide 336. The numeral 342 indicates a forked slide actuation lever rigidly mounted upon the shaft 343 which is journaled in the base of the bracket member 333, the fork prongs of said lever being arranged between the collars 340 and 341 and adapted to engage them under lever oscillation to actuate the slide 336 back and forth. The numeral 344 indicates a lateral extension of the saddle member 333 in which the shaft 343 is journaled to impart rigidity, beyond the outer end of which it projects, said shaft projection carrying the cam actuated lever 345 rigidly mounted thereon. The numeral 346 indicates a roller carried upon the outer end of the lever 345 and adapted to be periodically engaged by the face cam 347 rigidly fastened to one end of the cam drum 330 by screws 348 and also keyed to cam drum shaft 54.

After the forward actuation by the action of the cam 347, as described, the lever 342 is retracted by the coil spring 349 anchored to the bracket 333 by pin 350 and to the lever 342 by the pin 351, thereby retracting the slide 337.

The numeral 352 indicates a tool holder, or block, adapted to be fastened to the slide 336 by T head bolts 353 354, said bolts having their T heads arranged within transversely extending slots 355 and 356 formed in the upper surface of the slide 336 and along which said bolt heads are adapted to be moved for lateral adjustment of the block 352. The numerals 357, 357 indicate guide projections, or ridges, formed on the tool holder block 352 and projecting slightly into said slots 355 and 356, respectively, and adapted to impart rigidity to the holder.

The numeral 358 indicates a square head tool holder adjusting screw arranged within the slot 355 and screw threaded through the T head of the bolt 354 and having a circumferential groove therein adjacent its square head 360, the grooved portion of said screw being operatively arranged within a U shaped recess 359 (see Fig. 37) formed in the thrust plate 359' which is rigidly fastened to the side of the tool slide 336 and adapted to prevent longitudinal movement of the screws 358 within said slot 355. Set screws 361, 361 are provided on the tool holder and adapted to rigidly position the tools thereon.

See Figs. 1, 4, 23, 24, 29, 36 and 37.

*Unit D—Threading mechanism.*

The threading mechanism is almost wholly inclosed within the casing of unit D, and, with the exception of certain levers actuated by cams carried on the main cam drum 330, is driven by a gear 379 carried on the end of the threading mechanism driving shaft 66 which is extended from the gear box, as heretofore stated, for that purpose.

The mechanism of this unit is assembled about a single threading spindle upon which is mounted a head to carry the threading tool, and the various movements, speeds and functions of the threading spindle are actuated and controlled thereby. In this unit the threading spindle constantly revolves at a speed either faster or slower than the stock to be threaded, the latter revolving while the thread is being cut by the threading tool.

When cutting a thread the spindle revolves slower than the work until the threading tool has been fed fully into the work and the thread completed, at which moment the speed of the threading spindle is accelerated to a point where it is in excess of the speed of the work, when the threading tool leads itself out of the finished threads.

See Figs. 30, 31, 38, 4, 29, 34, and 35.

The numeral 362 indicates the threading spindle (see Fig. 31) which is slidably and revolubly mounted in the bearings 363 and 364 fixed in the casing of unit D and adapted to be impelled forward in its bearings, and provided with the head 365 adapted to carry a threading tool of any suitable character. The numeral 366 indicates a spindle driving gear splined to the spindle 362 by the key 367 rigidly fastened in the bore of gear 366 and projecting into a longitudinal keyway 368 formed in said spindle, said gear 366 being stationary between the bearings 363 and 364 and within the bore of which the spindle slides back and forth.

The numeral 369 indicates a gear wheel in constant mesh with gear 366 and slidably mounted upon the shaft 370, in splined relation, which is fixed within the casing at 371 and 372, said gear 369 having the tooth clutches 373 and 374 at opposite ends thereof. The shaft 370 carries also, on opposite sides of gear 369, two revolubly mounted gears 375 and 376, respectively, the former having tooth clutch member 377, and the latter tooth clutch member 378ª, said clutches being adapted to be periodically and alternately engaged by the clutches 373 and 374 on the gear 369, the latter being adapted to be shifted back and forth for that purpose by mechanism hereinafter described.

The numerals 378 and 379 indicate gear wheels rigidly mounted upon the driving shaft 66 journaled at 380 and 381, respectively, and meshing, respectively, with gears 375 and 376 for power transmission through the clutch gear 369 to the threading spindle 362. When driving through the gears 369, 376 and 379 the higher spindle speed is obtained, and when driving through gears 369, 375 and 378 the lower, or working, spindle speed is obtained. See Fig. 30.

*Unit D continued.—Clutch gear 369 shifting mechanism.*

See Fig. 34.

The numeral 382 indicates a forked shifter member loosely mounted upon the shifter rod 383 which is longitudinally slidable in the bearings 384 and 385 and resiliently maintained in operative position thereon by the oppositely disposed thrust springs 386 and 387, respectively, seated against pins 388 and 389, respectively, to impart yieldable engagement of the clutch gear 369 with the clutch gears 375 and 376. The shifter rod 383 is actuated longitudinally for right hand threading by two levers, viz: the lever 390 pivoted at 391 within the casing, same being cam actuated, as is hereinafter described, and a compound lever 392 pivoted at 393 exteriorly of the casing of unit D, the latter being actuated by a trip mechanism and a spring plunger, as is hereinafter described. See Fig. 30 for the arrangement of the right hand threading mechanism.

The numeral 394 indicates a wedge pointed pin rigidly mounted on the lower end of the lever 329 which is constantly engaged by a wedge pointed spring pressed plunger 395 movably mounted on a coil spring 397 carried in the plunger socket formed in the boss 396, said spring being seated on the screw 398. See Fig. 38.

The plunger 395 is formed with face bevels 395ª and 395ᵇ, formed at different angles, the former being adapted to engage pin 394 for resiliently impelling the lever 392 to effect final engagement of the high speed clutches 373 and 378ª, and the latter being adapted to confine the point of the pin 394, and thereby lever 392, for maintaining a yieldable engagement of the low speed clutches 374 and 377. In Fig. 30 the full lines of the pin 394 and plunger 395 indicate the relative positions of those members when clutches 373 and 378ª are engaged. And in the same figure the dotted lines of said members indicate the relative positions of the same members when clutches 374 and 377 are engaged.

The numeral 399 indicates a laterally projecting pin carried on the lower end of the lever 390 which in due time is engaged by an out-board cam 400 carried on the end of the cam drum 330, mounted on cam shaft 54, whereby the levers 390 and 392 are oscillated to the positions indicated by the dotted lines thereof in Fig. 30, and thereby engaging low speed clutches 374 and 377. See Figs. 4, 27, and 28 for cam location and details thereof.

The numeral 401 indicates a laterally projecting pin carried by the lever 390 at its upper end which pin is arranged between the spaced collars 402 and 403 rigidly mounted on the shifter rod 383 for longitudinally moving said shifter rod when said lever is oscillated. The numeral 404 indicates a laterally projecting pin carried by the lever 392 above its pivotal point, arranged between the two spaced collars 405 and 406 rigidly mounted on the rod 383, and adapted for longitudinally moving said rod when the lever 392 is oscillated. The numeral 407 indicates a trip arm carried by and projecting from the end of the lever 392 and adapted, when lever 392 is in the position indicated by the dotted lines of Fig. 30, to be engaged and impelled by the point of a screw 420 which screw is connected with and moves in synchronism with the forward movement of the spindle 362, thereby tripping the lever 392 and the pin 394 across the point of the plunger 395, whereby high speed spindle driving clutches 373 and 378ª become yieldingly engaged through the resilient impulsive action of the plunger 395 which completes the shift of the gear member 369.

Thereafter, in due time and when the threading tool has fed itself out of the threads cut in the work, the cam 400, mounted on cam drum 330, engages the pin 399 on the lever 390, oscillating the latter, thereby disengaging the clutches 373 and 378ª and yieldingly engaging the low, or working, speed clutches 374 and 377, simultaneously retripping the lever 392 across the point of the plunger 395 to the position indicated by the dotted lines thereof in Fig. 30.

The numeral 400ª indicates a face cam rigidly mounted upon the end of the cam drum 330 and adapted, for the right hand threading mechanism hereinbefore described, to serve as an emergency, or auxiliary, means for oscillating the lever 392 in the event of the failure, for any reason, of the screw 420 to engage and impel the trip arm 407. In such an event, the cam 400ª, in due time, engages the pin 399 on lever 390, oscillating said lever and thereby yieldingly engaging the clutches 373 and 378 as hereinbefore described. See Figs. 4, 25, and 26.

*Unit D continued.—Mechanism for forwardly moving the threading spindle.*

The numeral 408 indicates a spindle actuating rod slidably mounted in a fixed bearing 409 and also slidably mounted at another point within a sleeve member 410. The sleeve 410 is provided with a lateral projection, or arm, 411 which is apertured at 412 and within which aperture the bearing portion 413 of the spindle 362 is revolubly mounted, a collar 414 being rigidly mounted on the end of said spindle bearing portion 413 to prevent longitudinal movement thereof within said aperture. The rod 408 projects rearwardly beyond the sleeve 410 and is slidably mounted in an aperture 417 in the outer end of a bracket 415 which is rigidly fastened to the casing wall of unit D by the bolts 416, 416.

The numeral 418 indicates a thrust spring carried on the rod 408 and seated upon the adjustable collars 419, 419 and adapted to impart a yieldability, or resiliency, in the relation between the rod 408 and the threading spindle 362, both of which are actuated forward and backward by a lever 426 engaging the former member, as is hereinafter described. The collars 419, 419 are screw threaded upon the rod 408 for longitudinal adjustment thereon, the tension of the spring 418 being increased when necessary to project the spindle 362 forward in the event the work, or stock, to be threaded, is somewhat shorter than usual. The means for longitudinally moving the rod 408, hereinafter described, produces a periodical, or intermittent, impulse and merely projects the spindle 362 forward against the work, or stock, and maintains a resilient engagement therewith long enough to enable the threading tool to make a substantial beginning on the threads. Thereupon, the rod 408 becomes and remains stationary for a period of time, after being retracted, while the thread cutting tool feeds itself into the work by virtue of the higher speed of the stock, the sleeve 410 sliding forward on the rod 408 with the forward movement of the spindle 362.

While the threading spindle 362 is moving forward during the thread cutting operation the arm 407 of the shifting lever 392 is positioned as indicated by the dotted lines of said lever in Fig. 30, the clutch gears 375 and 369 being then engaged. Upon the completion of the cutting of the thread by the thread cutting tool the arm 407 is engaged by the point of the trip screw 420, which is adjustably mounted upon the side arm 421 of the sleeve 410, thereby actuating the arm 407 forward and moving the lever 392 into the position indicated by the full lines of Fig. 30, and thereby engaging clutch gears 369 and 376, same being the high speed gears. Whereupon the threading spindle revolves at a higher speed than the work, and thereupon the threading tool is fed out of the finished threads. In this retractive movement the spindle 362 is materially aided by the draft of a coil spring 422 fixed at its forward end by a pin 423 fastened in sleeve 410, and anchored at its opposite end to a rod 424 adjustably mounted in the outer end of the bracket, or guide, member 415. The numeral 425 indicates a set screw carried by the member 415 to maintain the longitudinal adjustment of the rod 424.

*Left hand thread cutting.*

To effect left hand threading certain changes and additions to the right hand threading mechanism are necessary which are generally indicated as follows, viz: The spring plunger 395 is rotated one hundred and eighty degrees in its socket for reversing the position of the bevel face 395$^a$ (see Fig. 38); the trip arm 407 of the lever 392 becomes an inactive member, the lever 392$^a$ provided with the trip arm 407$^a$ is substituted therefor; the position of the screw 420 is changed to engage trip arm 407$^a$; and the main oscillatory movement of the lever 390 is effected by the cam 400$^a$ mounted on the cam drum 330, which cam, as hereinbefore described, is the emergency cam for the right hand threading mechanism.

In this connection, the numeral 421 (see Figs. 4 and 38) indicates the aperture in the sleeve arm 421 in which the screw 420 is arranged for left hand threading, which is above the position it occupies in said arm for right hand threading, and in which position the point of said screw 420 is adapted to be projected against the trip arm 407$^a$ of the lever 392$^a$, which is pivoted in a bearing 393$^a$ on the exterior of the casing of unit D, when the threading spindle 362 has completed its forward movement and the threads have been cut. The lever 392$^a$ is provided with a prong, or, projection, 404$^a$ which projects downward therefrom and is arranged between the collars 405 and 406 on the shifter rod 383, and is adapted to engage the collar 405 when the lever 392$^a$ is oscillated by the engagement of the screw 420 with the trip arm 407$^a$ for moving the rod 383 and thereby shifting into engagement the clutches 374 and 377. In this mechanism the spring actuated plunger 395 effects the final and resilient engagement of the low speed clutches 374 and 377. After said lever 392$^a$ has been oscillated by said screw 420, and after the spring plunger 395 has completed the oscillation of the lever 392, the respective positions of the shifter rod 383, the trip arm 407$^a$, and the levers 390 and 392, are clearly indicated in Fig. 38 of the drawings. Thereafter, and in due time, the pin 399 of the lever 390 is engaged by the cam 400$^a$, carried on cam drum 330, thereby oscillating the lever 390, whereby the clutch 373 is shifted into engagement with clutch 378.

In the event the lever 399$^a$ is not duly oscillated by the screw 420, for any reason, the cam 400, mounted on cam drum 330 (same being the main actuating cam for the right hand threading mechanism) engages the pin 399 of the lever 390, oscillating the latter, thereby serving as an emergency member for said screw 420 to effect the engagement of the clutches 374 and 377.

*Threading mechanism continued.—Mechanism for timing the forward movement of the threading spindle.*

As hereinbefore stated and described, the thread cutting tool carried by the spindle 362, said head being 365, is yieldingly projected against the stock to be threaded by actuating means connected with the rod 408. This actuating means includes a lever 426 pivotally mounted within the casing at 429 intermediate the lever extremities. The lever 426 is provided at its upper end with a laterally projecting pin 428, the end of which pin is operatively arranged within a transverse slot 429 formed in the rod 408 and is adapted to longitudinally project said rod 408, and thereby the threading spindle 362, when the lever 426 is periodically oscillated by the timing mechanism engaging the lower end of said lever, as hereinafter described.

The numeral 430 indicates a laterally projecting pin carried by the lever 426 adjacent its lower end, said pin carrying a roller 431 mounted thereon. The numeral 432 indicates a recess formed in the lateral face, or periphery, of the annular cam member 433 which is rigidly mounted upon the shaft 434 journaled at 435 and 436, said pin 430 being arranged within said recess 432 when said cam is stationary. The cam member 433 is normally stationary, and is adapted to be periodically rotated for one complete revolution, during which revolution the roller 431, being forced out of the recess 432, engages the lateral periphery of said cam member, whereby the lever 426 is oscillated and confined at the oscillation limit during one complete revolution of said cam. Upon the completion of one revolution the cam member 344 ceases to rotate, and the roller 431 is again arranged within the recess 432 by the retraction of the lever 426, said lever retraction being effected by the draft of a coil spring 437 connected with said lever at 438 and anchored at 439 in the casing interior.

During the thread cutting, or forward movement, of the threading spindle 362, subsequent to the completion of one revolution by the cam member 433, said cam remains stationary until the completion of the thread cutting and the retraction of the threading spindle by the spring, 422, as hereinbefore described. The numeral 440 indicates a spur gear revolubly mounted upon the shaft 434 (see Fig. 35) and provided with the tooth clutch member 441, said gear meshing with and driven by a gear pinion 442 rigidly mounted upon a short shaft 433 which is journaled in a bearing 444 (see Fig. 38). The shaft 443 carries also the rigidly mounted gear 445 which meshes with and is driven by the gear pinion 446 rigidly mounted upon the end of the main driving shaft 66 which projects somewhat beyond its bearing 380 for that purpose.

The numeral 447 indicates a tooth clutch splined upon the shaft 434 for driving same and is adapted to be shifted back and forth thereon by a lever engaging in the shifting groove 448. The numeral 449 indicates a roller carried upon the end of a roller stud 450 which is rigidly mounted in the casing at 451, said roller being adapted to repose within a radial slot 449' formed in the lateral periphery 447' of the body of clutch 447 when said shaft 434 is stationary, and adapted also to ride upon the lateral periphery 447' of said clutch when the latter is being rotated by the engagement of the clutches 441 and 447. The numeral 452 indicates a shifting lever pivotally mounted at 453 and forked at one end thereof to carry the two rollers 454, 454 which are arranged within the clutch shifter groove 448, the latter being somewhat wider than the diameter of said rollers.

The numerals 455, 455 indicate a pair of cams projecting into said clutch shifter groove 448 and spaced at one hundred and eighty degrees interval, each of said cams having an inclined face 455' adapted to engage one of the shifter lever rollers 454, the point of each cam being spaced from the opposite wall of the groove 448 with sufficient clearance to permit the roller 454 to pass by when the clutch 447 is rotating. The numeral 456 indicates a laterally projecting pin rigidly mounted upon the shifting lever 452 opposite its forked end and adapted to be engaged by a pin 457, or dog, rigidly mounted on the outer periphery of the cam drum 330 for oscillating the lever to shift clutch 447 toward clutch 441 of the gear 440. See Fig. 35.

The numeral 458 indicates a wedge pointed pin carried rigidly on the end of the shifter lever 452 which is constantly engaged by the wedge point of a spring pressed plunger 459 which in construction is substantially similar to the spring plunger shown in Figs. 19 and 20.

In operation, this mechanism for timing the forward movement of the threading spindle 362 operates as follows: Assuming that the threading spindle 362 and lever 426 are retracted, and that the clutches 441 and 417 are disengaged, the latter being confined against rotation by the roller 449 engaging the clutch slot 449' and assuming also that the shifter lever 452 is positioned as indicated by the full lines of Fig. 35. Thereupon, the cam drum pin 457 engages the lever pin 456, thereby oscillating the lever 452, whereby the lever rollers 454 are moved across the groove 448 and the point of the pin 458 is projected slightly beyond, or across, the point of the spring plunger 459. Whereupon, the spring plunger 459 presses outward against the bevel face of the pin 458, whereby the lever 452 is laterally oscillated to the position indicated by the dotted line thereof in Fig. 35, and whereby the clutch 447 is shifted into engagement with the clutch 441 and the roller 449 is disengaged from the slot 449'. Thereby, shaft 434 is caused to rotate, and immediately the roller 431, carried by the lever 426, is forced out of the cam slot 432 and caused to ride on the lateral periphery of the cam 433 during one full revolution thereof, whereby the lever 426 is oscillated and held at its oscillation limit during said single revolution of said cam. In synchronism with the commencement of the rotation of shaft 434 the roller 449 rides upon the lateral periphery 447' of the body of the clutch 447 thereby effecting a positive confinement of the clutch 447 in its engagement with the clutch 441, which condition persists during one revolution of the shaft 434.

Intermediate the beginning and cessation of each revolution of the shaft 434 and the clutch member 447, the cams 455 engage the lever rollers 454, thereby oscillating the lever 452, whereby the point of the pin 458 is projected slightly across the point of the spring plunger 459, and whereby the lever rollers 454 are yieldingly forced against the wall of the shifter groove 448 where they remain until the roller slot 449' registers with the roller 449. Thereupon, the spring pressed plunger 459 completes the oscillation of the lever 452, thereby disengaging clutches 447 and 441 and projecting the roller slot 449' into engagement with the roller 449, whereby the clutch 447 and shaft 434 become stationary. In synchronism therewith the draft of the spring 437 retracts the lever 426, upon the registry of the roller 431 and slot 432, whereby the roller 431 is again projected into the slot 432.

As hereinbefore stated the timing mechanism thus described is adapted to operate periodically for projecting the threading spindle 362, with its thread cutting tool, forward against the work to be threaded, and for holding the thread cutting tool in contact with the work until a substantial start on the threads has been effected. Thereafter, as hereinbefore stated, the thread cutting is completed by the work revolving more rapidly than the threading spindle; the high speed clutches 373 and 378 are engaged to withdraw the thread cutting tool, which is retracted by the spindle 362 and the spring 422; the spindle carrier is indexed to bring a fresh piece of work into position for threading; and thereupon the timing mechanism, actuated by the gear 440 and its clutch 441, and the cam drum pin 457, as hereinbefore described, again projects the threading spindle 362 forward, for the purpose described.

I claim:—

1. In a lathe, the combination with a driving shaft, of a double clutch member splined to said shaft; rotating driving clutches disposed on either side of said double clutch and adapted to be alternately engaged thereby; means for shifting said double clutch into alternate engagement with said driving clutches; and means for shifting said double clutch into a neutral position, said means including a shifter member connected with said clutch, an oscillatory member, disengageable devices for preventing casual oscillation of said oscillatory member, a complementary projection and cam recess connection between said shifter and said oscillatory member, and means for actuating said oscillatory member.

2. In a lathe, the combination with a driving shaft, of a double clutch member splined to said shaft; rotating driving clutches disposed on either side of said double clutch and adapted to be alternately engaged thereby; means for shifting said double clutch into alternate engagement with said driving clutches; and manually operative means for shifting said double clutch into a neutral position, said means including a clutch member, an oscillatory member, a complementary projection and cam recess connection between said shifter and said oscillatory member, and a movable member connected with said oscillatory member adapted to be manually actuated for oscillating the latter.

3. In a lathe, the combination with a driving shaft, of a double clutch member splined to said shaft; rotating driving clutches disposed on either side of said double clutch and adapted to be alternately engaged thereby; means for shifting said double clutch into alternate engagement with said driving clutches; and manually operative means for shifting said double clutch into a neutral position, said means including a shifter member connected with said clutch, an oscillatory member, a complementary projection and triangular cam recess connection between said shifter and said oscillatory member, and means for actuating said oscillatory member.

4. In a lathe, the combination with a drive shaft, of double positive clutch slidably keyed to said shaft; means for alternately shifting said clutch back and forth on said shaft and across a neutral point which is intermediate the limits of the clutch travel; and mechanism for automatically shifting said clutch into said neutral position and detachably locking same therein, the shift of said clutch into neutral synchronizing with the imminence of the performance of a function of the lathe.

5. In a lathe, the combination with a driving shaft, of a double clutch member splined to said shaft; rotating driving clutches disposed on either side of said double clutch and adapted to be alternately engaged thereby; means for shifting said double clutch into alternate engagement with said driving clutches; and means for shifting said double clutch into a neutral position, said means including a clutch shifter, an oscillatory member, a complementary projection and equilateral triangular cam recess connection between said shifter and said oscillatory member, and means for actuating said oscillatory member.

6. In a lathe, the combination with a driving shaft, of a double clutch member splined to said shaft; rotating driving clutches disposed on either side of said double clutch and adapted to be alternately engaged thereby; means for shifting said double clutch into alternate engagement with said driving clutches; and means for shifting said double clutch into a neutral position, said means comprising a clutch shifter member provided with a projection, an oscillatory member provided with a triangular cam recess in which said shifter projection is arranged, disengageable means for confining said oscillatory member against casual oscillation, means for actuating said oscillatory member, whereby said projection is moved into the apex of said cam recess, and disengageable means for confining said projection within the apex of said cam recess.

7. In a lathe, the combination with a driving shaft, of a double clutch member splined to said shaft; rotating driving clutches disposed on either side of said double clutch and adapted to be alternately engaged thereby; means for shifting said double clutch into alternate engagement with said driving clutches; and means for shifting said double clutch into a neutral position, said means comprising a clutch shifter member provided with a projection, an oscillatory member provided with a triangular cam recess in which said shifter projection engages, disengageable means for confining said oscillatory member against casual oscillation, means for actuating said oscillatory member, whereby said projection is moved into the apex of said cam recess, thereby longitudinally moving said shifter, and disengageable resilient means for confining said projection within the apex of said cam recess.

8. In a lathe, the combination with a revoluble spindle carrier, of a rotary work carrying spindle journaled in said carrier; means for disconnecting the spindle driving means; mechanism for yieldingly retarding the speed of said spindle; and positive locking means for preventing spindle rotation in the loading position.

9. In a lathe, the combination with a revoluble spindle carrier, of a work carrying spindle journaled in said carrier; and spindle rotating means including yieldable and positive clutch devices for successively imparting yieldable and positive spindle rotation, said positive spindle rotation being effected by a yieldingly impelled positive clutch.

10. In a lathe, the combination with a revoluble spindle carrier, of a rotary work carrying spindle journaled in said carrier, means for disconnecting the spindle driving means; mechanism for yieldingly retarding the speed of said spindle; and a yieldingly impelled positive clutch engaging a fixed positive clutch for preventing spindle rotation in the loading position.

11. In a lathe, the combination with a revoluble spindle carrier, of a work carrying spindle journaled in said carrier; spindle rotating means including yieldable and positive clutch devices for successively imparting yieldable and positive spindle rotation; and means for operating said clutch devices in synchronism with the indexing of the spindle carrier.

12. In a lathe, the combination with a revoluble spindle carrier, of a rotary work carrying spindle journaled in said carrier, means for disconnecting the spindle driving means; mechanism for yieldingly retarding the speed of said spindle; positive locking means for preventing spindle rotation in the loading position; and means for operating said spindle speed retarding means and said locking means in synchronism with the indexing of the spindle carrier.

13. In a lathe, the combination with a revoluble spindle carrier, of a work carrying spindle journaled in said carrier; a female friction clutch slidably secured upon said spindle; a yieldable male friction clutch revolubly mounted upon said spindle; means connected with said male friction clutch for effecting rotation thereof; means for engaging said clutches; and means for positively rotating said spindle.

14. In a lathe, the combination with a revoluble spindle carrier; of a work carrying spindle journaled in said carrier; a female friction clutch slidably secured upon said spindle; means for adjusting the friction element of said female clutch; a yieldable male friction clutch revolubly mounted upon said spindle; means connected with said male friction clutch for effecting rotation thereof; means for engaging said clutches; and means for positively rotating said spindle.

15. In a lathe, the combination with a revoluble spindle carrier, of a work carrying spindle journaled in said carrier; a female friction clutch slidably secured upon said spindle; a yieldingly expansible male friction clutch member revolubly mounted upon said spindle; means for limiting the expansion of said male clutch friction member; means connected with said male friction clutch for effecting rotation thereof; means for engaging said clutches; and means for positively rotating said spindle.

16. In a lathe, the combination with a revoluble spindle carrier, of a work carrying spindle journaled in said carrier; a friction clutch carried by said spindle for starting and accelerating said spindle; said clutch comprising an adjustable female member splined to said spindle, and a yieldable male member revolubly mounted on said spindle; driving means connected with said male clutch member; and means for operatively engaging said clutch members.

17. In a lathe, the combination with a revoluble spindle carrier, of a work carrying spindle journaled in said carrier; a friction clutch carried by said spindle for starting and accelerating said spindle, said clutch comprising a yieldable male member revolubly mounted upon said spindle, and a female member splined to said spindle and adapted to be shifted across and beyond the male clutch member friction element; driving means connected with said male clutch member; and means for shifting said female clutch member into engagement with said male member.

18. In a lathe, a revoluble spindle carrier, a revoluble work carrying spindle journaled in said carrier; means for driving said spindle; means for disengaging said spindle driving means; and cam actuated mechanism for yieldingly retarding the spindle speed after disengagement of the spindle driving means, said mechanism including yieldable means for actuating the yieldable spindle speed retarding means.

19. In a lathe, a revoluble spindle carrier; a revoluble work carrying spindle journaled in said carrier; means for driving said spindle; means for disengaging said spindle driving means; friction brake devices for yieldingly retarding the spindle speed after disengagement of the spindle driving means, said brake devices including yieldable means for actuating said speed retarding means; and resilient means for disengaging the friction members of said spindle speed retarding means.

20. In a lathe, a revoluble spindle carrier;

a revoluble work carrying spindle journaled in said carrier; means for driving said spindle; means for disengaging the spindle driving means; mechanism for yieldingly retarding the spindle speed after disengagement of the spindle driving means, said mechanism including adjustable yieldable means for actuating the spindle speed retarding means; and resilient means for disengaging the friction members of said speed retarding means.

21. In a lathe, a revoluble spindle carrier; a revoluble work carrying spindle journaled in said carrier; means for driving said spindle; means for disengaging the spindle driving means; cam actuated mechanism for yieldingly retarding the spindle speed after disengagement of the spindle driving means; and resilient means engaging said speed retarding means for releasing said spindle from the retarding effect thereof.

22. In a lathe, a revoluble spindle carrier; a revoluble work carrying spindle journaled in said carrier; means for driving said spindle; means for disengaging the spindle driving means; cam actuated adjustable mechanism for yieldingly retarding the spindle speed after disengagement of the spindle driving means; and resilient means engaging said speed retarding means for releasing said spindle from the retarding effect thereof.

23. In a lathe, a revoluble spindle carrier; a revoluble work carrying spindle journaled in said carrier; means for driving said spindle; means for disengaging the spindle driving means; mechanism for yieldingly retarding the spindle speed after disengagement of the spindle driving means, said mechanism including devices whereby said speed retarding mechanism is yieldingly actuated; and positive locking means for preventing spindle rotation after speed retardation thereof.

24. In a lathe, a revoluble spindle carrier; a revoluble work carrying spindle journaled in said carrier; means for driving said spindle; means for disengaging said spindle driving means; cam actuated mechanism for yieldingly retarding the spindle speed after the disengagement of the spindle driving means; and positive locking means for preventing the rotation of said spindle after speed retardation thereof.

25. In a lathe, a revoluble spindle carrier; a revoluble work carrying spindle journaled in said carrier; means for driving said spindle; means for disengaging the spindle driving means; cam actuated adjustable mechanism for yieldingly retarding the spindle speed after disengagement of the spindle driving means; and positive locking means for preventing spindle rotation after speed retardation thereof.

26. In a lathe, a revoluble spindle carrier; a revoluble work carrying spindle journaled in said carrier; means for driving said spindle; means for disengaging the spindle driving means; cam actuated mechanism for yieldingly retarding the spindle speed after disengagement of the spindle driving means, said mechanism including devices whereby said speed retarding mechanism is yieldingly actuated; and positive locking means for preventing spindle rotation after speed retardation thereof.

27. In a lathe, a revoluble indexible spindle carrier; a revoluble work carrying spindle journaled in said carrier; means for driving said spindle; means for disengaging said spindle driving means; friction brake devices for yieldingly retarding the spindle speed after disengagement of the spindle driving means; resilient means for disengaging the friction members of said speed retarding mechanism; and positive locking means for preventing spindle rotation after speed retardation thereof.

28. In a lathe, a revoluble indexible spindle carrier; a revoluble work carrying spindle journaled in said carrier; means for driving said spindle; means for disengaging said spindle driving means; friction brake devices for yieldingly retarding the spindle speed after disengagement of the spindle driving means, said brake devices including yieldable means for actuating said spindle speed retarding means; resilient means for disengaging the friction members of said spindle speed retarding means; and positive locking means for preventing spindle rotation after speed retardation thereof.

29. In a lathe, a revoluble indexible spindle carrier; a revoluble work carrying spindle journaled in said carrier; means for driving said spindle; means for disengaging the spindle driving means; adjustable mechanism including friction brake devices for yieldingly retarding the spindle speed after disengagement of the driving means; resilient means for disengaging the friction members of said speed retarding means; and positive locking means for preventing spindle rotation after speed retardation thereof.

30. In a lathe, a revoluble indexible spindle carrier; a revoluble work carrying spindle journaled in said carrier; means for driving said spindle; means for disengaging the spindle driving means; mechanism for yieldingly retarding the spindle speed after disengagement of the driving means, said mechanism including adjustable yieldable means for actuating the spindle speed retarding means; resilient means for disengaging the friction members of said speed retarding means; and positive locking means for preventing spindle rotation after speed retardation thereof.

31. In a lathe, a revoluble indexible spindle carrier; a revoluble work carrying spindle journaled in said carrier; means for driving said spindle; means for disengaging the spindle driving means; cam actuated adjustable friction brake mechanism for retarding the spindle speed after disengagement of the driving means; resilient means for disengaging the friction members of said speed retarding means; and positive locking means for preventing spindle rotation after speed retardation thereof.

32. In a lathe, a revoluble indexible spindle carrier; a revoluble work carrying spindle journaled in said carrier; means for driving said spindle; means for disengaging the spindle driving means; cam actuated friction brake mechanism for yieldingly retarding the spindle speed after disengagement of the driving means, said mechanism including devices whereby a yieldable actuation thereof is effected; resilient means for disengaging the friction members of said speed retarding means; and positive locking means for preventing spindle rotation after speed retardation thereof.

33. In a lathe, a revoluble indexible spindle carrier; a revoluble work carrying spindle journaled in said carrier; means for driving said spindle; means for disengaging the spindle driving means; friction devices for retarding and stopping the spindle rotation; positive clutch devices for preventing spindle rotation after speed retardation thereof; and means for disengaging said spindle from said clutch devices.

34. In a lathe, a revoluble indexible spindle carrier; a revoluble work carrying spindle journaled in said carrier; means for driving said spindle; means for disengaging the spindle driving means; mechanism for retarding the spindle speed after disengagement of the driving means; a fixed positive clutch carried by said spindle carrier; a positive clutch slidably mounted upon said spindle; and means for engaging said clutches after spindle speed retardation.

35. In a lathe, a revoluble indexible spindle carrier; a revoluble work carrying spindle journaled in said carrier; means for driving said spindle; means for disengaging the spindle driving means; mechanism for retarding the spindle speed after disengagement of the driving means; a fixed positive clutch carried by the spindle carrier; a positive clutch slidably mounted upon said spindle; and means for intermittently shifting said slidable clutch into engagement with said fixed clutch for preventing spindle rotation.

36. In a lathe, the combination with a revoluble periodically indexed spindle carrier, of a rotary work carrying spindle journaled in said carrier; means for disconnecting the spindle driving means; friction devices for retarding and stopping the spindle rotation when being indexed to the loading position; positive clutch devices for preventing rotation of said spindle while in the loading position; and means for disengaging said spindle from said spindle rotation retarding means.

37. In a lathe, the combination with a revoluble periodically indexed spindle carrier, of a rotary work carrying spindle journaled in said carrier; means for disconnecting the spindle driving means; mechanism for retarding the speed of said spindle when being indexed to the loading position; a fixed positive clutch carried by said spindle carrier; a positive clutch slidably mounted upon said spindle; and means for engaging said clutches for preventing rotation of said spindle while in the loading position.

38. In a lathe, the combination with a revoluble periodically indexed spindle carrier, of a rotary work carrying spindle journaled in said carrier; means for disconnecting the spindle driving means; mechanism for retarding the speed of said spindle when being indexed to the loading position; a fixed positive clutch carried by said spindle carrier; a positive clutch slidably mounted upon said spindle; and means for intermittently shifting said slidable clutch into engagement with said fixed clutch for preventing rotation of said spindle while in the loading position.

39. In a multiple spindle lathe and in chuck jaw actuation mechanism, a drive shaft; a pair of spaced clutches revolubly mounted upon said shaft; driving means operatively connected with each of said clutches for effecting rotation thereof in opposite directions; a compound clutch splined upon said shaft, arranged between said spaced clutches and adapted for alternate engagement therewith; one of said clutches being yieldable; and means for shifting said compound clutch back and forth.

40. In a multiple spindle lathe and in chuck jaw actuation mechanism, a drive shaft; a pair of spaced clutches revolubly mounted upon said shaft; driving means operatively connected with each of said clutches for effecting rotation thereof in opposite directions; a compound clutch splined upon said shaft, arranged between said spaced clutches and adapted for alternate engagement therewith; and manually operative mechanism for shifting said compound clutch back and forth.

41. In a multiple spindle lathe and in chuck jaw actuation mechanism, a drive shaft; a pair of spaced clutches revolubly mounted upon said shaft; driving means including speed change mechanism operatively connected with each of said clutches for effecting rotation thereof in opposite directions; a compound clutch splined to said shaft, arranged between said spaced clutches and adapted for alternate engagement therewith; and mechanism for periodically shifting said compound clutch back and forth.

42. In a multiple spindle lathe and in chuck jaw actuation mechanism, a drive shaft; a pair of spaced clutches revolubly mounted upon said shaft; driving means operatively connected with each of said clutches for effecting rotation thereof in opposite direction; a compound clutch splined upon said shaft, resiliently poised between said spaced clutches and adapted for alternate engagement therewith; and mechanism for shifting said compound clutch back and forth.

43. In a multiple spindle lathe and in chuck jaw actuation mechanism, a drive shaft; a pair of spaced clutches revolubly mounted upon said shaft; a driving means operatively connected with each of said clutches for effecting rotation thereof in opposite directions; a compound clutch slidably keyed upon said shaft, arranged between said spaced clutches and adapted for alternate engagement therewith, one of said clutches being adjustably yieldable; and mechanism for shifting said compound clutch back and forth.

44. In a multiple spindle lathe and in chuck jaw actuation mechanism, a drive shaft; a pair of spaced clutches revolubly mounted upon said shaft, one of said clutches being a compound tooth gear and positive clutch; driving means operatively connected with each of said clutches for effecting rotation thereof in opposite directions; a compound clutch splined to said drive shaft, arranged between said spaced clutches and adapted for alternate engagement therewith; and mechanism for shifting said compound clutch back and forth.

45. In a multiple spindle lathe and in chuck jaw actuation mechanism, a drive shaft; a pair of spaced clutches revolubly mounted upon said shaft, one of said clutches being a positive clutch and the other a yieldable clutch; driving means operatively connected with each of said clutches for effecting rotation thereof in opposite directions; a compound positive clutch splined to said shaft between said spaced clutches and adapted for alternate engagement therewith; and mechanism for shifting said compound clutch back and forth.

46. In a lathe, the combination with a drive shaft, of a double positive clutch slidably keyed to said shaft; means for alternately shifting said clutch back and forth on said shaft; and means for shifting said clutch to, and detachably confining same in, a position intermediate its normal limits of travel.

47. In a lathe, the combination with a drive shaft, of a double positive clutch slidably keyed to said shaft; means for alternately shifting said clutch back and forth on said shaft; and manually operative means for shifting said clutch to and detachably confining same in, a position intermediate its normal limits of travel.

48. In a lathe, the combination with a drive shaft, of a double positive clutch slidably keyed to said shaft; means for alternately shifting said clutch back and forth on said shaft; and manually operative means for shifting said clutch to, and yieldably and detachably confining same in, a position intermediate its normal limits of travel.

49. In a lathe, the combination with a revoluble, slidably and yieldingly mounted threading spindle, of a spindle impellent member operatively connected with said threading spindle; an oscillatory lever operatively connected with said spindle impellent member; a revoluble cam for oscillating said lever; and means for periodically imparting a single revolution to said cam, whereby said lever is oscillated and the oscillation thereof maintained during one revolution of said cam, thereby projecting said spindle impellent member and said threading spindle into, and maintaining them. in, a forward position during a single cam revolution; and means for retracting said oscillatory lever and said impellent member at the completion of said cam revolution.

50. In a lathe, the combination with a revoluble, slidably and yieldingly mounted threading spindle, of a spindle impellent member operatively connected with said threading spindle; an oscillatory lever operatively connected with said spindle impellent member; a roller mounted on said lever; a recessed revoluble cam member for oscillating said lever, said lever roller being normally arranged in said cam recess; and means for periodically imparting a single revolution to said cam, whereby said lever is oscillated and maintained in its oscillated position during the single revolution of said cam.

51. In a lathe, and in periodically operating mechanism, the combination of a shaft; a cam member rigidly mounted upon said shaft; an oscillatory lever operatively connected with said cam member; means for periodically imparting a single revolution to said shaft, and thereby said cam, whereby said lever is oscillated, and maintained in a state of oscillation, during a single revolution of said cam; and means for retracting said lever after a single revolution of said cam.

52. A screw threading machine comprising, a rotary work holder; a rotary threading tool adapted to carry a tool or die; and automatic mechanism for effecting the rotation of said tool carrier at alternately slower and faster speeds than said work holder, said mechanism including a gear sleeving and splined to said tool carrier, a shiftable compound driving gear and double clutch meshing with said sleeving gear, clutches disposed on opposite sides of and adapted to be alternately engaged by said compound member, and a shifter connected with said compound member for altering the sequence of the different speeds imparted to said tool carrier, said shifter being adapted to receive two successive impulses for shifting said compound clutch member.

53. A screw threading mechanism comprising in combination, a rotary work holder; a rotary and slidable threading tool carrier adapted to carry a threading tool; and automatic mechanism for effecting the rotation of said tool carrier at alternately slower and faster speeds than said work holder speed, said mechanism including a gear sleeving and splined to said tool carrier, a shiftable compound driving gear and double clutch meshing with said spindle sleeving gear, clutches disposed on opposite sides of and adapted to be alternately engaged by said compound member, and a shifter member connected with said compound clutch member for altering the sequence of the different speeds imparted to said tool carrier.

54. A screw threading mechanism comprising, a rotary work holder; a rotary threading tool carrier; a tool carried thereby; a driving gear sleeving and splined to said carrier; a plurality of drivers connected with said driving gear for effecting the rotation of said tool carrier at alternately slower and faster speeds than said work holder; and automatic means for effecting alternative operation of said drivers, said means including devices for effecting operation of said drivers in either of two sequences, whereby either right or left hand thread cutting may be effected by the machine.

55. A screw threading mechanism comprising, a rotary work holder; a rotary threading tool carrier adapted to carry a tool or die; and automatic mechanism for effecting the rotation of said tool carrier at alternately faster and slower speeds than said work holder, said mechanism including a gear sleeving and splined to said tool carrier, a shiftable compound driving gear and double clutch meshing with said sleeving gear, clutches adapted to be engaged by said compound member, and a shifter connected with said compound member for altering the sequence of the different speeds imparted to said tool carrier, said shifter being actuated by a two step shift consisting respectively of a cam actuated lever and a compound lever actuated by trip mechanism and spring plunger.

56. In a lathe, and in periodically operating mechanism, the combination of a periodically rotated shaft; a driven clutch shiftably mounted on said shaft; said clutch being provided with a control lever groove; a cam within said groove; a control lever engaging said clutch groove and adapted for oscillation by engagement with said groove cam; and resilient impulsion means for effecting a second oscillation of said lever in the same direction as said first oscillation whereby said clutch is shifted.

57. In a lathe, and in periodically operating mechanism, the combination of a periodically rotated shaft; a driven clutch shiftably mounted on said shaft, said clutch being provided with a control lever groove; a cam within said groove; a control lever engaging said clutch groove and adapted for oscillation by engagement with said groove cam; and means for effecting a second oscillation of said lever in the same direction as said first oscillation whereby said clutch is shifted.

58. In a lathe, and in periodically operating mechanism, the combination of a constantly rotating driving clutch; a driven shaft; a driven clutch slidably mounted on said shaft; a control lever operatively engaging said driven clutch; and control devices for imparting a plural oscillation of said control lever in the same direction for engaging said clutches.

59. In a lathe, and in periodically operating mechanism, the combination of a constantly rotating driving clutch; a driven shaft; a driven clutch slidably mounted on said shaft; a control lever operatively engaging said driven clutch; control devices for imparting a plural oscillation of said control lever in the same direction for engaging said clutches; and means for positively maintaining said clutch engagement during substantially one revolution of said shaft.

60. In a lathe, and in periodically operating mechanism, the combination, of a constantly rotating driving clutch; a driven shaft; a driven clutch slidably mounted on said shaft; a control lever operatively connected with said driven clutch; and control devices for successively positively and then yieldingly oscillating said lever in the same direction for engaging said clutches.

61. In a lathe, and in periodically operating mechanism, the combination, of a constantly rotating driving clutch; a driven shaft; a driven clutch slidably mounted on said shaft; a control lever operatively connected with said driven clutch; control devices for successively positively and then yieldingly oscillating said lever in the same direction for engaging said clutches; and means for positively maintaining said clutch engagement during substantially one revolution of said shaft.

62. In a lathe, and in periodically operating mechanism, the combination, of a periodically rotated shaft; a driven clutch shiftably mounted on said shaft, said clutch being provided with a control lever groove; a cam within said groove; a control lever engaging said clutch groove and adapted for oscillation by engagement with said groove cam; and resilient impulsion means for effecting a second oscillation of said control lever in the same direction as said first oscillation, whereby said clutch is shifted.

63. In a lathe, and in periodically operating mechanism, the combination, of a periodically rotated shaft; a driven clutch slidably secured to said shaft; a control lever operatively connected with said clutch; means carried by the clutch for oscillating said control lever; and resilient impulsion means for effecting a second oscillation of said control lever in the same direction as said first oscillation, whereby said clutch is shifted.

64. In a lathe, and in periodically operating mechanism, a periodically rotated shaft; a driven clutch slidably secured to said shaft; means for shifting said clutch during shaft rotation; and means engaging said clutch when shifted, whereby the rotation of said shaft is arrested.

65. In a lathe, and in periodically operating mechanism, of a periodically rotated shaft; a driven clutch slidably secured to said shaft, the end periphery of said clutch being recessed; means for shifting said clutch during shaft rotation; and a fixed member engaging said clutch recess when said clutch has been shifted, whereby the rotation of said shaft is arrested.

66. In a lathe, and in periodically operating mechanism, the combination of a periodically rotated shaft; a driven clutch slidably secured upon said shaft; means for shifting said clutch during shaft rotation; a stationary clutch stop member; and a complementary slot and projection connection between said clutch and said clutch stop member engaging when said clutch is shifted, whereby the rotation of said shaft is arrested.

67. In a lathe, and in periodically operating mechanism, the combination, of a driving clutch; a shaft; a driven clutch slidably secured upon said shaft; means for rotating said driving clutch; means for engaging said clutches; means for positively maintaining said clutch engagement during one revolution of said shaft; and means for disengaging said clutches at the completion of one revolution of said shaft.

68. In a lathe, and in periodically operating mechanism, the combination, of a driving clutch; a shaft; a driven clutch slidably secured upon said shaft; means for rotating said driven clutch; means for engaging said clutches; means for positively maintaining said clutch engagement during one revolution of said shaft; means for disengaging said clutches at the completion of one revolution of said shaft; and means for arresting shaft rotation at in the end of one revolution thereof.

69. In a lathe, and in periodically operating mechanism, the combination, of a periodically rotated shaft; a driven clutch slidably secured upon said shaft; means for rotating said driving clutch; a control lever operatively connected with said driven clutch; a rotary member provided with a dog, the latter being adapted for oscillating said control lever; resilient impulsion means effecting a second oscillation of said control lever in the same direction as the first, whereby said clutches are engaged; and means for disengaging said clutches upon the completion of one revolution of said shaft.

70. In a lathe, and in periodically operating mechanism, the combination, of a driving clutch; a shaft; a driven clutch slidably secured upon said shaft; said clutch being recessed at one end thereof; a stop member arranged in said clutch recess when said shaft is stationary; means for rotating said driving clutch; means for engaging said clutches for rotating said shaft, whereby said stop member and said clutch recess are disengaged and the stop member is caused to positively engage the end periphery of said driven clutch as an abutment member.

71. In a lathe, and in periodically operating mechanism, the combination, of a driving clutch; a shaft; a driven clutch slidably secured upon said shaft; said clutch being recessed at one end thereof; a stop member arranged in said clutch recess when said shaft is stationary; means for rotating said driving clutch; means for engaging said clutches for rotating said shaft, whereby said stop member and said clutch recess are disengaged and said stop member is caused to positively engage the end periphery of said driven clutch as an abutment member; and means for shifting said driven clutch out of engagement with said driving clutch at the expiration of one revolution of said shaft, whereby said clutch recess is projected into engagement with said stop member, thereby arresting rotation of said shaft member.

72. In a lathe, the combination with a suitable support, of a reciprocable tool carrier mounted thereon; a tool block mounted on said tool carrier and transversely movable thereof; complementary tongue and groove connections between said tool block and tool carrier; means for rigidly fastening said block on said tool carrier; means for transversely adjusting said tool block; and means for reciprocating said tool carrier.

73. In a lathe, the combination with a suitable support, of a reciprocable tool carrier mounted thereon; and provided with transverse slots; a tongued tool block mounted on said tool carrier and having its tongues slidably arranged within said transverse slots of said carrier; T head fastening members carried by said tool block and having said T heads movably arranged within said transverse carrier slots; means connected with one of said T head members for moving same longitudinally in its transverse slot and thereby transversely moving said tool carrier; and means for reciprocating said tool carrier.

74. In a lathe, the combination with the spindle mount, of a chuck bearing spindle revolubly mounted in said mount and provided with a detachable thrust collar; and resilient thrust means engaging said collar for preventing longitudinal movement of said spindle.

75. In a lathe, the combination, of a revolubly mounted spindle carrier; and resilient thrust means actuating said spindle carrier for preventing longitudinal movement thereof.

76. In a lathe, the combination, of a revolubly mounted spindle carrier provided with a thrust shaft; and resilient thrust means engaging said thrust shaft for preventing longitudinal movement of said carrier.

77. In a lathe, the combination, of a revolubly mounted spindle carrier provided with a thrust shaft, said shaft being journaled at one end thereof; an adjustment collar movably mounted on said thrust shaft adjacent said shaft journal; and resilient thrust means engaging said thrust shaft for preventing longitudinal movement of said carrier.

78. In a multiple spindle lathe, the combination of a rotary spindle carrier in which a series of revoluble work carrying spindles are journaled; means for intermittently rotating said spindle carrier; a chuck on each of said spindles, the jaws whereof are substantially radially movable; means for driving the work carrying spindles; clutch actuated devices carried by the spindles for actuating the chuck jaws; means for disengaging the spindle driving means prior to indexing a spindle to the loading position; means for preventing rotation of the spindle while in the loading position; and mechanism engaging said clutch device for opening and closing the chuck jaws.

79. In a multiple spindle lathe, the combination of a rotary spindle carrier in which a series of revoluble work carrying spindles are journaled; means for intermittently rotating said spindle carrier; a chuck on each spindle, the jaws whereof are substantially radially movable; means for driving the work carrying spindles; clutch actuated devices carried by the spindles for actuating the chuck jaws; means for disengaging the spindle driving means prior to indexing a spindle to the loading position; means for retarding the spindle speed prior to the arrival of the spindle at the loading position; means for preventing rotation of the spindle while in the loading position; and mechanism engaging said clutch actuated device for opening and closing the chuck jaws.

80. In a lathe, the combination with a revoluble threading spindle, of a gear secured to said spindle; a compound clutch and gear member operatively connected with said spindle gear; two speed mechanism including driving clutches for driving said compound clutch member; and mechanism for alternately yieldingly engaging said compound clutch member with the driving clutches of said two speed mechanism, said mechanism including emergency devices for engaging the higher speed of said two speed mechanism in the event of the failure of the main mechanism.

81. In a lathe, the combination with a revoluble threading spindle, of a gear secured to said spindle; a compound clutch and gear member operatively connected with said spindle gear; two speed mechanism including driving clutches for driving said compound clutch member; and mechanism for alternately yieldingly engaging said compound clutch member with the driving clutches of said two speed mechanism, said mechanism including cam actuated emergency devices for engaging the higher speed of said two speed mechanism.

82. In a lathe, the combination with a revoluble threading spindle, of a gear secured to said spindle; a compound clutch and gear member operatively connected with said spindle gear; two speed mechanism including driving clutches for driving said compound clutch member; and mechanism for alternately yieldingly engaging said compound clutch member with the driving clutches of said two speed mechanism, said mechanism including emergency devices for engaging one of said speeds of said two speed mechanism in the event of the failure of the main mechanism.

83. In a lathe, the combination with a revoluble threading spindle, of a gear secured to said spindle; a compound clutch and gear member operatively connected with said spindle gear; two speed mechanism including driving clutches for driving said compound clutch member; a shifter member connected with said compound clutch member; mechanism connected with said shifter member for partially shifting said compound clutch in one direction; and resilient impulsion means connected with said shifter for completing the shift of said compound clutch.

84. In a lathe, the combination with a revoluble threading spindle, of a gear secured to said spindle; a compound clutch and gear member operatively connected with said spindle gear; two speed mechanism including driving clutches for driving said compound clutch member; a shifter member connected with said compound clutch member; cam actuated mechanism connected with said shifter for partially shifting said compound clutch in one direction; and resilient impulsion means connected with said shifter for completing the shift of said compound clutch.

85. In a lathe, the combination with a revoluble threading spindle, of a gear secured to said spindle; a compound clutch and gear member operatively connected with said spindle gear; two speed mechanism including driving clutches for driving said compound member; mechanism for alternately engaging said compound clutch member with said driving clutches; and emergency mechanism for shifting said compound clutch into engagement with one of the two speeds of said two speed mechanism in the event of the failure of the main mechanism, said emergency mechanism including a shifter lever, a drum and a cam on said drum.

86. In a lathe, in combination, a revoluble, slidable and yieldingly mounted threading spindle; a spindle impellent member operatively connected with said threading spindle; an oscillatory lever operatively connected with said impellent member; means for oscillating said lever, said means including devices whereby said lever oscillation is temporarily maintained, thereby projecting said impellent member and said threading spindle into and temporarily maintaining them in a forward position; and means for retracting said oscillatory lever and said impellent member.

87. In a lathe, in combination, a revoluble threading spindle; a gear splined on said spindle and within which said spindle is slidable; means for preventing lateral movement of said gear; a compound clutch and gear member operatively connected with said spindle gear; two speed mechanism including driving clutches for driving said compound clutch member; and mechanism for alternately engaging said compound clutch member with the driving clutches of said two speed mechanism.

88. In a lathe, in combination, a revoluble threading spindle; a gear splined on said spindle and within which said spindle is slidable; means for preventing lateral movement of said gear; a compound clutch and gear member operatively connected with said spindle gear; two speed mechanism including driving clutches for driving said compound clutch member; and mechanism for alternately yieldingly engaging said compound clutch member with the driving clutches of said two speed mechanism.

89. In a lathe, the combination of a revoluble and slidably mounted threading spindle; a spindle impellent member yieldingly and operatively connected with said spindle; means for rotating the spindle; a periodically operating cam member; and mechanism operatively connecting said impellent member and said cam member for longitudinally projecting the spindle toward the stock to be threaded.

90. The combination, in a lathe, of a revoluble and slidably mounted threading spindle; a spindle impellent member yieldingly and operatively connected with said spindle; means for rotating the spindle; a periodically rotating cam member; and mechanism operatively connecting said spindle impellent member and said cam member for longitudinally projecting the spindle toward the work to be threaded.

91. The combination, in a lathe, of a revoluble and slidably mounted threading spindle; a spindle impellent member yieldingly and operatively connected with said spindle; means for adjusting the tension between said impellent member and the threading spindle; means for rotating said spindle; a periodically operating cam member; and mechanism operatively connecting said impellent member and said cam member for longitudinally projecting the spindle toward the stock to be threaded.

92. The combination, in a lathe, of a revoluble and slidably mounted threading spindle; a spindle impellent member yieldingly and operatively connected with said spindle; means for adjusting the tension between said impellent and spindle members; means for rotating said spindle; a periodically rotating cam member; and mechanism operatively connecting said impellent and cam members for longitudinally projecting the spindle toward the stock to be threaded.

93. The combination, in a lathe, of a revoluble slidably mounted threading spindle; a slidably mounted spindle impellent member operatively connected with said spindle; means for rotating said spindle; a periodically operating cam member; mechanism operatively connecting said impellent and cam members for longitudinally projecting the spindle toward the stock to be threaded; and means for retracting said impellent member independent of the longitudinal movement of said threading spindle.

94. The combination, in a lathe, of a revoluble slidably mounted threading spindle; a slidably mounted spindle impellent member operatively connected with said spindle; means for rotating said spindle; a periodically rotating cam member; mechanism operatively connecting said impellent and cam members for longitudinally projecting the spindle toward the stock to be threaded; and means for retracting said impellent member independent of the longitudinal movement of the threading spindle.

95. The combination, in a lathe, of a revoluble slidably mounted threading spindle; a spindle impellent member operatively connected with said spindle; two speed mechanism for rotating said spindle; a periodically operating cam member; and mechanism operatively connecting said impellent and cam members for longitudinally projecting the spindle toward the stock to be threaded.

96. The combination, in a lathe, of a revoluble slidably mounted threading spindle; a spindle impellent member operatively connected with said spindle; two speed mechanism for rotating said spindle; a rotating periodically operating cam member; and mechanism operatively connecting said impellent and cam members for longitudinally projecting the spindle toward the stock to be threaded.

97. The combination, in a lathe, of a revoluble slidably mounted threading spindle; means for rotating said spindle; a control lever operatively connected with said spindle and pivoted intermediate its extremities; a revoluble member having a flat lateral periphery and a recess in said periphery, said recess being engaged by the lever when said revoluble member is idle; and means for imparting a single revolution to said revoluble member, whereby said control lever is oscillated and said threading spindle projected toward the stock to be threaded.

98. In a machine tool, the combination of a rotatable spindle carrier, a spindle rotatably mounted thereon, a driving gear concentric with the spindle carrier, a gear loosely mounted on the spindle in mesh with the driving gear, a sliding sleeve mounted on said spindle, a friction clutch of which one member is carried on said gear and one on said sliding sleeve, clutch jaws on the adjacent ends of said gear and sliding sleeve, said parts being arranged substantially as described whereby the movement of the sliding sleeve in one direction will first cause the engagement of the friction clutch members, and subsequently their disengagement and the engagement of said clutch jaws.

99. In a machine tool, the combination of a rotatable spindle carrier, a spindle rotatably mounted thereon, a driving gear concentric with the spindle carrier, a gear loosely mounted on the spindle in mesh with the driving gear, a sliding sleeve mounted on said spindle, a friction clutch of which one member is carried on said gear and one on said sliding sleeve, clutch jaws on the adjacent ends of said gear and sliding sleeve said parts being arranged substantially as described whereby the movement of the sliding sleeve in one direction will first cause the engagement of the two friction clutch members, and subsequently their disengagement and the engagement of said jaws, a friction brake to check the rotation of said spindle, and means to automatically apply said brake when said sliding sleeve has moved in the opposite direction far enough to cause said driving gear to be unclutched from the spindle.

100. In a machine tool, the combination of a rotatable spindle carrier, a spindle rotatably mounted thereon, a driving gear concentric with the spindle carrier, a gear loosely mounted on the spindle in mesh with the driving gear, a sliding sleeve mounted on said spindle, a friction clutch of which one member is carried on said gear and one on said sliding sleeve, clutch jaws on the adjacent ends of said gear and sliding sleeve, said parts being arranged substantially as described whereby the movement of the sliding sleeve in one direction will first cause the engagement of the two friction clutch members, and subsequently their disengagement and the engagement of said jaws, and a fixed member having jaws, and said sliding sleeve having jaws adapted to engage therewith whereby to positively stop the rotation of said spindle.

101. In a machine tool, the combination of a housing having a removable cap, a drum-shaped spindle carrier rotatable in said housing and cap, a plurality of spindles rotatably mounted upon said spindle carrier and in position such that they are parallel with the axis of the spindle carrier and are equal distances from said axis and are equal distances from each other, means to impart step by step rotary motion to said spindle carrier, means for rotating all of said spindles, cams on the inner face of said housing, and means controlled by said cams to connect and disconnect said spindles successively with means for rotating them.

102. In a machine tool, the combination of a rotatable spindle carrier, a spindle rotatably mounted thereon, means for periodically turning said carrier definite arcual distances, a driver which is rotatably mounted on said spindle, means for continuously turning said driver, a friction ring carried by said driver, clutch jaws fixed to said driver, a sliding sleeve mounted on and having a tongue and groove driving connection with said spindle and having clutch jaws for coöperation with the clutch jaws on the driver, spring clutch jaws fixed to said sliding sleeve for engagement with said friction ring, and a lever for actuating said sliding sleeve.

103. In a machine tool, the combination of a rotatable spindle carrier, a spindle rotatably mounted thereon, means for periodically turning said carrier definite arcual distances, a driver which is rotatably mounted on said spindle, means for continuously turning said driver, a friction ring carried by said driver, clutch jaws fixed on said driver, a sliding sleeve mounted on and having a tongue and groove driving connection with said spindle and having clutch jaws for coöperation with the clutch jaws on the driver, spring clutch jaws fixed to said sliding sleeve for engagement with said friction ring, a lever for actuating said sliding sleeve, and a fixed cam assembly for actuating said lever.

104. In a machine tool, the combination of a rotatable spindle carrier, a spindle rotatably mounted thereon, means for periodically turning said carrier definite arcual distances, a driver which is rotatably mounted on said spindle, means for continuously turning said driver, a friction ring carried by said driver, clutch jaws fixed to said driver, a sliding sleeve mounted on and having a tongue and groove driving connection with said spindle and having clutch jaws for coöperating with the clutch jaws on the driver, a lever for actuating said sliding sleeve, spring clutch jaws fixed to said sliding sleeve for engagement with said friction ring, and means to actuate said lever as the spindle approaches and departs from one certain position to which it is moved by said carrier, substantially as and for the purpose specified.

105. In a machine tool, the combination of a rotatable spindle carrier, a spindle rotatably mounted thereon, means for periodically turning said carrier definite arcual distances, a driver which is rotatably mounted on said spindle, means for continuously turning said driver, a friction ring carried by said driver, clutch jaws fixed to said driver, a sliding sleeve mounted on and having a tongue and groove driving connection with said spindle and having clutch jaws for coöperating with the clutch jaws on the driver, spring clutch jaws fixed to said sliding sleeve for engagement with said friction ring, a lever for actuating said sliding sleeve, a fixed cam assembly for actuating said lever, a friction brake for said spindle, and means to apply said brake when the driver and spindle are disconnected.

106. In a machine tool, the combination of a rotatable spindle carrier, a spindle rotatably mounted thereon, means for periodically turning said carrier definite arcual distances, a driver which is rotatably mounted on said spindle, means for continuously turning said driver, a friction ring carried by said driver, clutch jaws fixed to said driver, a sliding sleeve mounted on and having a tongue and groove driving connection with said spindle and having clutch jaws for coöperating with the clutch jaws on the driver, spring clutch jaws fixed to said sliding sleeve for engagement with said friction ring, a lever for actuating said sliding sleeve, a fixed cam assembly for actuating said lever, a friction brake for said spindle, means to apply said brake when the driver and spindle are disconnected, a fixed member having jaws, and jaws fixed to said sliding sleeve for engagement therewith.

107. In a machine tool, the combination of a rotatable spindle carrier, a spindle rotatably mounted thereon, means for periodically turning said carrier definite arcual distances, a driver which is rotatably mounted on said spindle, means for continuously turning said driver, a friction ring carried by said driver, clutch jaws fixed to said driver, a sliding sleeve mounted on and having a tongue and groove driving connection with said spindle and having clutch jaws for coöperating with the clutch jaws on the driver, spring clutch jaws fixed to said sliding sleeve for engagement with said friction ring, a lever for actuating said sliding sleeve, a cam assembly for actuating said lever, and a spring actuated device acting on said lever to move it first in one direction and then in the other.

108. In a machine tool, the combination of a rotatable spindle carrier, a housing in which said carrier is rotatably supported which housing has a removable cover plate, a plurality of spindles which are rotatably mounted on said carrier in position such that their axes are parallel with the axis of the carrier and are equal distances therefrom, and are equal arcual distances apart, means to periodically turn said carrier arcual distances equal to the arcual distances between spindle centers, a driver for each spindle rotatably mounted thereon, means for continually rotating said drivers, a sliding clutch sleeve upon each spindle having a tongue and groove connection therewith, for connecting and disconnecting the driver and spindle, jaws on said sliding sleeve, jaws fixed to the carrier in position such that when said sleeve is moved a sufficient distance in the clutch releasing direction the jaws thereon will engage with the jaws carried by the carrier and positively stop the revolution of said spindle, mechanism for operating said sliding sleeve and a fixed cam assembly on the removable cover plate for actuating said clutch operating mechanism.

109. In a machine tool, the combination of a rotatable spindle carrier, a housing in which said carrier is rotatably supported which housing has a removable cover plate, a plurality of spindles which are rotatably mounted on said carrier in position such that their axes are parallel with the axis of the carrier and are equal distances therefrom, and are equal arcual distances apart, means to periodically turn said carrier arcual distances equal to the arcual distances between spindle centers, a driver for each spindle rotatably mounted thereon, means for continually rotating said drivers, a sliding sleeve on each spindle having a tongue and groove connection therewith, clutch mechanism carried in part by each sleeve and in part by the associated driver for connecting and disconnecting the driver from the spindle, a spider fixed concentrically to the carrier, a series of levers pivoted to said spider each operatively engaging one of said sliding sleeves, and a fixed cam assembly secured to the inner face of the removable cover plate of the housing for actuating said levers.

110. In a machine tool, the combination of a rotatable spindle carrier, a plurality of spindles which are rotatably mounted on said carrier in position such that their axes are parallel with the axis of the carrier and are equal distances therefrom and are equal arcual distances apart, means to periodically turn said carrier arcual distances equal to the arcual distances between spindle centers, a driver for each spindle rotatably mounted thereon, means for constantly turning said drivers, means for disconnecting each spindle from and connecting it with its driver which means include a sliding sleeve having a tongue and groove connecting with the spindle, a brake drum fixed to each spindle, a friction brake associated with each brake drum, brake operating mechanisms mounted on said carrier, fixed cams arranged to be engaged by said brake operating mechanisms and by the means for connecting and disconnecting the spindles and their driver.

111. In a machine tool, the combination of a rotatable spindle carrier, a plurality of spindles which are rotatably mounted on said carrier in position such that their axes are parallel with the axis of the carrier and are equal distances therefrom and are equal arcual distances apart, means to periodically turn said carrier arcual distances equal to the arcual distances between spindle centers, a driver for each spindle rotatably mounted thereon, means for constantly turning said drivers, means for disconnecting each spindle from and connecting it with its driver which means include a sliding sleeve having a tongue and groove connection with the spindle, a brake drum fixed to each spindle, a friction brake associated with each brake drum, brake operating mechanisms mounted on said carrier, fixed cams arranged to be engaged by said brake operating mechanisms and by the means for connecting and disconnecting the spindles and their driver, and brake jaws fixed to the spindle carrier and to the end of said sliding sleeve in position to become engaged by the movement of the sliding sleeve in the clutch releasing direction.

112. In threading mechanism, the combination of a work spindle, an alined rotatable tool spindle which is movable endwise toward and from the work spindle, means to move the tool spindle toward the work spindle, means to turn said tool spindle at a different rate than the work spindle while the tool spindle is so moving, means to automatically reverse the speed ratio of the tool spindle with respect to the work spindle when a thread of the desired length has been cut, spring actuated means to move the tool spindle back to its initial position after the tool is disengaged from the threaded work piece, and a buffer spring to check such backward movement.

113. In threading mechanism, the combination of a rotatable work spindle, an alined rotatable tool carrying spindle which is movable endwise in its bearings, a gear upon said tool spindle having a tongue and groove connection therewith, a driving gear meshing with the last mentioned gear, a non-rotating shaft upon which said gear is rotatably mounted, two sleeves rotatably mounted upon the same shaft on opposite sides of said driving gear, clutch jaws on the opposed faces of said driving gear and two sleeves, means for turning said two sleeves at different rates, and a gear shifter bar for moving said driving gear into clutching engagement first with one and then the other of said two sleeves, two levers which engage and may operate said clutch shifting bar, a cam engaging one of said levers to operate it and thereby move the gear shifter bar in one direction, and means adjustably connected with the tool spindle for engaging and moving the other lever after a thread of the desired length has been cut and to thereby move the gear shifter bar in the reverse direction.

114. In thread cutting mechanism, the combination of a rotatable work spindle, a rotatable tool spindle, a non-rotatable slide, means to compel the simultaneous endwise movement of said slide and spindle, a rod which telescopes through said slide, a spring upon said rod for engagement with said slide, a collar adjustably fixed to said rod behind said spring, and means engaging said rod to move it endwise and thereby compress said spring and thereby force said tool spindle yieldingly toward the work spindle.

115. In thread cutting mechanism, the combination of a rotatable work spindle, a rotatable tool spindle, a non-rotating slide, means to compel the simultaneous endwise movement of said slide and spindle, a rod which telescopes through said slide, a spring upon said rod for engagement with said sleeve, a collar adjustably fixed on said rod behind said spring, cam operated means engaging said rod to move it endwise and thereby compress said springs and thereby force said tool spindle yieldingly toward the work spindle, and a spring to move said slide and work spindle in the reverse direction.

116. In thread cutting mechanism, the combination of a rotatable work spindle, a rotatable tool spindle, a non-rotating slide, means to compel the simultaneous endwise movement of said slide and spindle, a rod which telescopes through said slide, a spring upon said rod for engagement with said slide, a collar adjustable on said rod behind said spring, a lever for engaging said rod, a cam operating said lever, a shaft to which said cam is fixed, a driving member for said shaft, means to automatically clutch said driving member to the shaft and to unclutch the driving member from said shaft when the shaft has made one complete revolution, and means to return said spindle and slide to their initial positions.

117. In thread cutting mechanism, the combination with a rotatable work spindle, an alined rotatable tool spindle, a non-rotating slide, means compelling said slide and tool spindle to move endwise in unison, a rod which supports said slide and is movable endwise independently of the slide and parallel thereto, a coil spring embracing said rod for engagement with the rear end of said slide, a screw collar adjustable upon said rod for engaging the opposite end of the spring, a lever having an operative engagement with said rod, a cam for operating said lever, a gear which embraces and has a tongue and groove connection with the work spindle, a driving gear therefor, two adjacent rotating sleeves, said sleeves and driving gear having upon their opposed faces clutch jaws, a shifter bar engaging the driving gear to move it to cause its clutch jaws to engage with the clutch jaws on one or the other of said adjacent sleeves, a cam shaft, cams thereupon, mechanism operable by said cams to move said shifter rod, another cam on said cam shaft, and means rendered operative thereby to rock the rod moving lever.

118. In threading mechanism, the combination of a rotatable work spindle, an alined rotatable tool spindle which is movable toward and from the work spindle, a rod which is parallel with the work spindle and is movable endwise and is provided with shoulders, means through which said rod may push the tool spindle endwise toward the work spindle, a pivoted lever which engages the shoulders on said rod, a spring, a cam to move said lever, a concentric rotating element, means to automatically clutch the cam to said rotating element, and means to unclutch the cam from said rotating element when the cam has made one complete revolution.

In testimony whereof I have hereunto affixed my signature this 18th day of June, 1918.

OSKAR KYLIN.